(12) United States Patent
Haney et al.

(10) Patent No.: US 7,416,095 B2
(45) Date of Patent: Aug. 26, 2008

(54) CASH DISPENSING AUTOMATED BANKING MACHINE DEPOSIT ACCEPTING SYSTEM AND METHOD

(75) Inventors: Sean Haney, North Canton, OH (US); Jeffrey M. Enright, Akron, OH (US); Jeffrey Eastman, North Canton, OH (US); Franklin M. Theriault, Canton, OH (US); R. Matthew Dunlap, North Canton, OH (US); William D. Beskitt, Canton, OH (US); Colin Fitzpatrick, Smithville, OH (US); Edward L. Laskowski, Seven Hills, OH (US); Mike Ryan, Canton, OH (US); Bill Lavelle, Massillon, OH (US); David Schultz, Massillon, OH (US); Matthew Force, Uniontown, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 593 days.

(21) Appl. No.: 10/796,794

(22) Filed: Mar. 9, 2004

(65) Prior Publication Data
US 2004/0215567 A1    Oct. 28, 2004

Related U.S. Application Data

(60) Provisional application No. 60/453,397, filed on Mar. 10, 2003.

(51) Int. Cl.
A24F 15/04 (2006.01)
(52) U.S. Cl. .................. 221/186; 221/225; 209/554; 235/379
(58) Field of Classification Search ................ 221/186, 221/225; 209/554; 235/379
See application file for complete search history.

(56) References Cited

U.S. PATENT DOCUMENTS

| 4,168,533 A | 9/1979 | Schwartz |
| 4,473,157 A | 9/1984 | Hirose et al. |

(Continued)

*Primary Examiner*—Patrick Mackey
*Assistant Examiner*—Michael E. Butler
(74) *Attorney, Agent, or Firm*—Ralph E. Jocke; Daniel D. Wasil; Walker & Jocke

(57) ABSTRACT

An automated banking machine includes a mechanism for accepting deposited items. Deposited items may be provided to the machine in envelopes which are first passed to a user from an envelope storage area (132) in the machine through a transport (124) and which are presented to the user through an opening (244). An envelope storage and dispensing device (134) is operative to assure that only a single envelope is delivered to the user. A user may thereafter include deposit items in the dispensed envelope. The deposited items are passed through the opening (244) and are deposited in a deposit-holding container (128). The deposited items may be marked with indicia corresponding to the transaction or properties of the deposited item where the envelope originally dispensed to the user for holding the deposited item.

10 Claims, 68 Drawing Sheets

U.S. PATENT DOCUMENTS

| | | | |
|---|---|---|---|
| 4,576,498 A * | 3/1986 | Rassieur | 403/24 |
| 4,617,457 A * | 10/1986 | Granzow et al. | 235/379 |
| 4,884,679 A * | 12/1989 | Graef et al. | 198/718 |
| 4,889,978 A * | 12/1989 | Koshida et al. | 235/379 |
| 4,928,230 A | 5/1990 | Kawamura et al. | |
| 5,012,075 A * | 4/1991 | Hutchison et al. | 235/379 |
| 5,053,607 A * | 10/1991 | Carlson et al. | 705/18 |
| 5,534,682 A * | 7/1996 | Graef et al. | 235/379 |
| 5,540,425 A * | 7/1996 | Graef et al. | 271/225 |
| 5,699,741 A * | 12/1997 | Schmidt et al. | 101/485 |
| 5,918,748 A * | 7/1999 | Clark et al. | 209/534 |
| 6,290,070 B1 | 9/2001 | Graef et al. | |
| 6,334,117 B1 * | 12/2001 | Covert et al. | 705/43 |
| 6,386,662 B1 * | 5/2002 | Bui | 347/2 |
| 6,474,548 B1 * | 11/2002 | Montross et al. | 235/379 |

* cited by examiner

CASH DISPENSING AUTOMATED BANKING MACHINE DEPOSIT ACCEPTING SYSTEM AND METHOD

CROSS REFERENCE TO RELATED APPLICATION

This Application claims benefit pursuant to 35 U.S.C. §119 (e) of Provisional Application No. 60/453,397 filed Mar. 10, 2003, the which is incorporated herein by reference.

TECHNICAL FIELD

This invention relates to automated banking machines. Specifically the exemplary form of this invention relates to systems and associated methods for accepting items for deposit into a cash dispensing automated banking machine as well as for providing items such as empty deposit envelopes to users of the banking machine that may be useful in conducting transactions.

BACKGROUND ART

Automated banking machines are known in the prior art. A common type of automated banking machine is an automated teller machine (ATM). ATMs are used to carry out banking transactions on a self service basis. ATMs may dispense cash to users from their account. Some ATMs may accept deposits. Other ATMs may perform functions such as dispensing stamps, printing tickets, producing scrip, cashing checks, printing money orders and performing other types of transactions. For purposes of this disclosure any machine which is capable of carrying out transactions involving transfers of value is referred to as an automated banking machine.

Automated banking machines which accept deposits often require the user to input a deposit item into the machine in which it is processed and/or stored for later removal by authorized persons. Sometimes the deposit item may be an envelope or other container which holds deposit content therein. Such content may include items of value such as cash, checks, money orders, gift certificates, coupons, coin or other types of instruments. When deposit items are deposited in this manner the user is sometimes required to provide inputs through input devices on the banking machine indicative of the value associated with the item that is being deposited. Typically this is a total value of the cash, checks or other content within the deposited item. The automated banking machine may store the information about the indicated deposit value and/or may print value information on the deposited item along with a transaction number, account number or other information that allows the deposit to be traced back to a user and/or a particular transaction.

In order to verify the indicated deposit value, the operator of the banking machine often must later recover the deposit item from a storage area within the machine. The operator opens the deposit item and determines if the content and the actual deposit value thereof correspond to the indicated deposit value. In most cases the actual deposit value corresponds to the indicated deposit value and the customer's account is credited accordingly. In other instances a discrepancy is noted between the actual deposit value and the indicated deposit value. In such cases the customer may be notified as to the amount of credit that they will be given for the deposit instead of the indicated deposit value that was provided to the machine.

Sometimes when deposited items are removed from the banking machine, the items are damaged. Such damage may include for example a torn or otherwise open envelope. In some cases the deposit item or the remnants thereof may not contain any deposit content. In some cases the deposit content may be loose in the storage area in the banking machine. In other cases the content may not be found at all.

Deposited items are sometimes removed from the banking machine in a tamper indicating deposit holding container and are transported to a remote location for verification. In other situations the deposited items may be transferred to a bag or other container at the site of the automated banking machine. The items may be taken to a remote location for verification of the contents of the deposited items.

In some circumstances at the remote location the content of a damaged or open deposit item may not be found. This may present issues as to whether the customer may have deliberately deposited an empty and damaged envelope into the banking machine. Alternatively questions may arise as to whether the persons responsible for removing deposits from the machine may have wrongfully taken the deposit content. Finally questions may arise as to whether persons responsible for verifying the amount of the deposit may have lost or misappropriated the content of the deposit item. In some circumstances because responsibility for the missing content cannot be established, the operator of the ATM may choose to credit the customer for the indicated deposit value even though the deposit content has never been found. In some circumstances the user may be perpetrating a fraud by deliberately attempting to deposit a damaged deposit item.

Damage to deposit items may be caused by a number of factors. The inclusion of various types of deposit items such as envelopes containing folded notes or sheets or coins may result in irregularly shaped deposit items. The envelopes holding such items may be subject to tearing due to their irregular contours. The tearing of such irregular shaped envelope deposit items may further contribute to uncertainty as to the content of deposit envelopes.

A further potential issue with deposits is that a banking machine customer wishing to make a deposit may not have an envelope available. Although envelope supplies may be provided, such open supplies may be subject to vandalism and/or removal of all the deposit envelopes. Such open supplies may also result in unused envelopes being littered about the area of the banking machine which provides an unattractive appearance.

Further issues may arise due to the inability to mark appropriate indicia on deposit envelopes. While different types of printing devices have been used for marking such envelopes, it is not uncommon for such printing devices to experience difficulties which result in a lack of legible printing of information on deposit envelopes.

Depository envelopes are also often difficult to dispense. This is sometimes due to the desire to dispense envelopes with peel-off or fold-open adhesive for holding envelope flaps in a secure condition. The use of such peel-off or other adhesive may avoid the need for users to lick or otherwise provide water to seal an envelope. The use of such envelopes may be desirable to provide more sanitary conditions. However, the presence of such adhesive mechanisms may present challenges in transporting and dispensing empty envelopes to users of the banking machine.

Deposit items often have significant value. For this reason, criminals may attempt to utilize fraud devices to obtain deposit items. For example, criminals may attempt to place items within a depository opening to capture deposit items so that they may be removed. Alternatively, criminals may attempt to utilize devices to fish out deposited items that have already been moved into a storage area within the machine.

The acceptance of deposits in automated banking machines also pose additional challenges. Some depositories may be difficult to repair or replace. Further, containers utilized for holding deposit items may be subject to abuse or tampering.

Further features of existing banking machine depositories and systems may benefit from improvements.

DISCLOSURE OF INVENTION

It is an object of an exemplary form of the present invention to provide an automated banking machine.

It is a further object of an exemplary form of the present invention to provide an automated banking machine that records information concerning properties of deposit items.

It is a further object of an exemplary form of the present invention to provide an automated banking machine that measures and records a thickness property of deposited items.

It is a further object of an exemplary form of the present invention to provide an automated banking machine that records information concerning properties of deposited items for purposes of later comparison and verification.

It is a further object of an exemplary form of the present invention to provide a method for verifying deposits into an automated banking machine.

It is a further object of an exemplary form of the present invention to provide a method for recording properties of items deposited into an automated banking machine.

It is a further object of an exemplary form of the present invention to provide a method for determining the thickness of a deposited item when deposited into an automated banking machine.

It is a further object of an exemplary form of the present invention to provide a method for determining responsibility for missing content of items deposited into an automated banking machine.

It is a further object of an exemplary form of the present invention to provide a depository for use in conjunction with an automated banking machine.

It is a further object of an exemplary form of the present invention to provide a depository for an automated banking machine that delivers to the user an envelope at the time when a user wishes to make their deposit.

It is a further object of an exemplary form of the present invention to provide a depository for an automated banking machine that will reliably handle envelopes of non-uniform contour.

It is a further object of an exemplary form of the present invention to provide a depository for an automated banking machine that provides enhanced security.

It is a further object of an exemplary form of the present invention to provide a depository for use in conjunction with an automated banking machine that provides greater reliability in printing indicia on deposited envelopes or other items.

Further objects of exemplary forms of the present invention will be made apparent in the following Best Modes for Carrying Out Invention and the appended claims.

Certain of the foregoing objects are accomplished in an exemplary embodiment by an automated banking machine that accepts deposit items such as envelopes. In the exemplary embodiment the user provides inputs through one or more input devices on the machine that identify a user and/or their account(s). Inputs through input devices on the machine may also include an indicated deposit amount associated with a deposit item.

The deposited item in an exemplary embodiment is accepted in the machine and is sensed for thickness and/or other properties at one or more locations on the deposited item. Information regarding thickness and/or other properties is recorded. In some embodiments the thickness information or other sensed parameters may be recorded by printing or other means directly on the deposited item. Alternatively in some embodiments the information recorded on the deposited item may be correlated with thickness and/or other sensed information recorded in a memory accessible by a computer.

In an exemplary embodiment the deposited item is stored with other deposited items in a storage area in the automated banking machine. Subsequently the deposited item is removed from the storage area by an authorized person and opened or otherwise reviewed for verification. The thickness data and/or other parameters related to each deposited item may be reviewed for purposes of determining the content of the item at the time of deposit. For example thickness information recorded concerning a deposit envelope that is empty and damaged at the time of verification will indicate if the envelope contained materials at the time of deposit. This may be done for example by comparing the measured thickness of the damaged envelope to the recorded thickness information. Similarly the thickness information and/or other parameters recorded concerning an envelope that is undamaged but open at the time of verification, will indicate whether the envelope contained items at the time of deposit. Likewise envelopes which are damaged or open at the time of the verification process may be analyzed by comparison to the stored data to determine if items have been removed since the time of deposit in the machine. Various approaches may be taken depending on the particular system and type of deposited items.

In further exemplary embodiments a deposit mechanism is provided that holds a store of deposit envelopes or other suitable deposit holding containers within the interior of the machine. At the time when the user wishes to make a deposit, the machine operates so as to separate a single deposit envelope from the supply and to deliver it out of the machine to the user. Thereafter the user may place items for deposit within the envelope and deliver the deposit into the machine through the same opening through which the envelope was delivered.

In an exemplary embodiment a transport is provided that is capable of delivering the empty envelopes as well as transporting filled regular or irregular envelopes containing deposit material to a storage location. Further in some exemplary embodiments security features are provided so as to minimize the risk that criminals can obtain unauthorized access through the transport to deposited items. In addition in some exemplary embodiments provisions are made to assure more reliable printing of indicia on deposited envelopes by capturing excess ink or other materials in an area away from deposited items and/or by providing appropriate tending for a device which prints indicia on the deposit envelopes.

Of course it should be understood that the devices, systems and methods described are exemplary and that the principles described may be applied to other systems and/or that additional features and functions may be used.

BEST MODES FOR CARRYING OUT INVENTION

Figure 1:
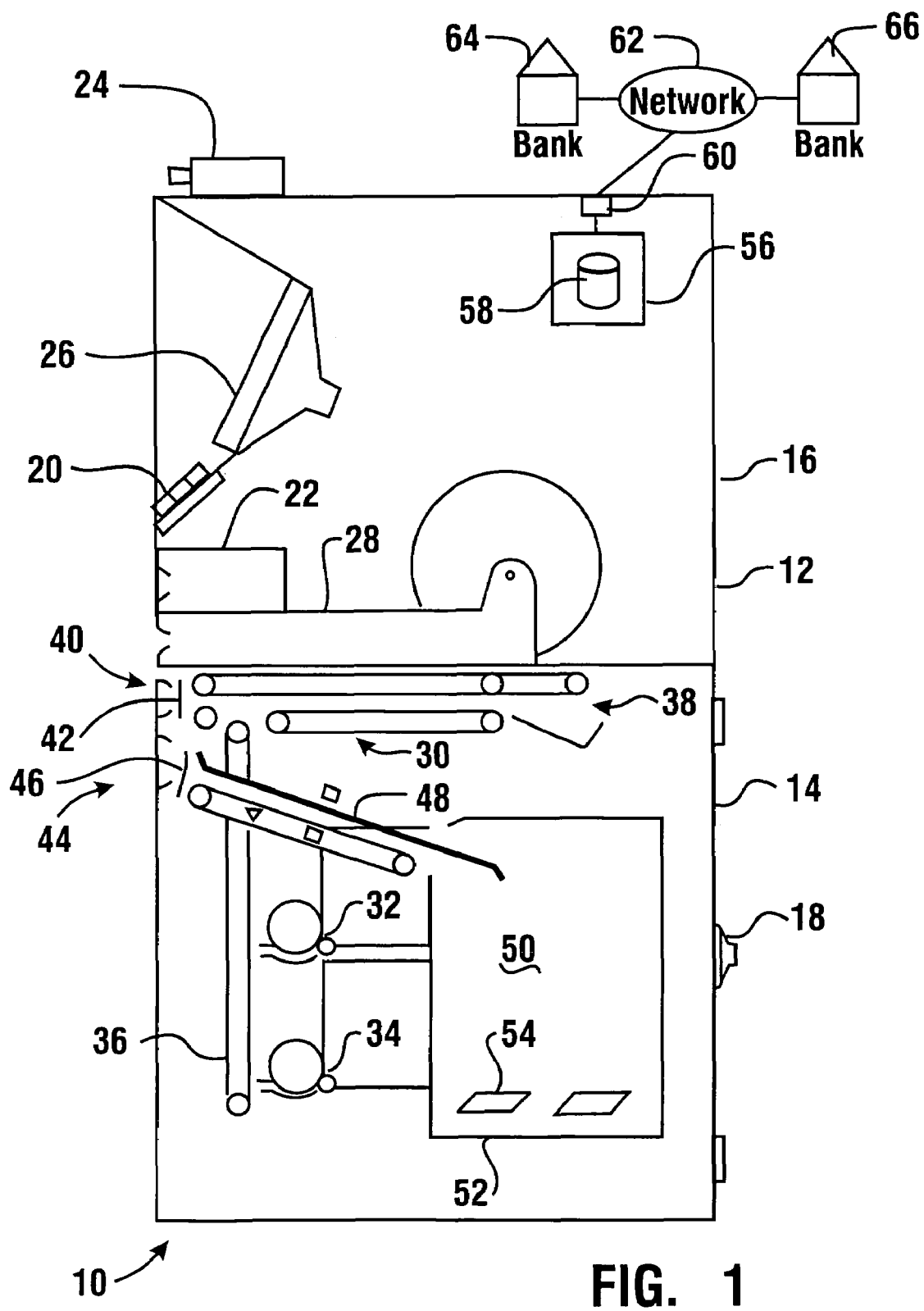
FIG. 1 is a schematic view of an automated banking machine in operative connection with an ATM transaction network.

Referring now to the drawings and particularly to FIG. 1, there is shown therein a schematic view of a first embodiment of an automated banking machine generally indicated 10. The first exemplary embodiment of the automated banking machine is an automated teller machine that is usable to carry out banking transactions such as the dispensing of cash and the deposit of items. It should be understood however that the principles of the present invention may be applicable to other types of automated banking machines that perform other or additional functions.

Automated banking machine 10 includes a housing 12. Housing 12 in the exemplary embodiment includes a chest portion 14 and a top housing portion 16. Each of the chest portion and top housing which may be alternatively referred to herein as a cabinet portion are accessible to authorized persons through suitable access doors which are controlled by locking mechanisms. As schematically shown, the chest portion has a chest door which includes a safe style combination lock schematically represented 18, which operates to limit access to authorized personnel. The top housing portion includes a key lock (not separately shown) in operative connection with a door that is movable relative to the housing and enables authorized persons to access the interior of the top housing portion. Of course in other embodiments other access control and locking mechanisms may be used.

Automated banking machine 10 further includes input devices. The input devices in the exemplary machine include a keypad 20 through which users may provide manual inputs. A further input device in the exemplary embodiment is a card reader 22. In some embodiments the card reader may be adapted for reading magnetic stripe cards and/or smart cards which include a programmable memory thereon. Of course in other embodiments card readers which read contactless cards or other devices may be used.

The exemplary embodiment further includes an image capture device schematically represented 24. In some embodiments the image capture device may include for example, a camera which captures one or more images of the person operating the machine. In other embodiments the image capture device may comprise a biometric reader such as an iris scanner, an input device for a facial recognition system or other similar device which serves as an input device for identifying a user. Of course the input devices discussed are exemplary and in other embodiments other input devices such as fingerprint readers, retina scanners, voice recognition systems, touch screens, voice input systems and other types of devices that receive inputs that are usable to identify a user and/or their accounts, or which can be operated to provide instructions to or from the machine, may be used.

The exemplary embodiment of the automated banking machine 10 further includes output devices. Such output devices include a visual display 26. The visual display 26 may be operated to provide instructions to a user concerning operation of the machine as well as to provide the user with information. The machine further includes a printer device 28 which also serves as an output device. Printer device 28 in some exemplary embodiments may include a device for printing receipts which are provided to a user for purposes of documenting transactions conducted at the machine. Of course in other embodiments other types of printing devices may be used. These may include for example devices that print tickets, scrip, money orders, checks, coupons, or other documents or instruments.

It should be understood that these output devices are exemplary and in other embodiments other types of output devices may be used. For example other embodiments may include voice guidance systems, communication interfaces for communicating with wireless devices such as PDAs or cell phones, electrical connectors for communicating with headphones or similar devices or other devices for providing outputs to a user.

In the exemplary banking machine 10 users are enabled to receive cash from the machine as well as to make deposits into the machine. The exemplary machine includes a cash dispenser mechanism 30. The cash dispenser mechanism includes bill picker mechanisms 32 and 34 which operate to pick bills from one or more supplies of bills in the machine. For example U.S. Pat. No. 4,664,369 which is incorporated herein by reference, includes examples of bill picker mechanisms that may be used in some embodiments. Of course in other embodiments other types of bill picker mechanisms may be used.

The cash dispenser 30 further includes a bill transport 36 which moves the bills to a stacking and presenting mechanism 38. For example U.S. Pat. No. 5,342,165 which is incorporated herein by reference, discloses a type of bill stacker and presenting mechanism that may be used in some embodiments. The cash dispenser is operative to deliver bills to a user through a cash dispensing outlet 40. As schematically indicated, an appropriate gate or other blocking mechanism 42 is positioned adjacent to the cash outlet so as to prevent unauthorized persons from gaining access to the cash dispenser mechanism. The exemplary gate 42 is movable responsive to motors, solenoids or other suitable motion control mechanisms which may be alternatively referred to herein as drives, to enable cash to be properly delivered to a machine user from the stacker and presenter mechanism, and to block access at other times.

The exemplary embodiment of the banking machine 10 further includes a first deposit accepting system which includes mechanisms suitable for receiving and storing deposited items. In the exemplary embodiment the deposited items are envelopes. However, in other embodiments other types of deposit items such as checks, money orders, tickets, coupons, deposit bags, deposit holding carriers and other types of deposited items may be received. Machine 10 includes a deposit opening which may be alternatively referred to herein as an inlet, which extends in the housing and is sized for accepting deposited items such as envelopes. An appropriate gate mechanism schematically indicated 46 is movably positioned adjacent the deposit inlet. Gate 46 is movable through solenoids, motors or other suitable moving devices so as to prevent access to the interior of the machine through the deposit inlet except at times when the machine is in a proper mode to accept deposits.

In the exemplary embodiment deposited items are moved along a deposit path through a transport 48. The deposit transport 48 is operative to move envelopes deposited by a user from the area adjacent the deposit inlet to a storage area 50. In some exemplary embodiments the deposit transport may be of the type shown in U.S. Pat. No. 4,884,679, the disclosure of which is incorporated herein by reference.

In the first exemplary embodiment the storage area 50 is bounded by a removable deposit holding container 52. The exemplary form of the deposit holding container has an interior storage area that is operative to hold deposited items therein 54. The deposit holding container 52 may be removed from the machine by authorized personnel and transported to a remote location where deposits may be validated. This may be done for example through a self locking and tamper indicating deposit holding container like that later discussed in detail that locks upon removal from the machine and which is properly opened only by authorized persons at a remote location. Alternatively the deposit holding container may be such that persons who are authorized to access the chest portion 14 may remove the deposited items individually therefrom and verify the contents thereof either at the machine or at a remote location. Alternatively other approaches may be used for verifying deposited items depending on the type and nature of the deposits.

The exemplary machine 10 further includes at least one computer which may be alternatively referred to herein as a controller, schematically indicated 56. The controller is in operative connection with at least one data store or memory 58 which holds programming instructions, information about transactions, communication information and other data used in operation of the machine. The controller 56 is in operative connection with the transaction function devices in the machine and controls the operation thereof in accordance with the programmed instructions.

Controller 56 is in operative connection with at least one communications device 60. The communications device enables the exemplary machine to communicate with at least one remote computer and data store for purposes of carrying out transactions. As represented schematically in FIG. 1, banking machine 10 is in operative connection with a network schematically indicated 62. The network is in operative connection with computers at financial institutions 64 and 66 which operate systems that authorize and record information concerning transactions conducted by users at the banking machine. Of course this communications approach through a banking network is exemplary and in other embodiments other communications approaches and/or authorizing entities may be used.

Figure 2:
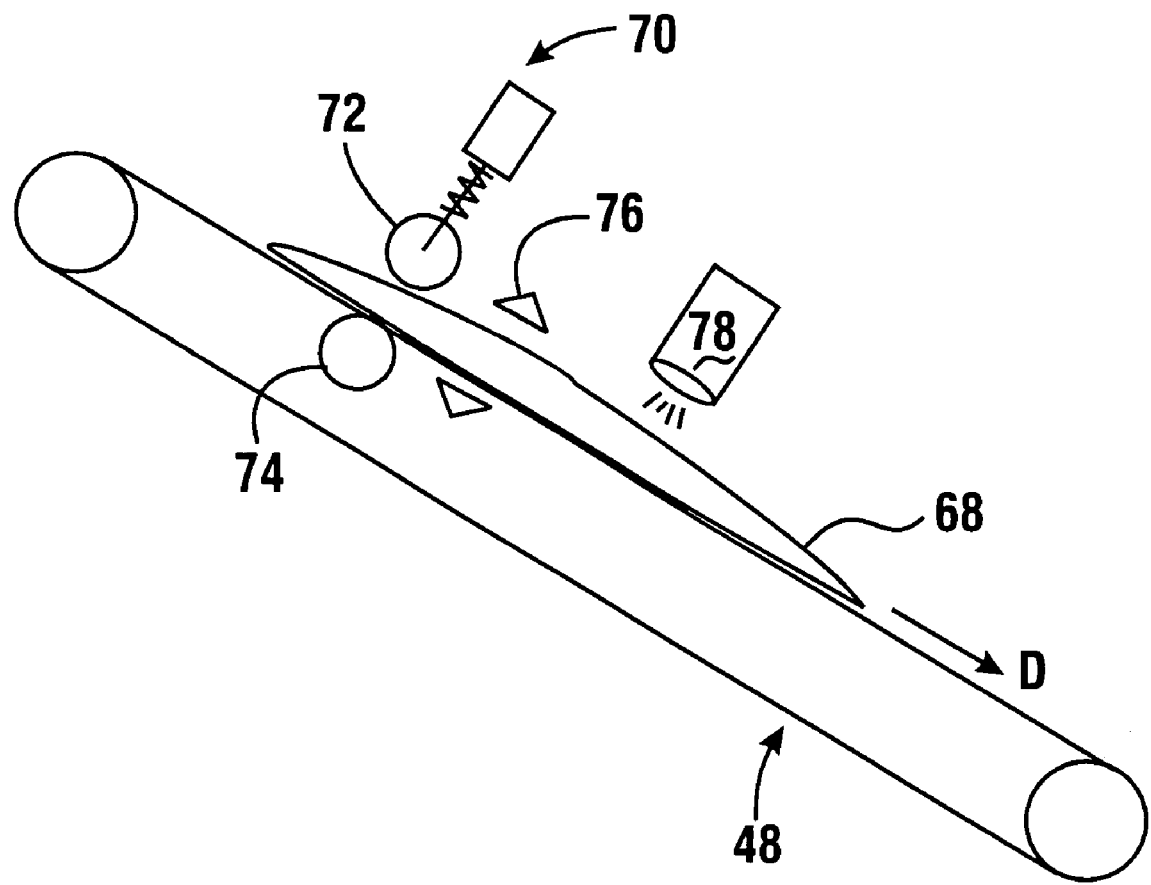
FIG. 2 is a schematic view of a deposit item transport and components for measuring properties of a deposited item and for recording indicia on the item.

FIG. 2 shows a schematic view of the deposit transport 48 used in exemplary banking machine 10. In this exemplary embodiment deposited items in the form of envelopes 68 are moved along a transport path in the direction of arrow D from the deposit inlet to the storage area. As the deposited items are being moved along the transport path, properties of the deposited item are sensed. In the embodiment shown, thickness of the deposited item is sensed by a sensor 70. In the embodiment shown, the sensor 70 is a contact sensor which physically contacts the deposited item 68 so as to determine its thickness. For example as shown in FIG. 2, a contact roller 72 has an axis that is movable in response to envelope thickness and biasingly engages the deposit envelope as it passes along the transport path between the contact roller and a reference surface of a stationary axis roller 74. The displacement of the contact roller 72 from its reference position indicates the thickness of the deposited item across its length. The displacement of the contact roller produces one or more signals from the sensor 70 which are transmitted to the controller and used for purposes which are later discussed.

It should be understood that while in the exemplary embodiment the contact type sensor is used for determining thickness in other embodiments, non-contact sensors may be used for determining thickness or other properties of a deposited item. For example non-contact sensors of the type shown in U.S. Pat. Nos. 6,101,266, 6,242,733 and 6,241,244, the disclosures of each of which are incorporated by reference herein, may be used for purposes of determining thickness or other properties of the deposited items. Such non-contact sensors may be used in lieu of or in addition to, contact type sensors for determining thickness of the deposited item.

In addition or in the alternative, other types of sensors such as magnetic type sensors may be used for purposes of sensing and/or determining the content of the envelope. Magnetic sensors may be used for example, to determine the presence of magnetic inks on checks, coins, currency or other instruments which are included within deposit envelopes. Such non-contact sensors are schematically represented 76 in FIG. 2. It should be understood that in some embodiments thickness or other properties of the deposited item may be sensed in or along a single sensing area in the envelope path. In other embodiments sensing may be conducted across all or a portion of the transverse width of the deposited item. The particular nature of the thickness and other deposit item properties that are sensed and used in a particular embodiment may depend on the type of deposited item involved and the needs of the operator of the banking machine.

As shown in FIG. 2, one or more recording devices schematically indicated 78 are positioned adjacent to the deposit path. In the exemplary embodiment the recording devices may comprise printers which are operative to print indicia on deposited items. Such printers may include for example dot-matrix printers, stamper type printers, inkjet printers or other suitable devices for recording indicia on the deposited item. In other exemplary embodiments systems which are operative to label the deposited item, such as those shown in U.S. Pat. No. 4,435,243 which is incorporated herein by reference, may be used.

In the exemplary embodiment, the recording devices are operative to record on the deposited item, indicia which corresponds to the properties of the item which is sensed. This may include for example recording on the deposited item numerical indicia which indicate thickness of the envelope at one or more locations thereon. In other embodiments the recording device may be operative to record an identifying indicator such as an account number or transaction number on the envelope. This identifying indicia may then be correlated to thickness or other properties of the deposited item by referring to data stored in memory at the machine or elsewhere in an operatively connected computer. Alternatively or in addition, the indicia recorded on the deposited item may include an indicated deposit value which corresponds to the amount that a user of the machine indicated was included in or was represented by the deposited item.

Figure 3:
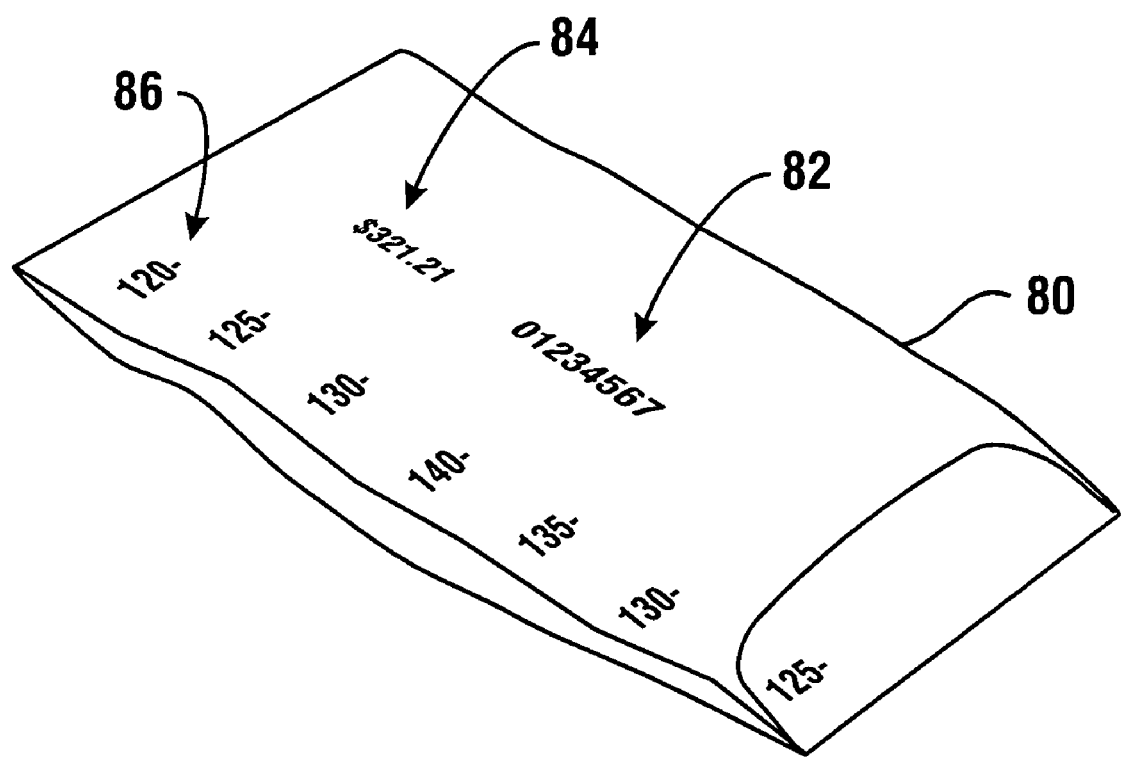
FIG. 3 is an exemplary embodiment of a deposited item that has recorded indicia thereon corresponding to thickness and to a particular transaction.

FIG. 3 shows an example of deposited item 80 that has been passed through the depository of an exemplary automated banking machine. For this deposited item the recorded indicia on the item includes a transaction identification number 82. The transaction identification number may correspond for example, to the particular transaction carried out by the machine and may correspond to information stored in memory such as the identity of the particular user who conducted the deposit transaction. In this exemplary embodiment the deposited item 80 further has included among the indicia, an indicated deposit value 84. The indicated deposit value may include for example the particular value amount that the user indicated that they were depositing into the machine through inputs to the input devices at the time they made the deposit. The inclusion of the indicated deposit value with the recorded indicia may facilitate verifying the deposit when it is removed from the machine as later discussed.

For the deposited item 80, indicia corresponding to thickness is recorded on the item. The thickness indicia 86 comprises a numerical indication of the thickness of the deposit envelope at various locations along the envelope at the time of deposit. These various locations in the embodiment shown are spaced longitudinal locations along a single longitudinal line adjacent the center of the envelope as it passes through the transport. In this exemplary embodiment the thickness indicia are printed adjacent to a transverse edge of the envelope so as to not interfere with other indicia printed thereon. Of course it should be understood that in other embodiments other approaches may be used.

As later discussed, the thickness and other indicia associated with the envelope may be used when the envelope is subsequently opened to verify that the envelope contained deposit items therein at the time of deposit and/or the nature of such deposited items.

Figure 6:
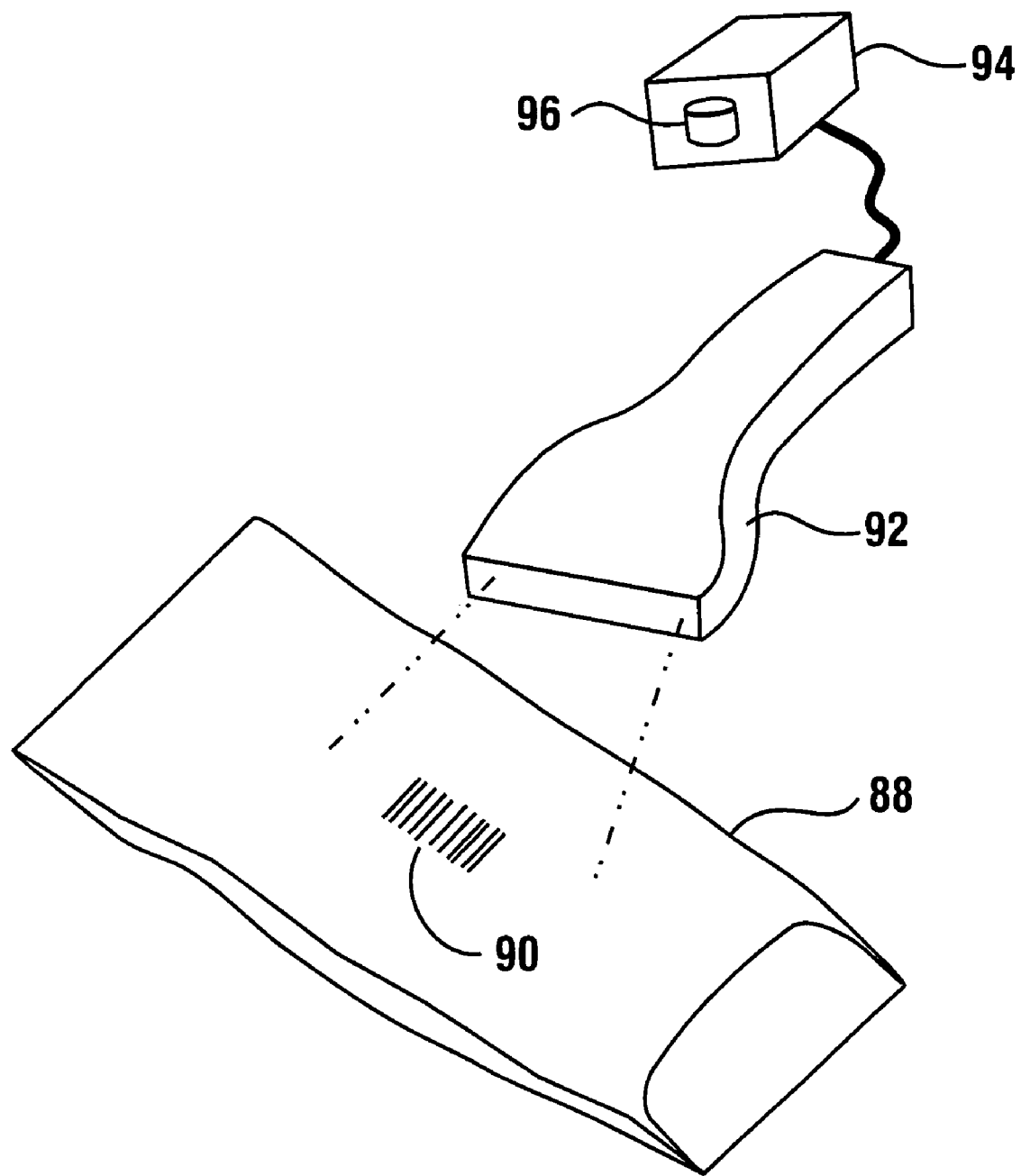
FIG. 6 is a schematic view of a deposited item upon which machine-readable indicia representative of properties of the item have been recorded, and a reading device for reading the machine-readable indicia and for recovering information concerning properties of the deposited item from a memory.

FIG. 6 shows an alternative form of recorded indicia on a deposited item 88. In this exemplary embodiment the recorded indicia of the deposited item includes machine-readable indicia 90. In this embodiment the machine-readable indicia comprises a bar code or similar machine-readable coding scheme.

The machine-readable indicia corresponds to a particular numerical or other indicator that is correlated with data related to the deposit, such as the customer identity and indicated deposit value. In the exemplary embodiment the indicia also corresponds to data about the particular deposit such as thickness data and/or other properties. This data which is captured from the contact or non-contact type sensors in the machine is correlated with the machine-readable indicia 90. Such data may be accessed from the data store in the banking machine. Alternatively such data may be transmitted to another data store for purposes of verifying that the indicated deposit value corresponds to the actual deposit value of the content of the envelope.

A reading device 92 is operative to read the machine-readable indicia once the deposited item 88 has been removed from the storage area in the machine by an authorized representative of the machine operator. The reading device 92 is in operative connection with a computer or other device 94 which has therein or which has accessible thereto, data in a data store 96. The data store 96 preferably includes data such as the indicated deposit value, the identity of the user and the properties of the particular deposited item as sensed by the sensors in the banking machine proximate to the time of deposit. With this information the person verifying the deposits may verify that the content of the envelope has at the time of verification, an actual deposit value that corresponds to the indicated deposit value. In the event of a discrepancy, the person verifying the deposit may use the thickness and other data which has been recorded related to the deposited item, to determine if the deposited item actually contained items having the expected properties of thickness and/or other properties at the time of deposit. This will enable a person responsible for verifying the deposit to better determine if the items were not included in the deposited item at the time of deposit or if the content of the deposited item was lost or misappropriated after deposit. Such information is useful in determining whether to credit the customer's account for the indicated deposit value as later discussed.

Figure 4:
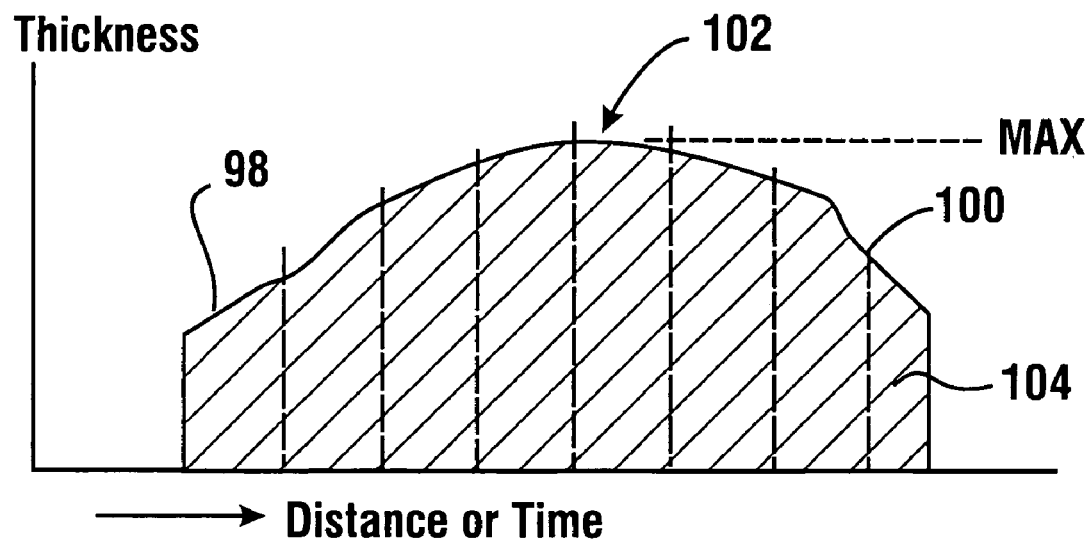
FIG. 4 is a graph representative of thickness of a deposited item over distance or time as the item passes a sensor of an exemplary embodiment.
Figure 5:
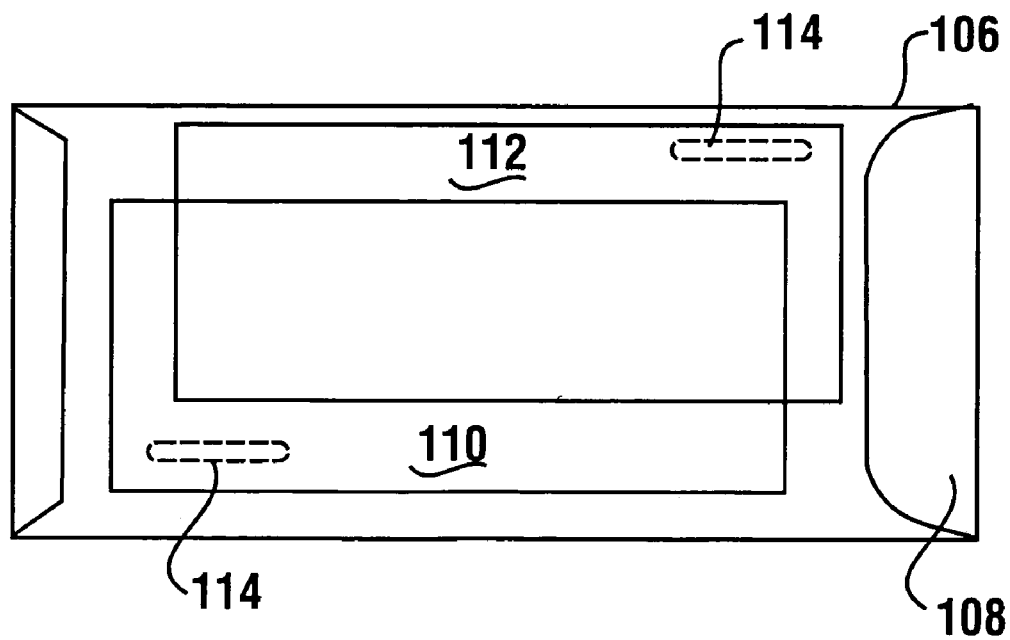
FIG. 5 is a schematic plan view representative of detected properties of an exemplary deposited item including instruments such as checks.

FIGS. 4 and 5 show exemplary types of data related to deposited items which may be represented by indicia recorded on deposited items. For example FIG. 4 is a graphical representation of thickness of a deposited item over time or distance as the item engages and passes a single contact type sensor as the deposited item moves along the deposit path in the banking machine. A line 98 corresponds to the one or more signals from the sensor indicative of thickness. Various embodiments such as for example a deposit system used to produce item 80 in FIG. 3, record thickness at a plurality of discrete separated locations 100. In the exemplary embodiment the movement of the envelope may be controlled through operation of a controlled speed motor, stepper motor or other controlled movement device so that the indicia indicative of thickness at each of the locations corresponds relatively closely to the particular area on the deposited item at which the thickness is sensed. Appropriate circuitry is provided so that when indicia corresponding to thickness such as is shown in FIG. 3 is a fairly accurate representation of the thickness at the various locations at the time the envelope was deposited. As can be appreciated in embodiments where deposit items are moved at a predictable and generally constant speed, thickness determinations can be based on elapsed time from when a leading edge of an envelope is sensed. In other embodiments encoders or other distance sensors can be used to directly sense envelope movement. The graph in FIG. 4 may be representative of outputs from either type system.

In some embodiments it may be sufficient for the indicia to represent a maximum thickness of the deposited item such as is indicated in FIG. 4 by a maximum 102 of line 98. The maximum is indicative of the maximum thickness of the envelope, and this may in many embodiments be sufficient to indicate the nature of the content thereof. Thus for example in systems where the maximum thickness is recorded, only indicia corresponding to one numerical value may be recorded on the envelope and/or stored in memory as corresponding to the indicia recorded on the envelope.

In still other embodiments it may be important to correlate with a deposited item, a quantity indicative of the volume of the item. This may correspond to the area 104 under the line 98 in FIG. 4. As can be appreciated area 104 which is the integral of the overall thickness as measured by a thickness sensor, may be indicative of the overall content of the envelope.

FIG. 5 shows yet other data that may be recorded related to the particular deposited item. For example certain contact and non-contact sensors can develop a detailed profile of a deposited item including the thicknesses associated with folds, flaps and items contained within the envelope. Non-contact sensors may also detect other properties such as magnetic properties and the presence of inks or other indicators on or within the contents.

For example FIG. 5 shows a deposited item 106. Non-contact sensors of the type previously mentioned may use radiation to determine thickness and determine the bounds of the envelope as well as additional thickness areas associated with envelope features such as flaps and folds 108. In addition such non-contact sensors may sense additional thicknesses in the areas 110 and 112 within the envelope. In areas 110 and 112 additional thickness is caused by the presence of sheets such as instruments within the envelope. Radiation sensors which are capable of sensing radiation absorption properties may sense areas where printing has been made on items within the envelope. In addition or in the alternative, magnetic sensors may identify areas of magnetic activity represented by areas 114. Such magnetic activity may correspond to areas where magnetic inks have been printed on checks or other instruments.

As can be appreciated, some embodiments may provide a detailed profile of the deposited item and its content. This profile may be correlated with the indicia recorded on the deposited item so that a person responsible for verifying deposits may determine whether the content of the deposited item at the time that it is verified, corresponds to the content at the time it was deposited.

In operation of an exemplary embodiment, the automated banking machine 10 is operated by a user to perform banking transactions. This includes for example the user providing to the card reader 22 of the machine a debit card which includes a magnetic stripe. The magnetic stripe may include information that identifies the user and/or their account such as a primary account number (PAN) of the user. The user may further verify their identity by providing to the machine a personal identification number (PIN) through the keypad 20. If the input PIN corresponds to the data recorded on the card, the user may be authorized to conduct transactions at the machine. It should be understood that the use of these inputs by the user to the machine to identify the user is exemplary and in other embodiments other inputs usable to identify the particular user or an account may be used.

A user also provides one or more inputs through input devices on the machine to indicate the type of transaction they wish to conduct. If the user provides one or more inputs indicating that they wish to make a deposit transaction, the controller in the machine will operate in accordance with its programming to present prompts to the user through the display 26 or other output devices requesting that the user indicate the deposit values of the item or items that they wish to deposit. After providing the indicated deposit value, the controller operates the machine to open the gate 46 to the deposit transport 48 so that a user may insert the deposited item. When the user inserts the deposited item, it is moved through the transport 48 wherein properties of the deposited item are sensed. This includes in exemplary embodiments, sensing thickness and/or other properties of the deposited item as previously discussed. The controller 56 further operates the recording device 78 such as one or more printers, to record on the deposited item indicia that corresponds to the particular properties or characteristics sensed. Once the indicia has been recorded on the deposited item, the item passes into the storage area 50 where it is held in the banking machine for later verification.

Periodically the operator of the machine or other authorized entity accesses the interior of the machine to remove and verify the deposited items. This is done in an exemplary embodiment by opening the lock 18, moving the chest door and accessing the chest portion 14 so as to remove the deposit holding container 52. In some embodiments the deposited items may be removed from the deposit holding container at the machine and opened for verification in an area adjacent to the machine. Alternatively the deposit holding container may be locked and transported to a remote location for verification of the deposits.

In the exemplary embodiment the deposit holding container is to be transported to a remote location and an empty deposit holding container is placed in the machine to receive further deposits. The banking machine is then returned to operation. The deposited items are removed from the deposit holding container at a remote facility and the content thereof reviewed. The content which may include cash, checks or other deposited items is totaled for each deposited item to obtain an actual deposit value. The actual deposit value is then compared to the indicated deposit value to determine if there is a discrepancy. If the actual deposit value and the indicated deposit value are different, the user of the machine may have made an error in providing the indicated deposit value. Alternatively the user may be attempting to perpetrate a fraud by misrepresenting the value of the deposit. Alternatively, deposited items may have been misappropriated by persons having access to the deposited items either at the machine, in transport or at the location where the deposited value is verified.

The actual deposited value may be compared to the indicated deposit value by reviewing the numerical indicia corresponding to thickness recorded on the deposited item such as is shown in FIG. 3. Alternatively transaction number data or other machine-readable indicia may be correlated electronically with the indicated deposit value. Of course in cases where the actual deposit value corresponds to the indicated deposit value, the user has deposited the indicated amount and the account of the user or other appropriate entity is credited for the indicated deposit value.

Figure 7:
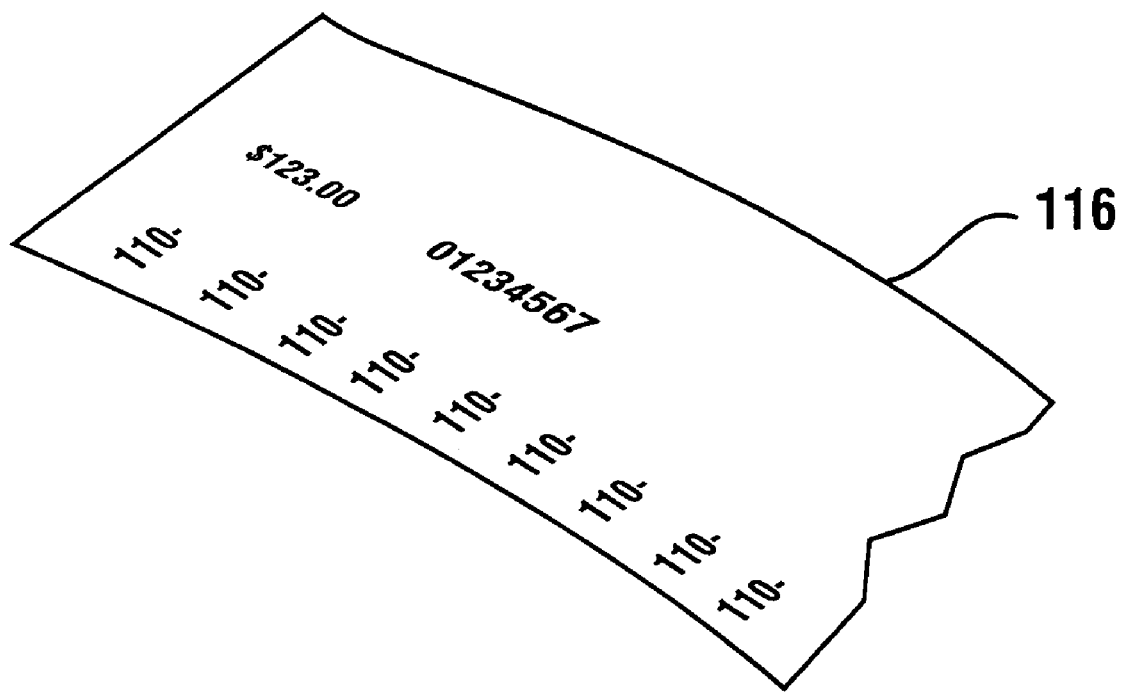
FIG. 7 is an isometric view of an exemplary deposited item that is damaged and which includes information concerning thickness recorded thereon which suggests that the item was empty at the time of deposit in the automated banking machine.

In some circumstances however, the indicated deposit value does not correspond to the actual deposit value of the item. At the deposit verification facility persons verifying deposits may inspect deposited items for damage. This may include for example, torn deposit envelopes or envelopes that have not been sealed or which appear to have been cut or otherwise opened. An example of a damaged deposit envelope is indicated 116 in FIG. 7. Damaged or otherwise opened deposit envelopes may have no contents or may still have items contained therein. When items are still contained therein, there is a question of whether all of the items are still housed within the damaged deposit item.

When persons responsible for verifying deposits are faced with damaged or otherwise open deposited items such as envelopes, questions may arise as to whether the items were damaged and/or empty at the time of deposit or whether the content was lost or stolen after deposit in the machine. By reviewing the indicia recorded on the deposited item which corresponds to thickness and/or other properties, such disputes can often be resolved.

For example if the deposited item was empty at the time of deposit, then the recorded thickness information related to the item may be used to verify that the thickness of the empty envelope at the time of verification corresponds to the thickness at the time of deposit. This is indicated with regard to damaged envelope 116 in FIG. 7 which shows that the thickness information at a plurality of locations is constant and corresponds to the thickness of the empty damaged envelope. This suggests for example that a user may be attempting to perpetrate a fraud by deliberately depositing an empty envelope which is damaged and which the user may later contend contained materials corresponding to the indicated deposit value. In cases where the recorded thickness or other properties show that the indicated deposit value was not correct, the institution operating the machine will not credit the user's account for the indicated deposit value.

In other circumstances an open or damaged deposit item may have corresponding thickness or other data which shows that the deposited item contained items at the time of deposit which are not contained at the time of verification. In such circumstances it will be known that such items have disappeared subsequent to the time of deposit. The institution operating the automated banking machine may credit the user's account for the indicated deposit value, as it is therefore documented that at least some of the deposited items had apparently been lost through error or misappropriation.

Of course in some embodiments where the data concerning deposited items includes magnetic sensors and detailed profile information, relatively accurate data showing the type and number of deposited items can be obtained from data stored in memory. Such data may in some embodiments be accessed directly from the data store in the banking machine. Alternatively data in the machine may be transmitted through the network to other computers which can be accessed at the deposit verification facility. Of course numerous approaches may be used within the scope of the invention depending on the capabilities and needs of the particular system.

At the verification facility, verification may often be successfully accomplished through manual opening and review of deposited items. Alternatively the verification facility may employ devices similar to those in the machine for purposes of measuring the thickness of the envelope and determining other properties of deposited items. This may include for example passing deposited items through such devices prior to opening them at the facility to determine if there has been any change in the properties of the item between the time that it was deposited and the time that it has reached the facility. This may be done as part of a process for inspecting for damage to the particular deposited item. In cases where machine readable indicia is used on deposited items, a reader for the indicia and thickness sensing (or other property sensing) device at the facility can be used to compare and identify deposited items where properties of the item have changed from the time of deposit. In addition, if a deposited item has been damaged in the transport or has come open, the properties associated with the deposited item at the time of acceptance in the machine may be useful in determining which open or loose items found within a deposit holding container correspond to which deposit item. Various approaches may be used within the spirit and scope of the invention.

In alternative embodiments for example, the banking machine may detect possible situations where a user has attempted to deposit an envelope or other item that is damaged or empty. In such situations the banking machine may operate to refuse to accept such an item for deposit. Such systems may prevent attempted fraud and/or avoid situations where a user forgot to place the intended deposit items in the envelope.

In some automated banking machines deposit envelopes are provided for a user's convenient use. U.S. Pat. No. 5,590, 609 the disclosure of which is incorporated by reference, shows an automated banking machine which provides envelopes to a user in which deposit items may be included. In some embodiments the envelopes provided may be of a known size and/or thickness. Sensors in the path for receipt of deposit envelopes may sense for size and/or thickness properties and the computer operating in the ATM may be programmed to have the machine reject and return to the customer deposit envelopes that do not meet the acceptable size or thickness parameters. This may be done for example by the controller in the machine reversing the deposit transport.

For example, an exemplary automated banking machine may sense for envelope thickness greater than the known empty thickness of the deposit envelopes provided by the machine. The banking machine may be programmed to instruct customers that they must place their deposit into a machine provided envelope, even if the customer has planned to provide their own deposit containing envelope. The machine may instruct the user to place their nonstandard envelope within the machine provided envelope. In such an embodiment if the sensors sensing thickness of a deposited envelope do not sense thickness greater than that of a standard machine provided envelope, the banking machine may return the envelope to the customer and may output a request to the customer to put the deposit items in the envelope and/or for the customer to use one of the envelopes the machine provides. In this way the risk of the machine receiving an empty envelope is reduced.

In other embodiments the banking machine may have sensors which sense the size, area and/or boundaries of the edges of a deposited envelope. In this way if a deposited envelope does not correspond to the expected configuration of a standard machine provided envelope, the deposited envelope may be rejected by the deposit accepting mechanism.

In other embodiments deposit items may have common properties. For example, the expected deposit items may include coins, currency bills and checks, each of which have magnetic properties. The magnetic properties of the machine provided envelopes may be nonexistent or within a known range. The banking machine may sense for elevated magnetic properties for the deposited envelopes to indicate that either cash or checks have been placed therein. Envelopes that do not have such elevated magnetic properties may be rejected. Of course in some situations the banking machine may sense for other or additional properties and use that as a basis for accepting or rejecting the deposit.

It should be understood that in some embodiments the banking machine may operate to sense for combinations of properties and may not accept the envelope if any one or more properties is not within the anticipated limits. In some embodiments envelope deposits that are rejected may be returned to the customer. In other embodiments suspect deposits may be held by the machine for analysis and/or as evidence.

In further alternative embodiments the banking machine may dispense an empty envelope to the customer for use that does not have predetermined thickness, size, magnetic or other properties. In some exemplary embodiments the properties of interest may be measured by sensors in the banking machine at the time the empty envelope is being dispensed to the customer from the machine. The properties of interest could again be measured for the envelope when the user deposits the envelope with deposit items into the machine. If an expected change (or absence of change) in thickness, size, magnetic properties or other sensed properties is not detected when the user deposits the envelope back in the machine, the deposit may be rejected.

Alternatively or in addition, indicia corresponding to properties of interest may be printed on the envelope by the machine prior to or at the time of dispense of the empty envelope. In addition or alternatively such information may be stored in a database. This information may then be compared to that for the deposited envelope. This may be done at the time of accepting the deposit and used as a basis to reject the deposit by the machine or may be done subsequently when the contents of the deposit envelopes are being verified. Of course other approaches may be taken depending on system and operator requirements.

Figure 8:
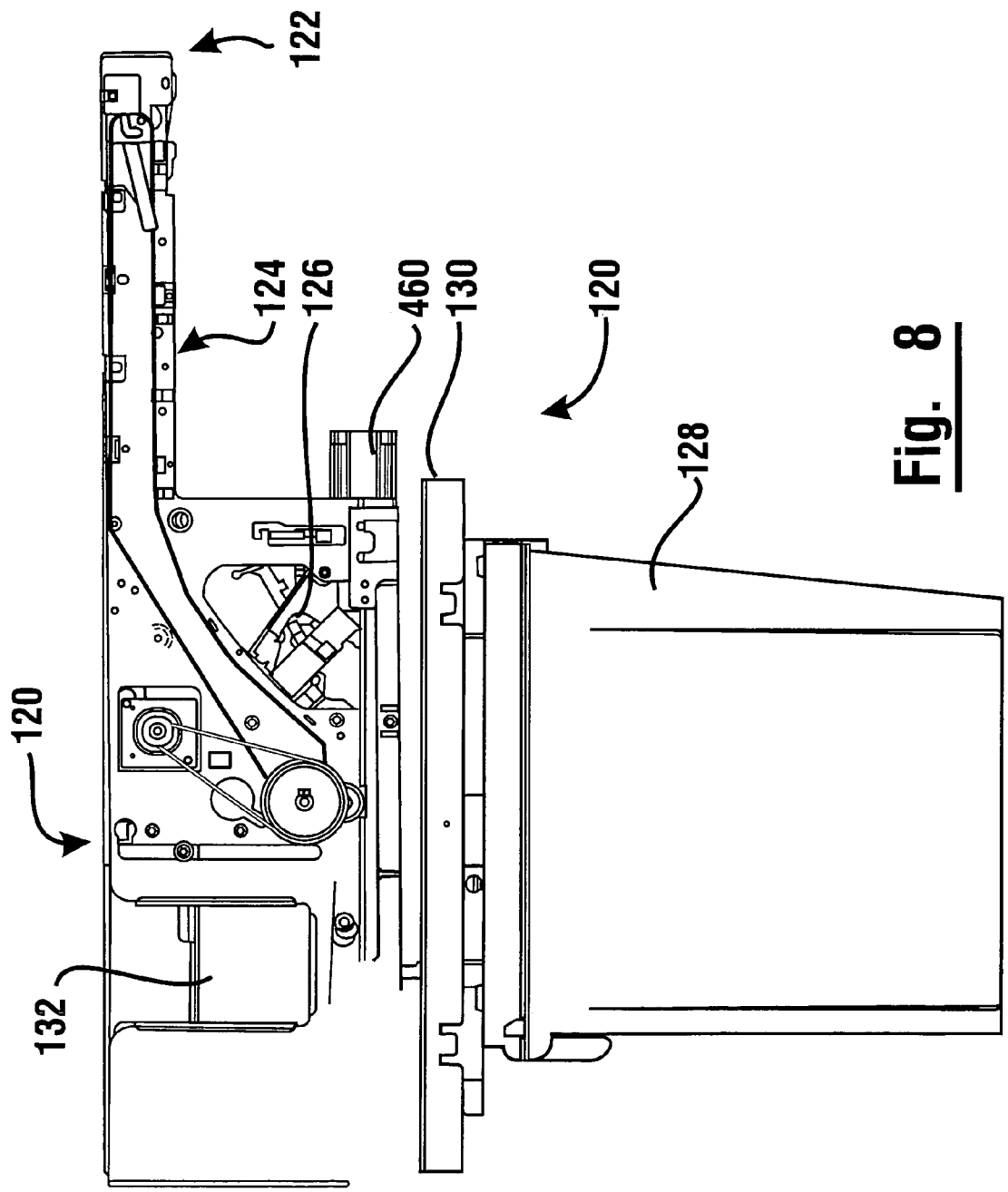
FIG. 8 is a side schematic view of an alternative deposit mechanism which is operative to dispense deposit empty envelopes to a user of an automated banking machine.
Figure 9:
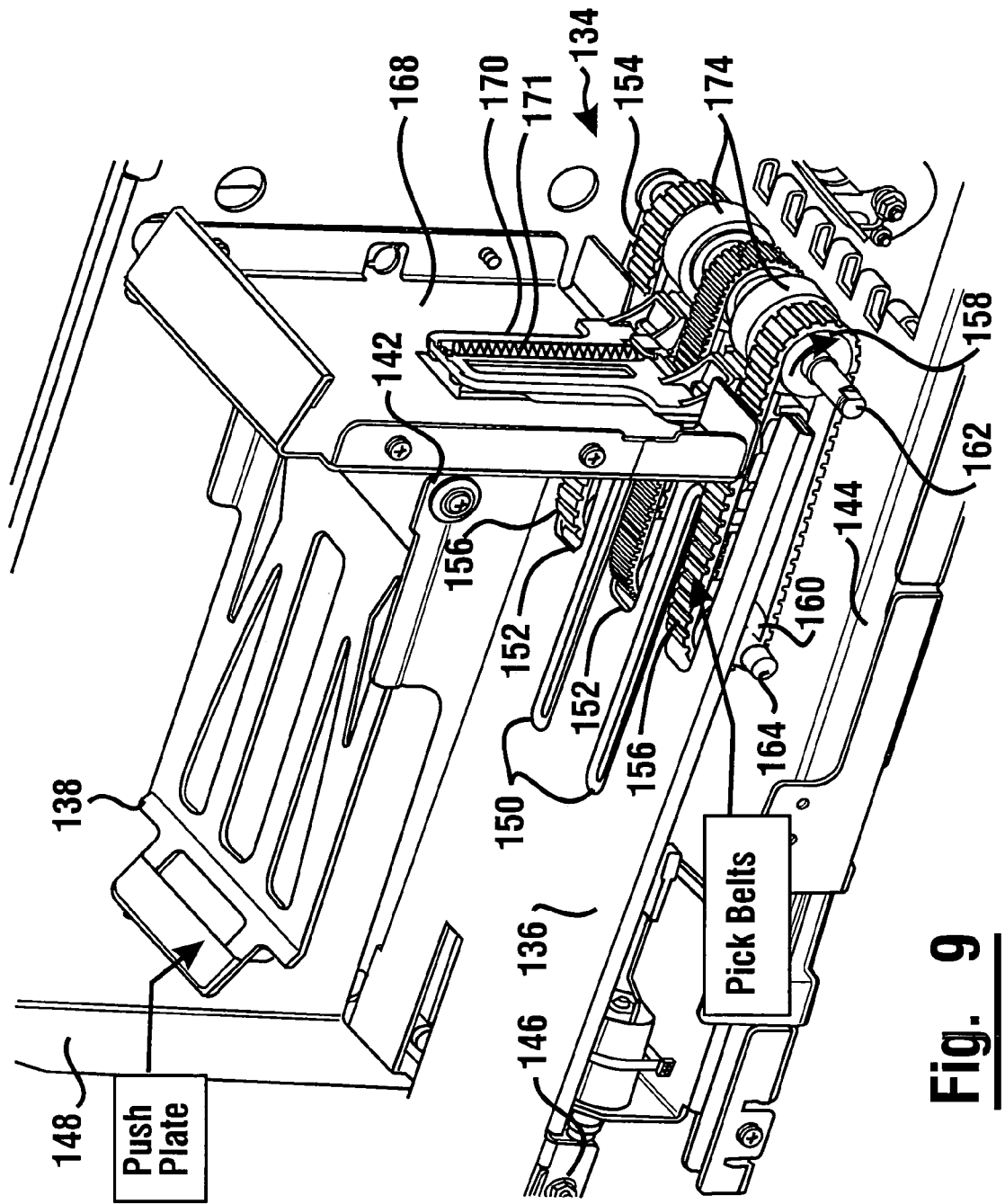
FIG. 9 is an isometric view of an envelope dispensing mechanism portion of the deposit accepting mechanism shown in FIG. 8.

FIG. 8 is a schematic view of an alternative deposit mechanism for accepting deposits such as envelopes within an automated banking machine. This deposit mechanism generally indicated 120 includes an outer end 122 which includes a deposit opening through which deposit items are accepted. Access though the opening at outer end 22 is controlled by a gate mechanism as later discussed. Items which pass into the deposit accepting mechanism 120 through the deposit opening at outer end 122 are moved through a transport 124. Items accepted in the transport are moved past the recording device 126 which in the exemplary embodiment comprises an inkjet printer. Deposited items are moved by the transport 124 into a deposit holding container 128. As later discussed in detail, in some exemplary embodiments the deposit holding container may be a removable container which is removably mounted within a chest or other secure area of the ATM. In the exemplary embodiment a dividing wall 130 may serve as a portion of an upper wall bounding the chest portion and separating it from the cabinet portion above. This is useful in some embodiments in which the envelope holding container for empty envelopes or portions thereof which serve as the envelope supply, maybe accessed by persons who do not have access to the secure chest. Of course this approach is exemplary and in other embodiments other approaches may be used.

The exemplary form of the deposit mechanism 120 further includes an envelope storage area 132 which is alternatively referred to as an empty envelope holding container. Envelope storage area 132 includes in operative connection therewith devices for selectively picking and separating a single envelope from a stack of envelopes stored in the envelope storage area. Such a picked envelope is then transported through the transport 124 and delivered to a user of the banking machine through the deposit opening at the outer end 122. It should be understood that in some embodiments envelopes being provided to a user and/or envelopes received may be marked in the manner previously discussed. Alternatively in other embodiments no marking or alternative forms of marking may be done.

The envelope storage and delivery mechanism used in connection with an exemplary embodiment is described with reference to FIG. 9-18. The exemplary embodiment includes an envelope storage and dispensing device 134 which is alternatively referred to as an envelope dispenser, shown in FIGS. 9-11. The envelope storage and dispensing device includes envelope storage area 132 which is bounded by a movable floor member 136 which serves as a floor support and an overlying push plate 138. Push plate 138 is vertically movable in a pair of disposed slots 140 in supporting connection with the housing of the deposit accepting mechanism. The push plate 138 is also rotatable about pivots 142. This facilitates rotating the push plate from a biasing position biasing the stack of envelopes downward, to a biasing position in which the push plate extends outside the storage area, so that envelopes or other deposit items may be readily added to or removed from the storage area 132. Push plate 138 when returned to the biasing position in the storage area applies a downward force to envelopes in the envelope storage area.

Floor member 136 is supported on a base 144. Floor member 136 is also rotatable about a pivot 146 which serves as a movable support and which is positioned adjacent to a rear area of the floor member 136. Further, the floor member has positioned adjacent thereto vertically extending guide plates 148 which serve to bound the empty envelope holding container and maintain the stack of deposit envelopes in supporting connection with the floor member.

Exemplary floor member 136 includes thereon a disposed pair of upward extending rails 150. The rails are useful in reducing surface tension forces that resist envelope movement over the surface of the floor member. Three slots 152 extend in the floor member at an end disposed from the pivot 146. Each slot 152 is aligned with a respective pick belt which serves as a movable picker member. The central slot is aligned with a belt 154 which extends in centered relation relative to the floor member. The slots 152 on either side of belt 154 are each aligned with a pick belt 156. Belts 154 and 156 are selectively driven responsive to the controller by a drive. The pick belts extend between rollers 158, 160 mounted on shafts 162, 164 in operative connection with the floor member 136. Adjacent to an end of member 136 disposed away from the pivot 146 is a pair of transversely disposed cams 166. (See FIG. 11.) As later discussed in detail, cams 166 serve as part of a mechanism which is operative to cause the floor member to rotate about the pivot 146 and to move up and down relative to the upper surface of pick belts 154, 156.

Figure 11:
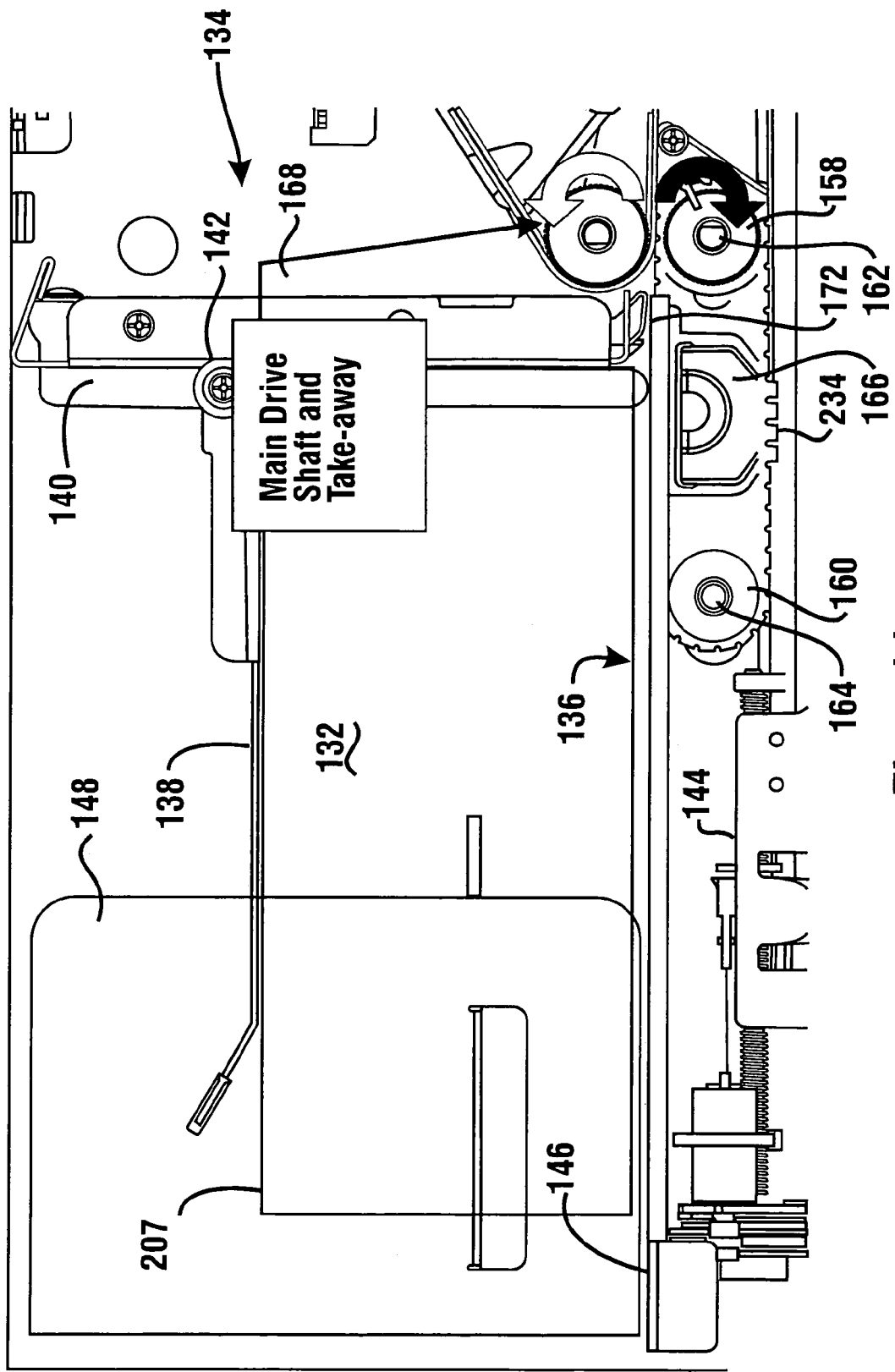
FIG. 11 is a right side view of the envelope dispensing mechanism.
Figure 12:
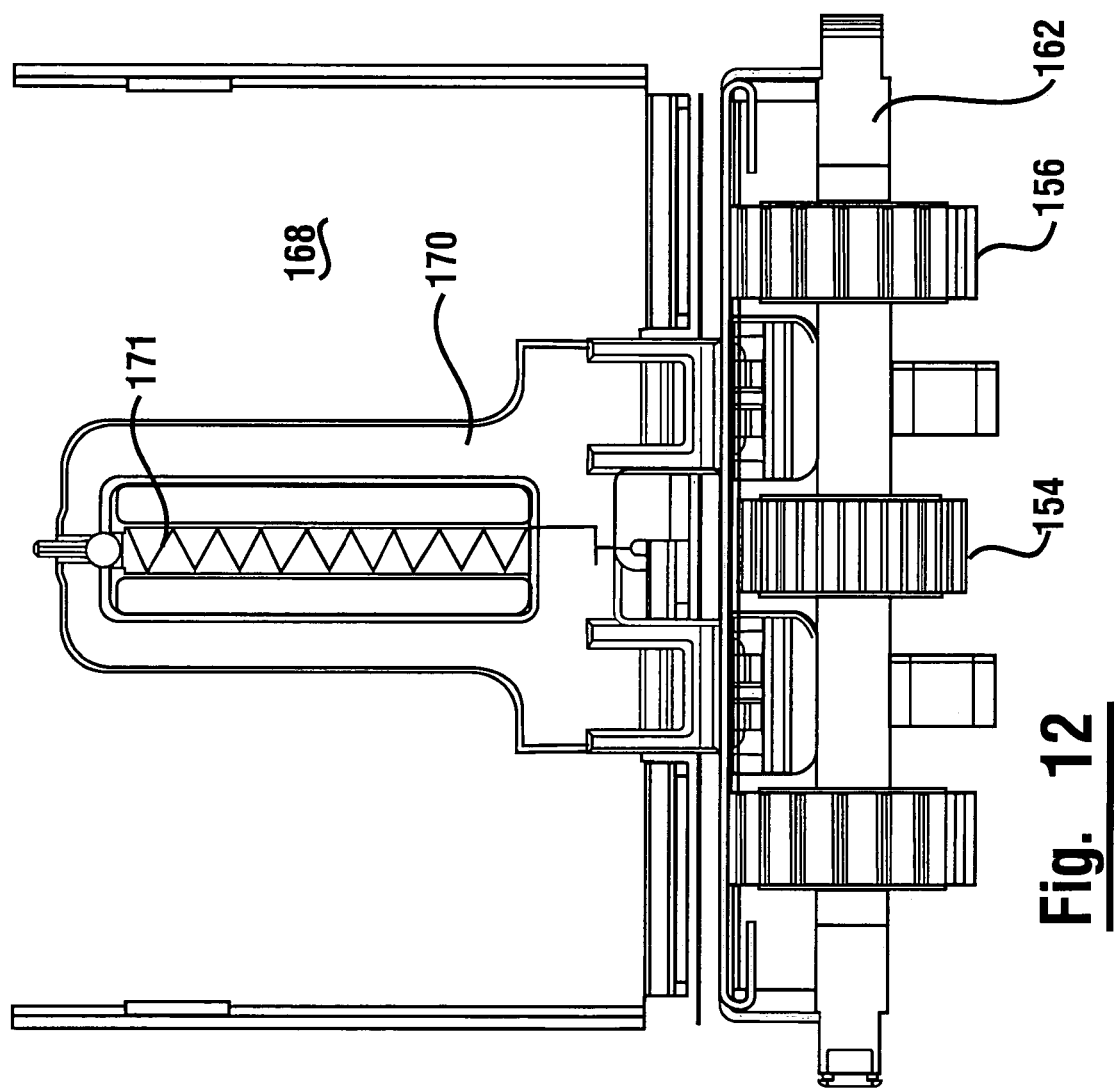
FIG. 12 is an end view of the envelope dispensing mechanism.
Figure 13:
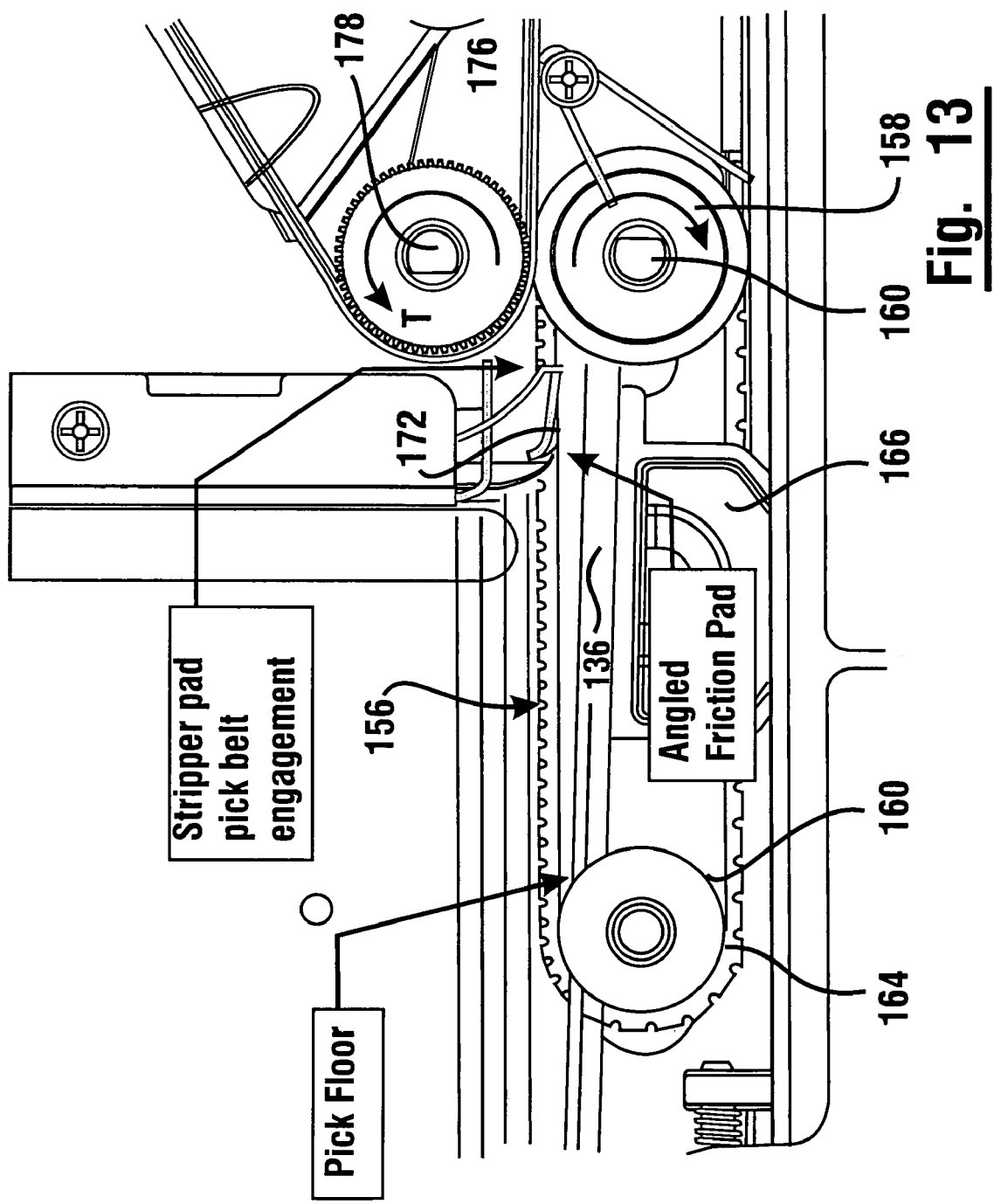
FIG. 13 is a right side view of the envelope dispensing mechanism shown in a position for dispensing an envelope.
Figure 15:
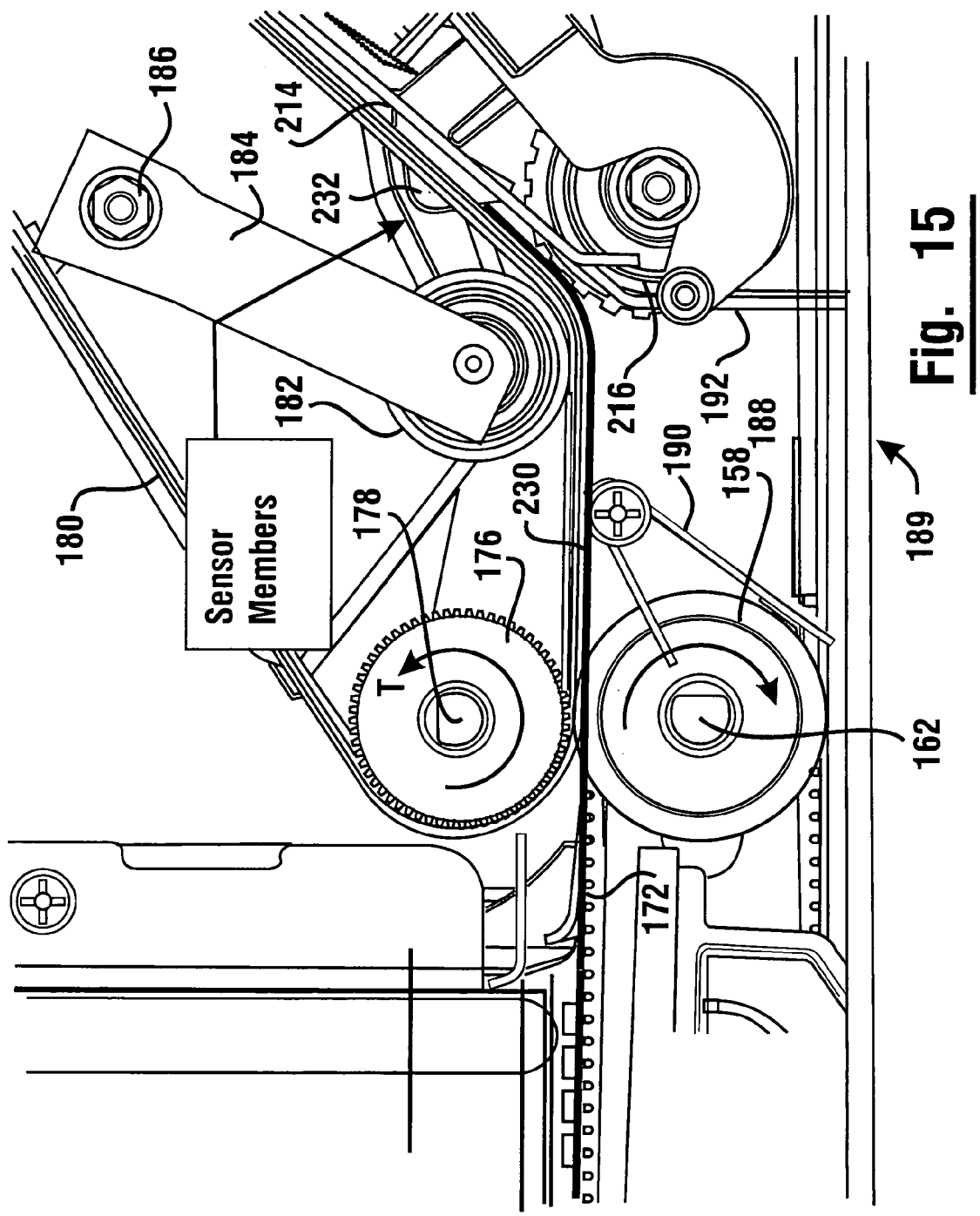
FIG. 15 is a right side view of the envelope dispenser mechanism and transport shown with an envelope that has moved from a position from the supply of envelopes moving in a transport toward a customer.

Bounding the forward side of the envelope storage area 132 is a vertically extending wall 168. Wall 168 has in supporting connection therewith a stripper member 170. Stripper member 170 is movably mounted in supporting connection with wall 168 and is movable responsive to an operatively connected drive. In the exemplary embodiment the stripper member serves as a stripper to generally prevent all but one envelope from being moved from the stack in a spring loaded fashion by a spring 171 which serves as a downward biasing device for purposes that are later discussed. As shown in FIGS. 11, 13 and 15 the stripper assembly includes a pair of disposed angled friction pads 172. In the exemplary embodiment the friction pads 172 are comprised of resilient material and are angled so as to provide a resilient strip surface that extends somewhat further downward with increasing distance from the stack. Further, it should be noted that in the exemplary embodiment that the end of floor member 136 that is disposed the furthest from pivot 146 extends forward so that slots therein extend beneath the resilient strip surfaces friction pads 172. In the exemplary embodiment the friction pads 172 are selectively movable in a spring loaded fashion with the stripper assembly 170.

In the exemplary embodiment shaft 162 has mounted thereon a pair of pinch rolls 174. Pinch rolls 174 are in abutting aligned relation with transport drive rolls 176 (see FIG. 13) which rotate on a shaft 178 which is driven by a drive (not shown). Transport drive rolls 176 are driven in the direction of Arrow T as shown in FIGS. 13 and 15 during the envelope dispensing operation. Transport drive rolls 176 each have supported thereon a transport belt 180. The movement of transport drive rolls 176 and transport belt 180 is operative to engage and cause the rotation of pinch rolls 174. Because pinch rolls 174 are attached to shaft 162, rollers 158 and the pick belts supported thereon are also driven by the drive which powers the transport drive rolls. Of course this approach is exemplary and in other embodiments other approaches may be used.

Figure 16:
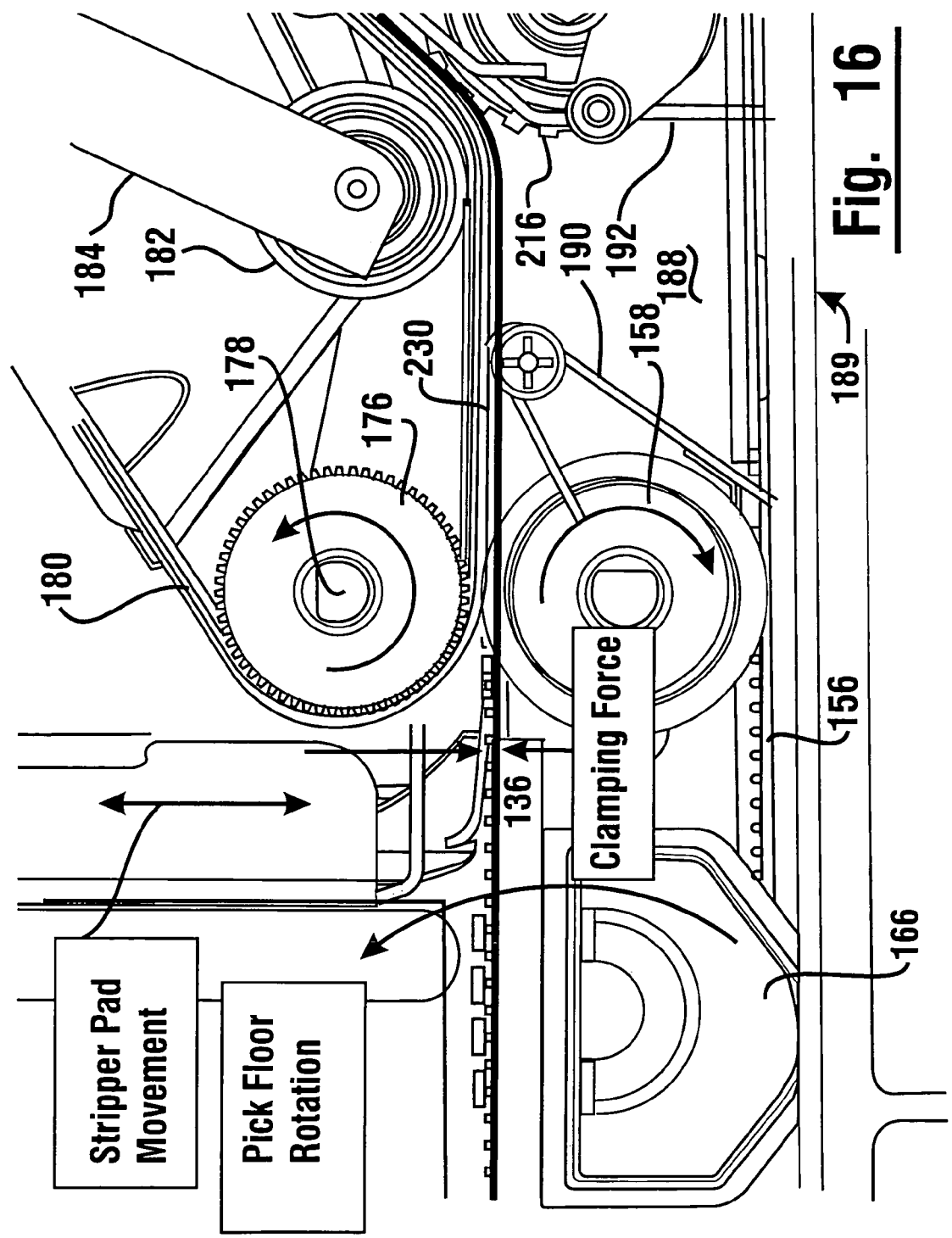
FIG. 16 is a right side view of the envelope dispensing mechanism operating to minimize the risk of additional envelopes leaving the supply with a first picked envelope.

As shown in FIGS. 15 and 16, transport drive belts 180 are in operative connection with a tensioning roll 182. Tensioning roll 182 is mounted on a tension lever 184 which is in operative connection with a spring or other suitable biasing device to bias the tensioning roll counterclockwise about a pivot 186 shown in FIG. 15. The engagement of the transport belt 180 with the tensioning roll causes the transport belt to extend above a gap 188. Gap 188 extends between guides 190, 192. As later discussed, envelopes being deposited into the machine are moved by the transport belts to the gap 188. Once envelopes are moved through the gap they pass through a deposit envelope opening 189 through the dividing wall into the storage area within deposit holding container 128.

Figure 17:
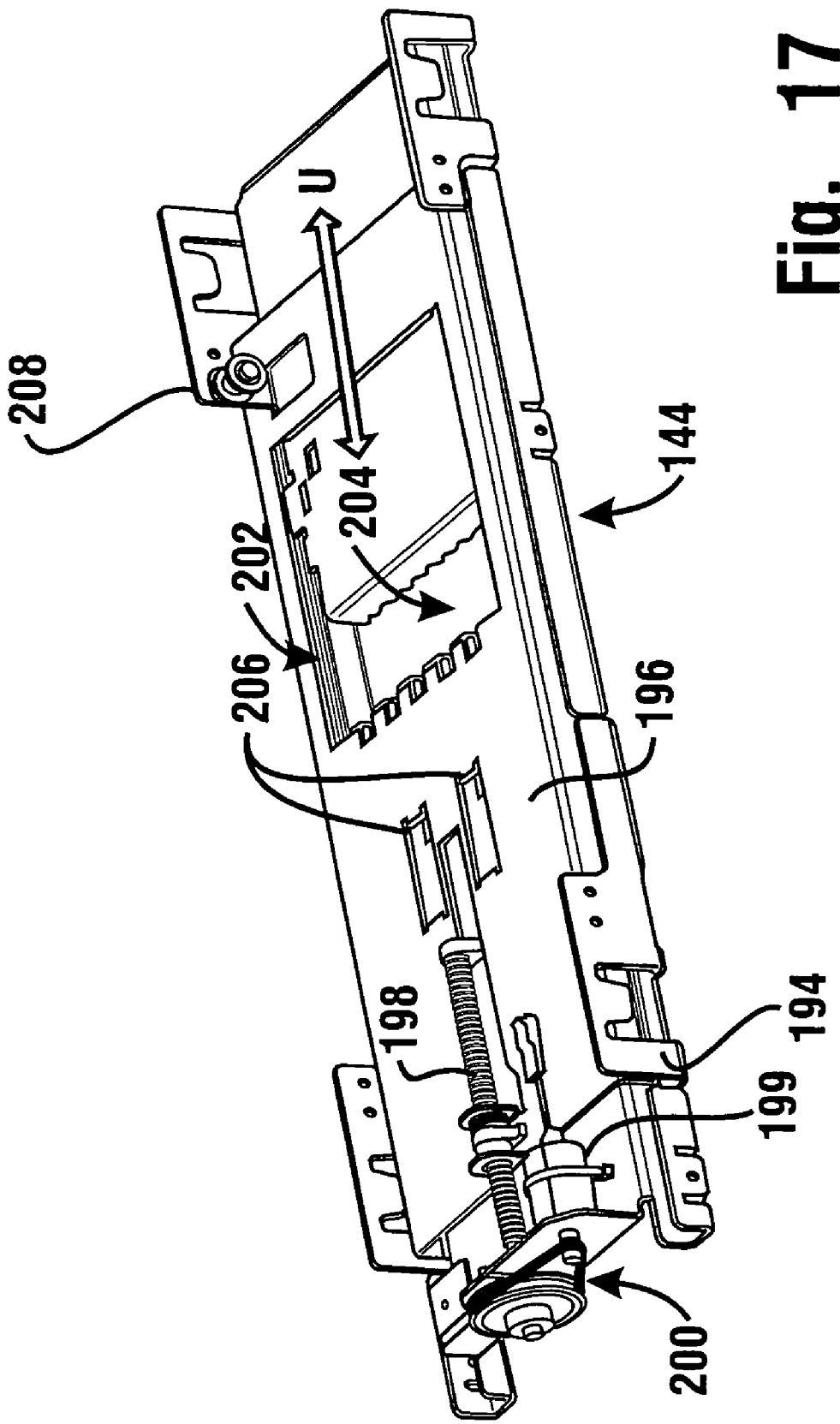
FIG. 17 is a schematic view of a base assembly used in conjunction with the exemplary deposit accepting mechanism.
Figure 18:
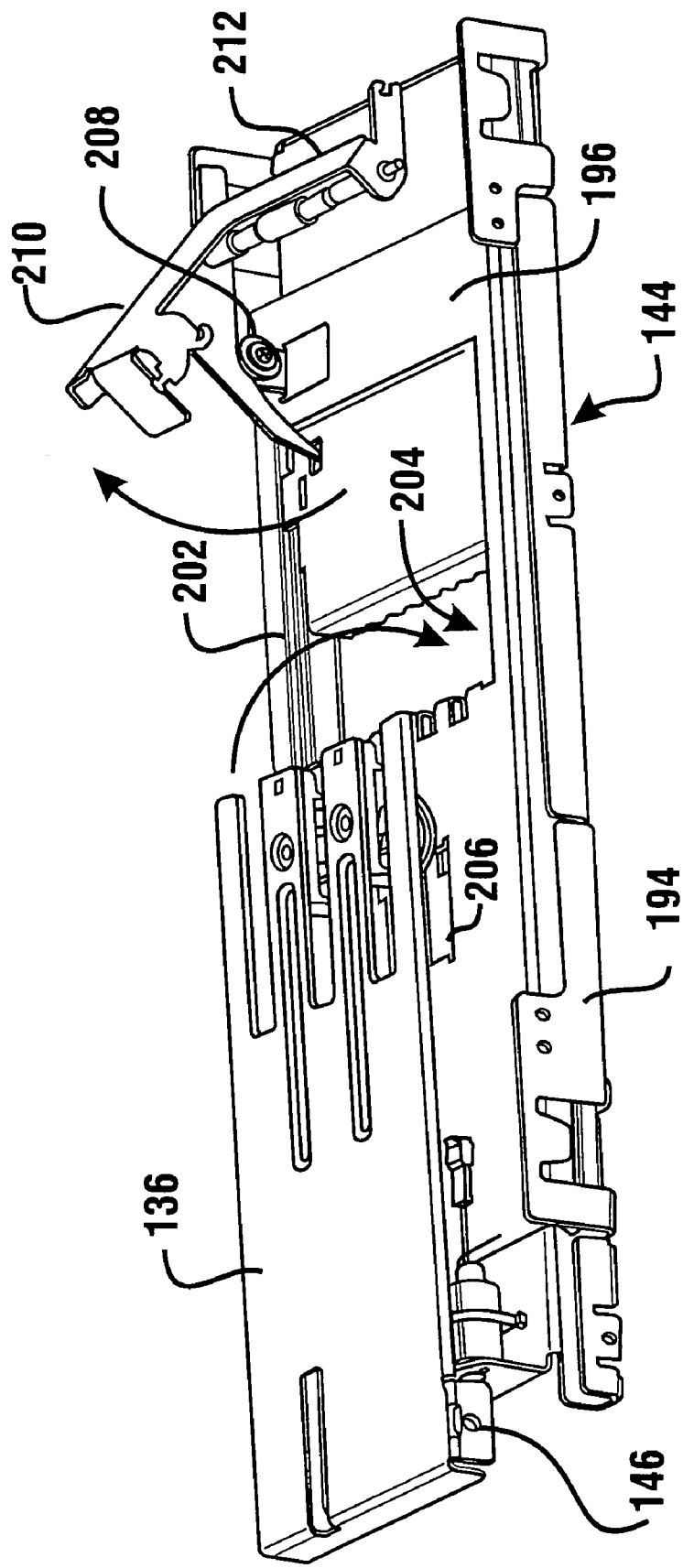
FIG. 18 is an isometric view further showing the base assembly and envelope supply for and printhead tending actuator arm used in an exemplary embodiment of the envelope dispensing mechanism.

As shown in FIGS. 17 and 18, base 144 includes a tray portion 194 and a baffle 196 which is alternatively referred to as a plate. Baffle 196 is movably mounted in supporting connection with the tray portion so as to be slidably movable thereon along the direction of Arrow U in FIG. 17. In the exemplary embodiment baffle 194 is moved by a drive screw 198 which is selectively driven responsive to the controller in either rotational direction by a drive 199 and pulley assembly 200.

Baffle 196 includes an opening there through 202. The tray portion 194 includes a corresponding opening 204. Tray opening 204 corresponds to the position of the deposit envelope opening 189 in the dividing wall bounding the chest when the mechanism 120 is in an operative position. Tray opening 204 is positioned in generally underlying relation of the gap 188. As can be appreciated through the selective operation of drive 199, the baffle opening 202 may be selectively moved so as to align the opening in the baffle with the opening in the tray. In such circumstances envelopes which pass into the gap 188 are enabled to move into the deposit holding container 128. Likewise when the baffle is moved by the drive so as to have the opening in the baffle disposed from the opening of the tray, access to the deposit holding container is blocked. Thus the portion of the baffle or plate 196 which moves to block access through the gap to the deposit envelope opening serves as a gate.

Baffle 196 further includes therein a pair of cam slots 206. As shown in FIG. 18, cam slots 206 are aligned with and sized to accept cams 166 which extend in underlying relation of the floor member 136. As a result movement of the baffle relative to the tray also enables the floor member to be selectively moved up and down in the area adjacent to the pick belts at an end disposed of the pivot 146. This interconnection causes the supporting floor supporting the envelope stack to move with the portion of the baffle that serves as the gate.

Baffle 196 further has in operative connection therewith an actuating roller 208. Roller 208 in the exemplary embodiment is in operative connection with a cam member which is engaged with a cam portion on an arm 210. Arm 210 is movably mounted to the tray member through a pivot mount 212. (See FIG. 18.) As later explained in detail, movement of the arm 210 through engagement of roller 208 and the cam facilitates maintaining the proper operating condition of the inkjet printhead used in the exemplary embodiment.

As shown in FIGS. 15 and 16, transport belts 180 in the area of tensioning roller 182 extend adjacent to a transport which includes a platen 214. Transport belts 180 are also operative to engage a pair of toothed rolls 216 which extend through openings in the transport platen 214. The toothed rolls rotate in coordination with the transport belts so as to facilitate the movement of envelopes there through.

Figure 19:
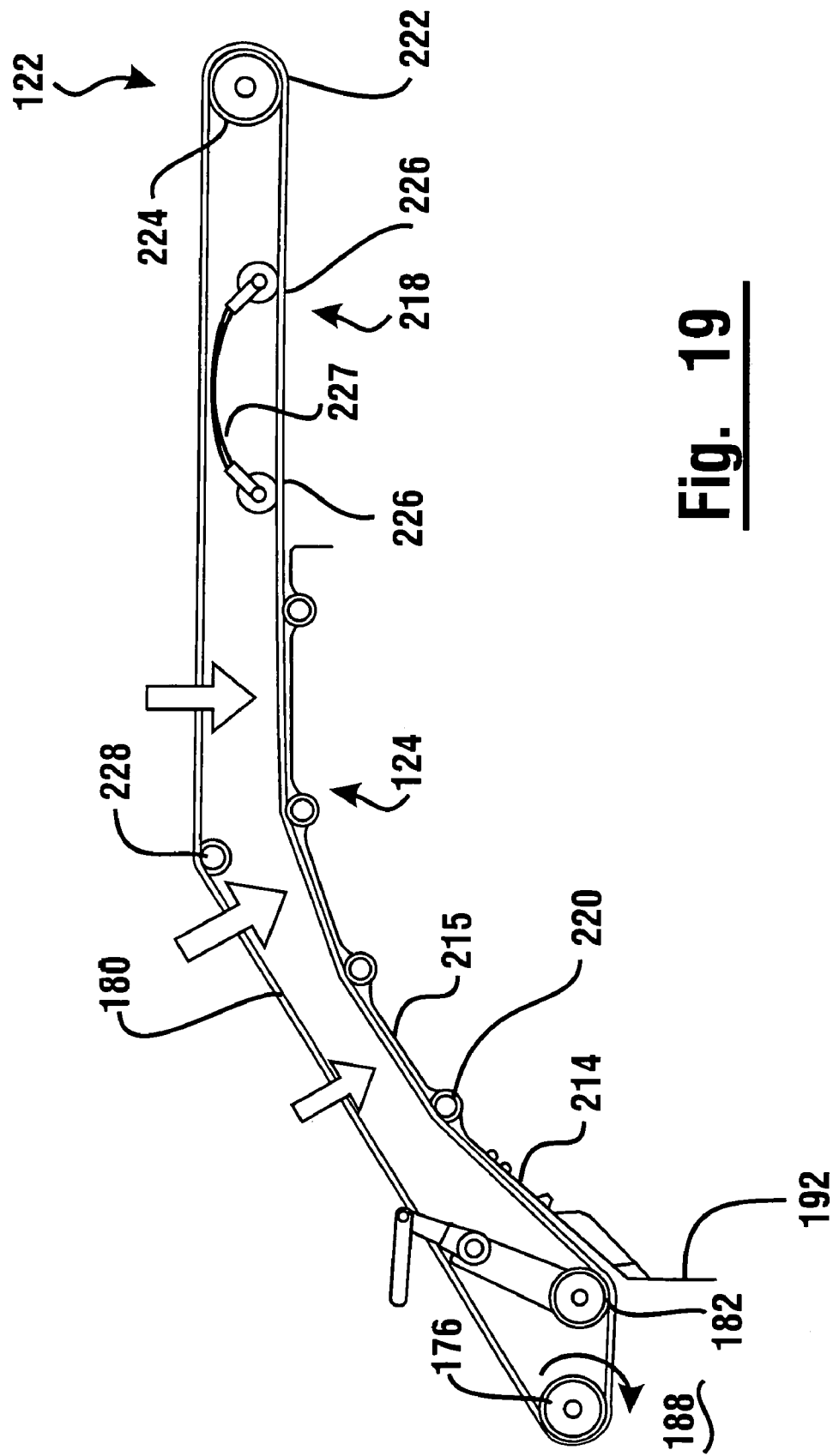
FIG. 19 is a schematic view of a curved portion of an envelope transport used in conjunction with an exemplary embodiment of the deposit accepting mechanism.
Figure 20:
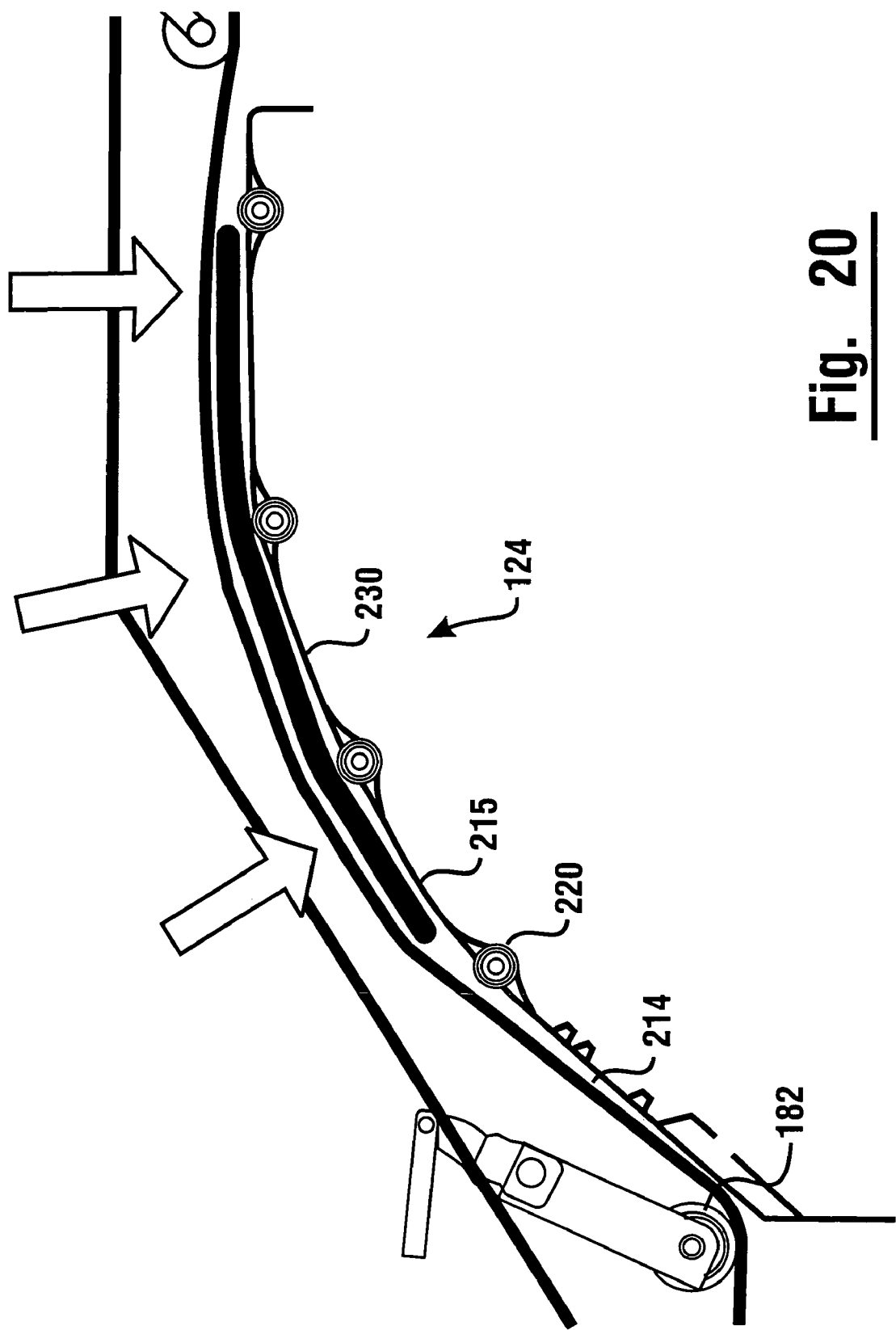
FIG. 20 is a schematic view of the envelope transport portion shown in FIG. 19 with an envelope shown therein and a schematic representation of the forces which act on such envelope.
Figure 21:
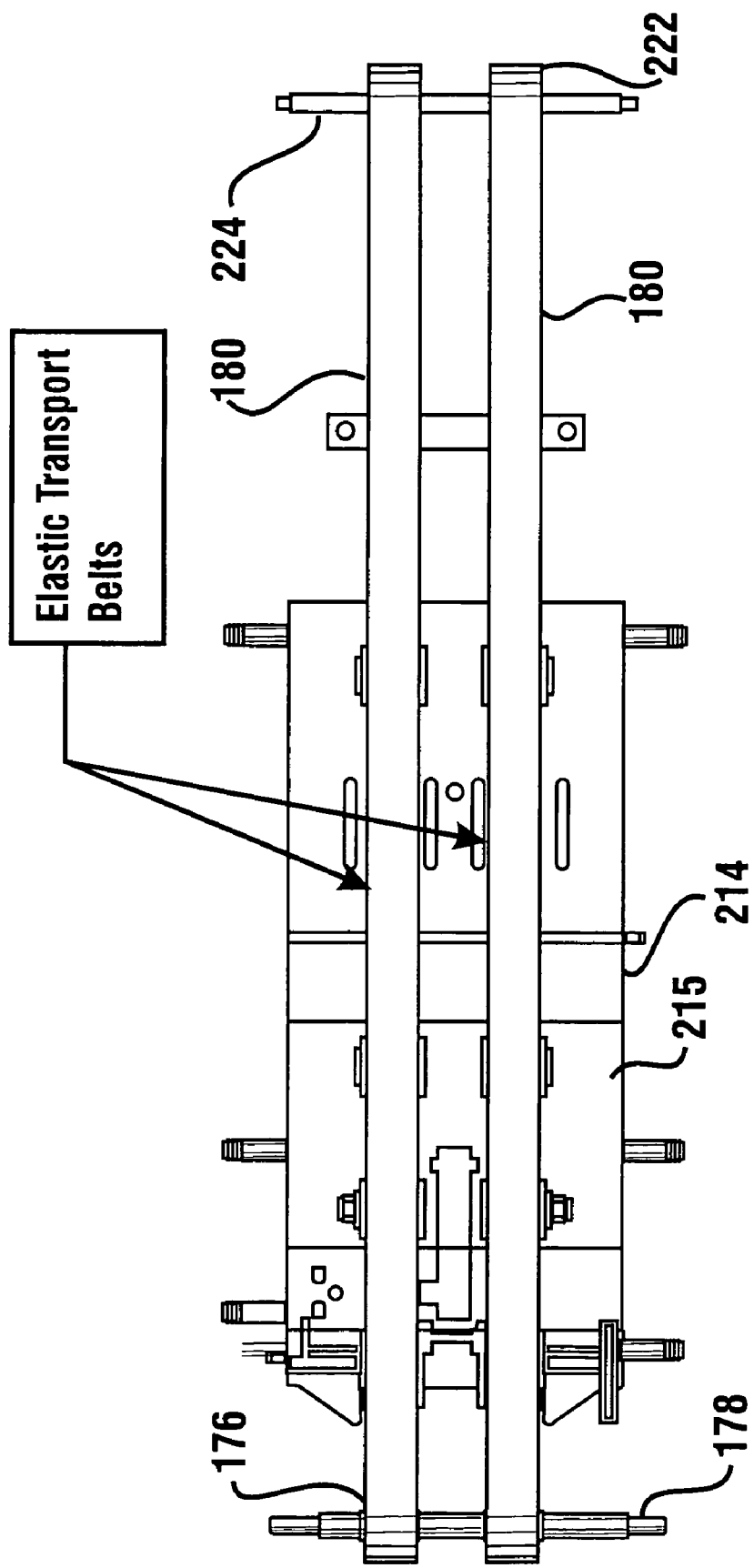
FIG. 21 is a top plan view of the transport shown in FIG. 20 along with the transport belt and rollers used in conjunction therewith.

As represented in FIGS. 19-21, transport platen 214 in the exemplary embodiment has a surface that has a curved portion and which extends to a delivery section 218 that extends adjacent to the outer end 122 of the transport. Platen 214 includes an item supporting surface with a curved portion 215 through which a plurality of aligned openings which serve as apertures through which freely rotatable belt support rollers 220 extend. The belt support rollers 220 are positioned such that the transport belts 180 move in overlying relation thereof.

In the exemplary embodiment elastic transport belts 180 are journaled about outlet rolls 222 which rotate on a movable outlet shaft 224 as later explained. Pressure applying rolls 226 are spring biased by leaf springs 227 and serve to maintain downward pressure on the transport belts in the delivery section 216. The biasing action of rolls 182 and 226 serve to bias the adjacent flights of belts 180 toward engagement of curved portion 215. Guide rolls 228 serve to guide the return flights of the transport belts 180 between the transport drive rolls 176 and the outlet rolls 222.

In the exemplary embodiment of the deposit mechanism 120, when the automated banking machine operates to conduct a deposit transaction for a user, the controller operates to dispense an envelope from the envelope storage area 132 and to deliver the envelope to the user of the machine through an opening at the outer end 122 of the transport 124. The envelope dispenser in the ATM is operative to dispense an empty envelope. This is accomplished in an exemplary embodiment by the controller operating the drive 199 so as to cause the cam slots 206 in the baffle 196 to move so that the cams 166 extending on the underside of floor member 136 move downward into engagement with cam slots 206. This causes the pick belts which serve as a picker to extend above the surface of the floor member and the rails, and engage the end envelope bounding the lower end of the envelope stack 207. The motor driving shaft 178 operates to rotate in the direction of Arrow T so that the pick belts 154, 156 urge the bottom end envelope in the stack 207 to move along a first direction toward wall 168. Further, the stripper assembly 170 is disposed downward such that the angled friction pads 172 are disposed downward such that at the side toward the stack they are about one envelope thickness above the plane of the lowered floor member 136 as shown in FIG. 13.

The action of the pick belts 154, 156 urge the lowest envelope to the right as shown in FIG. 13 into engagement with the downwardly angled resilient strip surface on the friction pads. Such engagement resists movement of the envelope by engaging the side of the envelope opposed of the pick belts and generally causes the lowermost end envelope bounding the stack to be separated from the stack.

The force of the pick belts and particularly areas of raised knobby tread 234 on pick belts 156 which serve as a cog portion, engage the lower face of the end envelope and force the leading edge thereof into the nip formed by drive belts 180 supported on rollers 176 and pinch rolls 174 which are rotated on shaft 162. Engagement of the leading edge of a lowermost envelope in the nip formed by the rolls causes the envelope to move with the belt flights across the gap 188 and into engagement with the toothed rolls 216.

Figure 14:
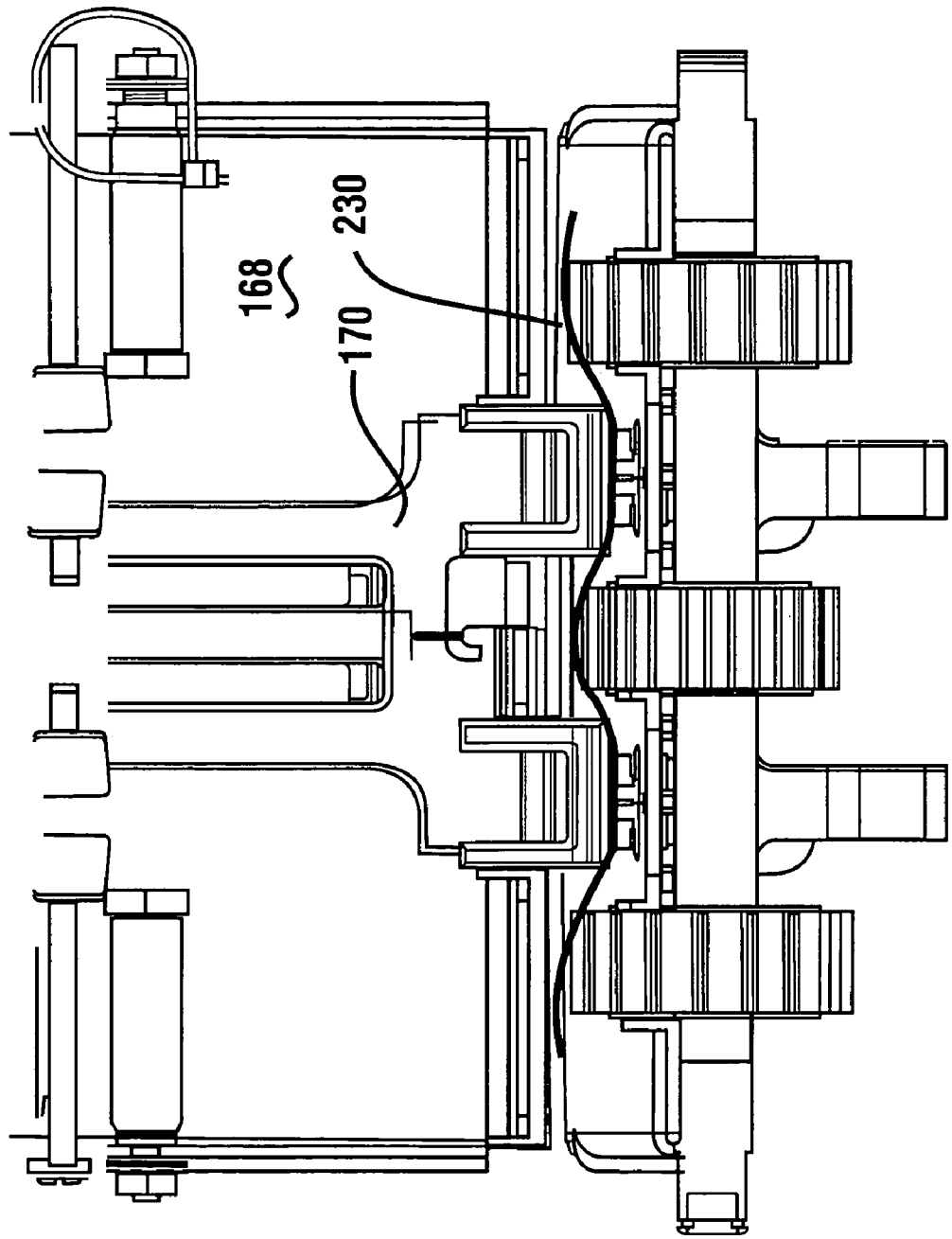
FIG. 14 is an end view of the envelope dispensing mechanism shown in a position dispensing an envelope.

As best shown in FIG. 14, the exemplary configuration of the stripper member 170 and the angled stripper pads 172 achieve imparting a waffle configuration to the lowermost envelope 230. The deformed configuration of the envelope further helps to facilitate separation of the lowermost envelope in the stack from other envelopes.

A further feature of the exemplary dispenser mechanism for empty envelopes is that empty envelopes containing features for sealing of the envelopes by an ATM user may be accommodated. For example, empty envelopes that include peel-off strips may be positioned in the empty envelope holding container with such peel-off strips facing downward toward the floor support. As generally such peel-off strips covering the adhesive are at the transverse margins of the envelopes, the envelopes can be moved by engagement with the pick belts without engaging the peel-off strips. This enables the envelopes to be picked without damaging the peel-off strips and without encountering significant differences in frictional properties which may result in skewing of the envelopes and jams. Such envelopes with peel-off strips may be desirable, as it eliminates the need for users to lick or otherwise apply moisture to deposit envelopes to seal them after materials have been placed therein. Alternatively, other types of sealing approaches may be used with regard to empty deposit envelopes. These may include, for example, fold-out flaps or other approaches to exposing adhesive material that is used to seal the envelope once materials have been placed therein by a user. The exemplary dispensing mechanism, with the belt flights and cog portion which serve as a picker and angled overlying resilient surfaces which serve as a stripper, are well adapted for individually separating such envelopes. Of course the construction described is exemplary and in other embodiments other approaches may be used.

As shown in FIGS. 15 and 16, as the picked envelope 230 moves with the transport belts 180 over the gap 188, the leading edge of the envelope engages rotating toothed rolls 216. The toothed rolls direct the leading edge of the envelope to be engaged between the surface of the transport platen 214 and the opposed platen surface facing flights of the transport belts 180 adjacent thereto. An envelope sensor 232 comprises movable members that extend through a plurality of slots in the platen and is positioned to sense the leading edge of the envelope in connection with the transport belts adjacent to the platen. In response to such sensing of the envelope, the controller in the exemplary embodiment is operative to cause the baffle 196 to translate relative to the tray portion and to cause the cams 166 to move out of the cam slots 206. This raises the floor member 136 upward in the area of the friction pads 172. In the exemplary embodiment because the stripper 170 is mounted in biased relation relative to the wall 168, a downward clamping force is applied to the picked envelope as it continues to move out of the stack as a result of the driving force imparted thereto by the transport belts and pinch rolls 174. In the exemplary embodiment this clamping force on the moving envelope is further operative to assist in separating the end envelope at the bottom of the stack from other envelopes when they tend to be pulled along with the picked envelope. Further, the raising of the floor member 136 is operative to cause the rails on the surface of the floor member to again be disposed above the moving pick belts. This disengages the pick belts from further envelopes in the stack and reduces the risk that additional envelopes will be picked.

Once the picked envelope 230 has moved from the stack such that it has cleared the pinch point formed by the transport belts and pinch rolls 174, the envelope is moved in engagement with the transport belts between the surface of the transport platen 214 and belt support rolls toward the outlet rolls 222. As this occurs the gate adjacent to the opening in outer end 122 is opened in a manner later explained, and the envelope is driven until the envelope is sensed by sensors as extending through the opening and available to the customer, at which time the controller ceases further movement of the transport belts.

The exemplary embodiment of the envelope dispensing mechanism is useful in that envelopes are reliably stripped both by the stripping action of the angled friction pads as well as the wavelike waffle contour that is imparted to the envelope by the picker and stripper members. Further, reliable stripping of the lowest end envelope from other envelopes in the stack is generally assured by the clamping action which occurs as a result of raising the floor member 136 after the envelope has moved away from the stack a sufficient distance.

A further useful aspect of the exemplary embodiment is that the stripper member is spring biased but movable in response to excessive thickness. Thus if for some reason a substantial quantity of envelopes cannot be separated from one another, the entire stack may be moved outward past the stripper member and through the transport to the user. This avoids malfunctions and placing the machine out of service when such conditions occur. In the exemplary embodiment the stripper is operative to allow approximately 3.5 millimeters of envelope thickness to pass through without jamming. This represents a substantial number of envelopes and may reduce the risk of a machine malfunction.

A further useful aspect of the exemplary embodiment previously discussed, is that the mechanism is operative to handle envelopes that have wax peel-off strips on the sides or edges of the envelope. Such peel-off strips may be loaded into the envelope storage area with such strips facing in a downward direction. As the exemplary embodiment does not include any resilient engaging surfaces which apply opposing forces and which may contribute to such peel-offs coming off the envelope during separation of the end envelope from the stack, each envelope may be moved with the peel-off strip intact on the underside of the envelope to a user.

Figure 10:
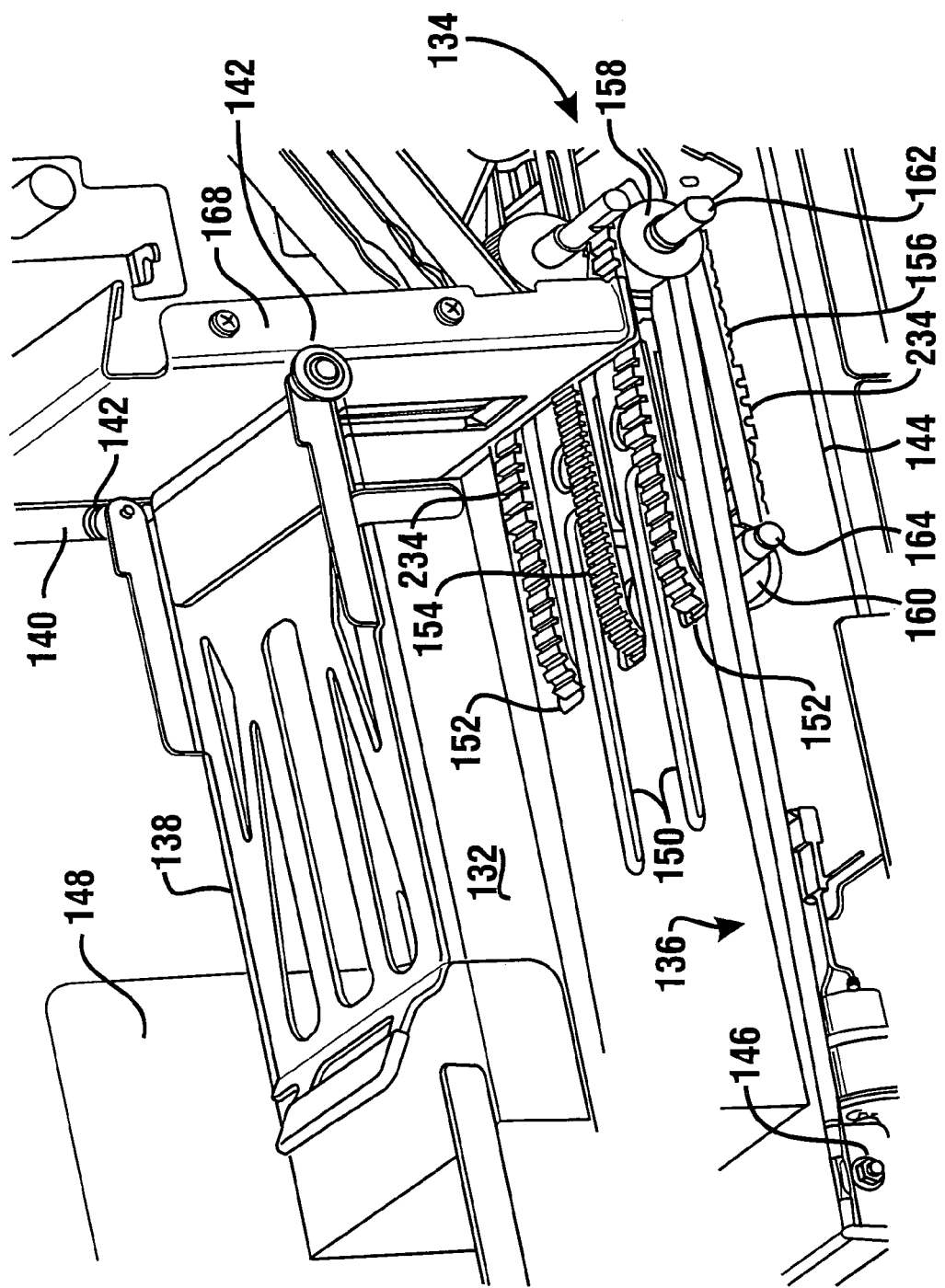
FIG. 10 is an alternative isometric view of the envelope dispensing mechanism.

A further useful aspect of the exemplary embodiment is that the pick belts include raised segments 234 which serve as a high force cog portion. As best shown in FIGS. 10 and 11, the raised segments on pick belts 156 are comprised of enlarged knobby tread portions which extend higher than the surrounding tread. In the exemplary embodiment the raised segments 234 are arranged on pick belts 156, 180 degrees apart. These cog portions provide additional friction and pushing force so as to move the lowermost envelope from the stack.

A further useful aspect employed in the exemplary embodiment to facilitate the picking of envelopes is the use of the stepper motor for driving the rolls and belts. In the exemplary embodiment the stepper motor is in operative connection with control circuitry which in response to the controller causes the stepper motor to operate in an oscillating fashion. In some embodiments the motor may operate in a vibratory manner with vibration frequency but which always has a desired net forward drive on the envelope. This results in vibration with desired forward or backward movement which further helps to separate envelopes from the envelope stack. For example in an exemplary embodiment the controller may be programmed to determine whether the leading edge of an envelope is sensed as having reached the sensor 232 at a particular time after the effort to pick an envelope is initiated. In response to the controller failing to sense the envelope within the desired time, the controller operates to cause the vibratory action of the motor to be commenced. This vibratory action and the resulting shaking and oscillating motions of the parts in engagement with the envelope is generally operative to cause the lowermost envelope to be picked. Of course it should be appreciated that further recovery routines such as driving the belts and rolls in a back and forth motion as well as moving the baffle back and forth to raise and lower the floor member of the envelope holding bin may also be conducted so as to facilitate end envelope separation.

In an exemplary embodiment the stepper motor or other drive is also used to provide an audible indication responsive to the controller. This is achieved, for example, by the controller operating to drive the stepper motor in a vibratory fashion so as to produce an audible output from the motor and components connected thereto. This may avoid the need in some ATMs for having a separate audible output device. Thus, for example, the controller may be programmed to indicate to a user of the ATM that an empty deposit envelope has been picked and moved through the transport through the deposit opening, and is ready for the user to take. Upon sensing the empty envelope in this position, the controller may cause the stepper motor to be driven to vibrate and provide an audible "beep" or periodic audible signal so as to indicate to the user that they need to take action. Audible signals may also be provided in other circumstances such as to indicate an malfunction. In some embodiments different audible signals may be produced through vibratory action. Of course these approaches are exemplary.

A further useful aspect of the exemplary embodiment is that the floor member 136 generally operates to maintain the lowermost envelope out of engagement with the picking belts during the times that an envelope is not being picked. This helps to maintain a desirable contour for the lowermost envelope so as to facilitate the picking thereof when the floor member is lowered. It should be understood that the features described in connection with picking envelopes may also be applied to picking other types of media such as sheets.

A further useful aspect of the exemplary embodiment is that the portion of the baffle member which serves as a gate is configured so as to maintain security by keeping access to a deposit holding container through the gap 188 blocked at appropriate times while an envelope is being delivered to the user. This further provides additional security so as to minimize the risk that deposited items can be fished out of the container by criminals. Of course many other additional advantages are obtained through the principles employed in the exemplary embodiment.

Figure 22:
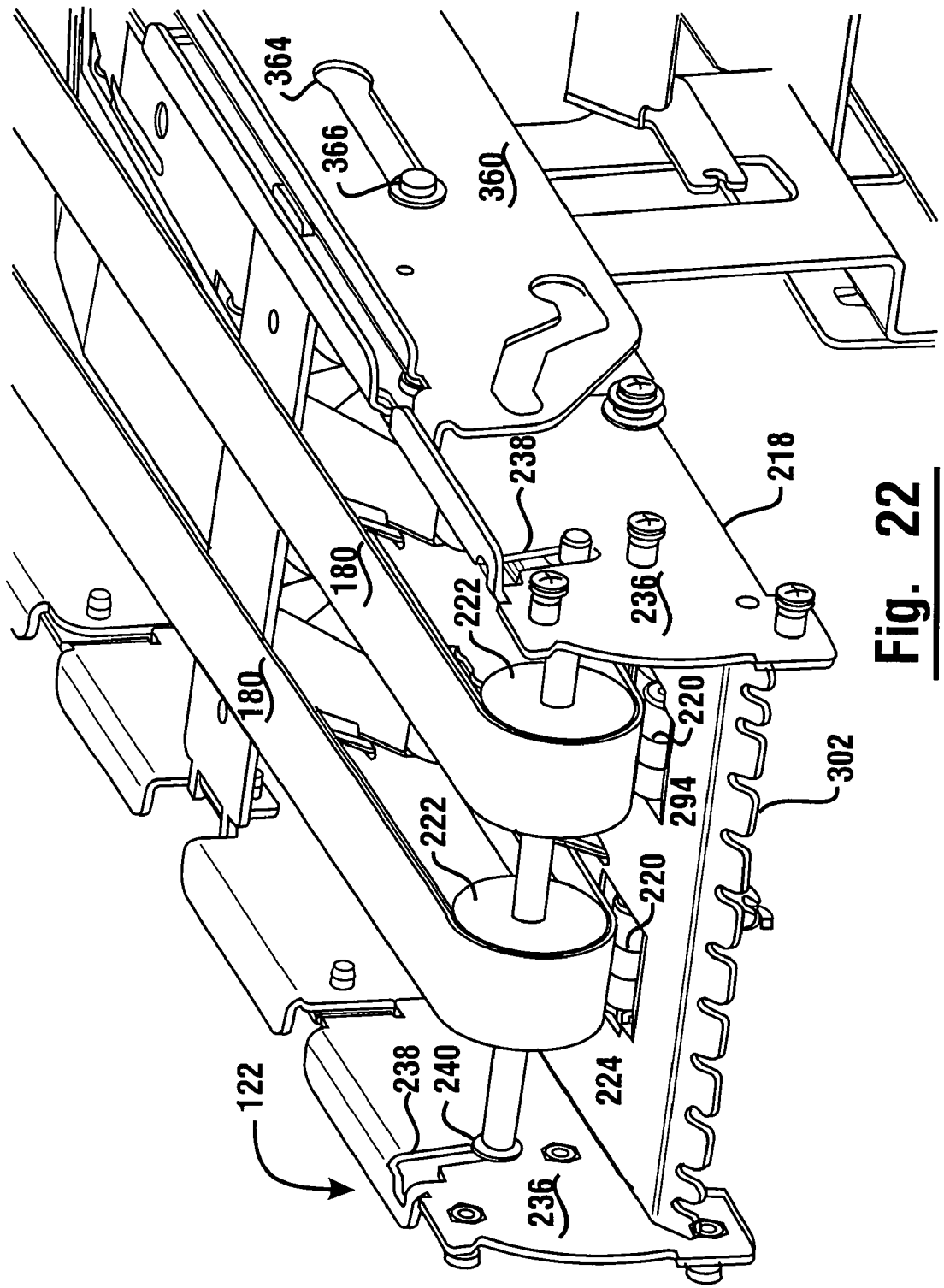
FIG. 22 is an isometric view of features adjacent the outer end of the envelope transport including the belts and rollers adjacent thereto.

In the exemplary embodiment the delivery section 218 adjacent to the outer area 122 is adapted to both deliver empty envelopes to a user from the machine as well as to accept envelopes for deposit into the machine. Such accepted envelopes may have uniform or non-uniform contours. As shown in FIG. 22, outlet rolls 222 are supported on outlet shaft 224. In the exemplary embodiment the elastic transport belts 180 extend around the outlet rolls 222. Belt support rolls 220 extend through openings in a base surface of the platen in the delivery section and are in abutting relation with the outlet rolls 222 when an envelope is not extending in between.

In the exemplary embodiment the delivery section 218 includes side walls 236 which transversely bound the transport. Side walls 236 include therein generally upward extending angled slots 238. The angled slots 238 are sized so as to accept the opposed ends of an outlet shaft 234 therein in movable relation. Circular guides 240 positioned on the outlet shaft 224 facilitate movement of the outer shaft 224 relative to the slot. Further, in the exemplary embodiment angled slots 238 are angled such that the tension applied by the elastic transport belts 180 is operative to bias the outlet rolls 222 and the outlet shaft 224 toward the lower end of the slot. This facilitates maintaining the transport belts and rolls in engagement with the envelope.

Figure 23:
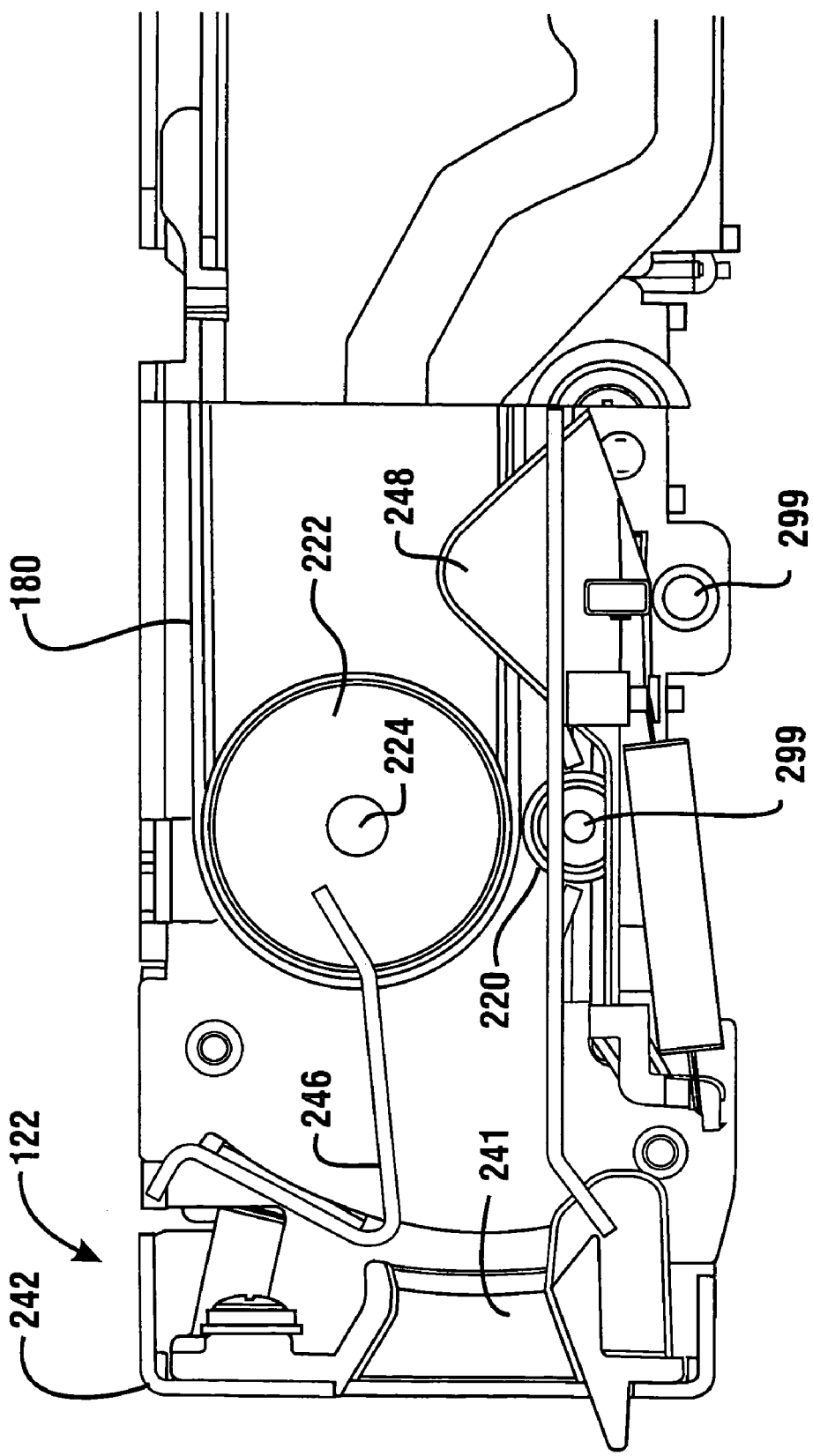
FIG. 23 is a right side schematic view showing the outer portion of the transport including a gate in an open position enabling items to be delivered from or deposited into the transport.
Figure 25:
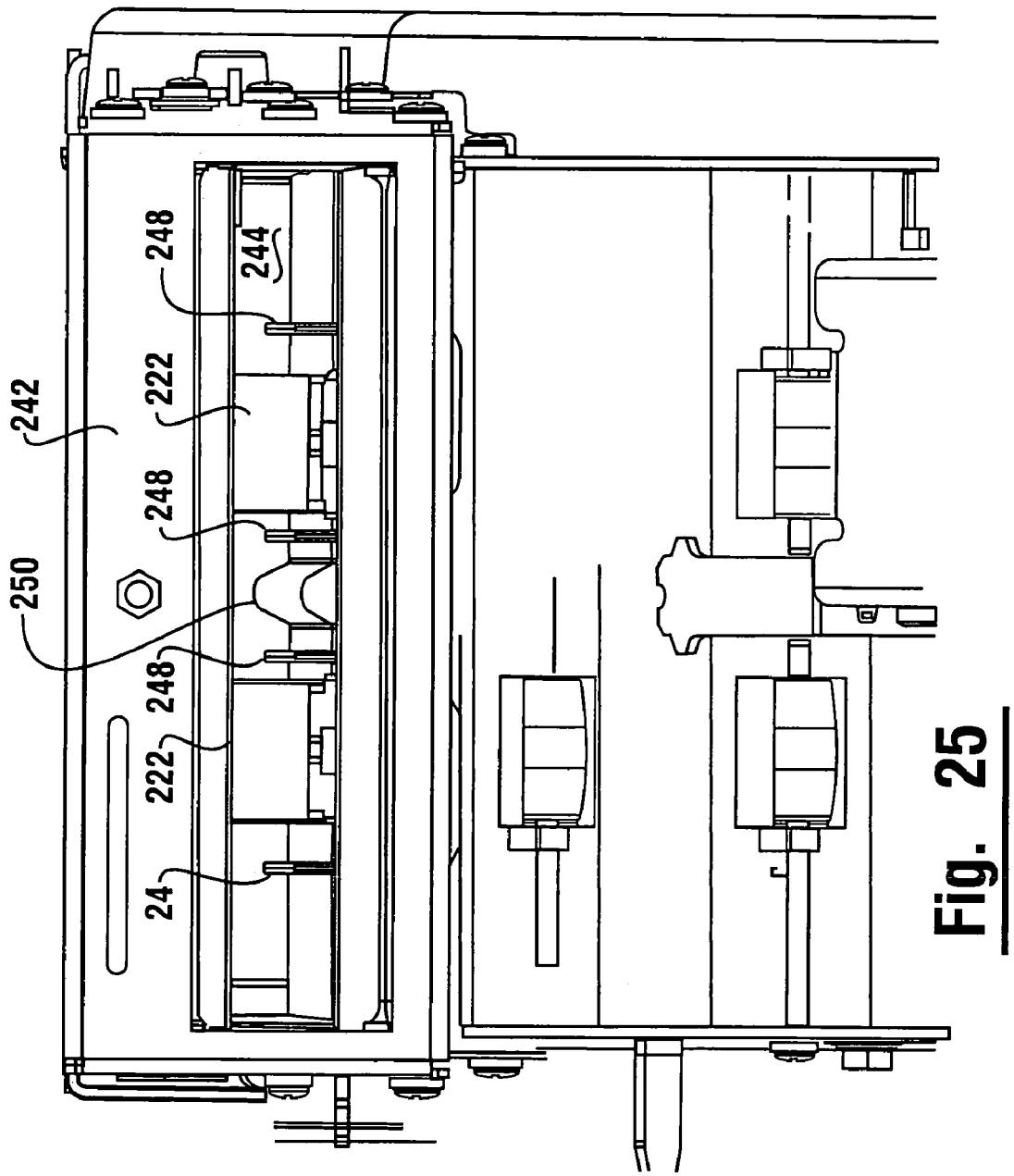
FIG. 25 is a front plan view of the outer end of the transport including the gate associated therewith shown with the gate in an open position.

As shown in FIG. 23, in the exemplary embodiment the outer end 122 of the transport is provided with a cover housing referred to herein as a bezel 242 which includes an opening 244 therein through which envelopes pass to and from a user. The bezel 242 is operatively connected to the delivery section 218. Further movably mounted in underlying relation of the bezel of the exemplary embodiment is a movable gate member 246 which is later discussed in detail. In FIG. 23 the gate member 246 is shown in an open position. As shown in FIG. 23, a sensor 248 is provided within the transport inboard of the outlet rolls 222. In the exemplary embodiment sensor 248 comprises a plurality of movable members or fingers that are movable and extend through transversely disposed slots in locations across the transport. The members move in the slots in response to the presence or absence of envelopes in that position. FIG. 25 shows the plurality of sensor members associated with sensor 248 disposed in areas across the transport. Further, the nature of the sensor members further assists in helping to move the envelopes by reducing surface tension between the envelopes and the base of the transport. In the exemplary embodiment, the sensor members are in operative connection with an electrical switch, photo interrupter, or other sensor which provides a suitable signal to the controller. A central rib 250 is also provided adjacent the outlet to reduce surface tension and facilitate envelope movement.

Figure 24:
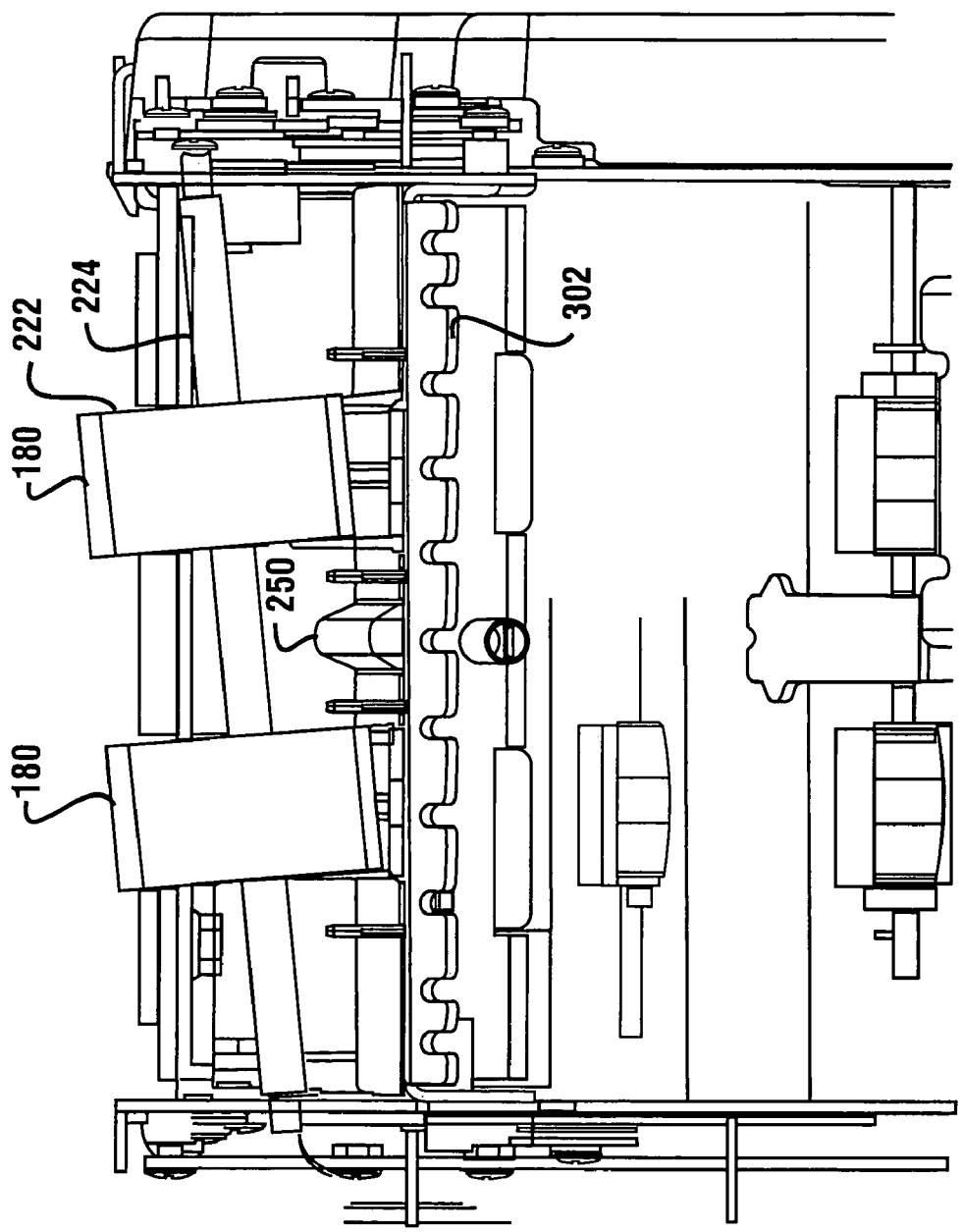
FIG. 24 is a schematic view showing the translation of rollers adjacent to the outer end of the transport which may occur due to the acceptance of the regularly shaped deposited items.
Figure 26:
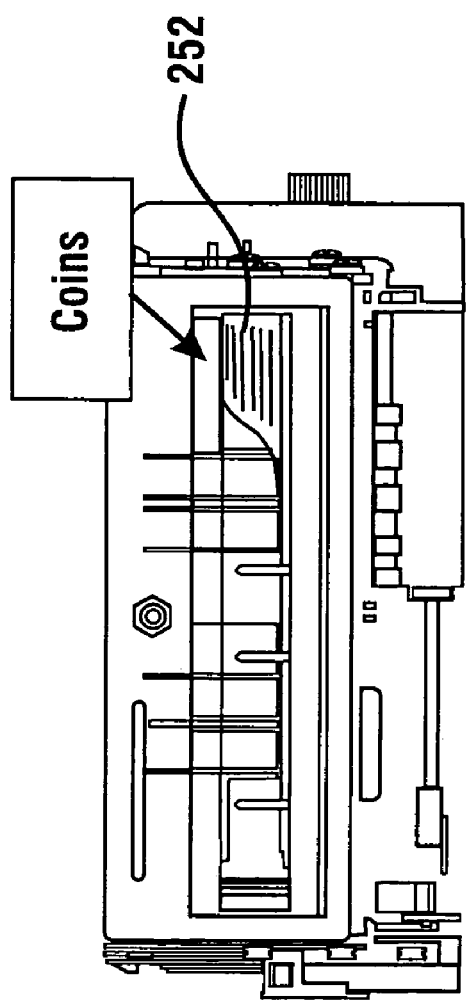
FIG. 26 is a schematic view of the outer end of the transport showing acceptance of an irregularly shaped deposit envelope including coin.
Figure 27:
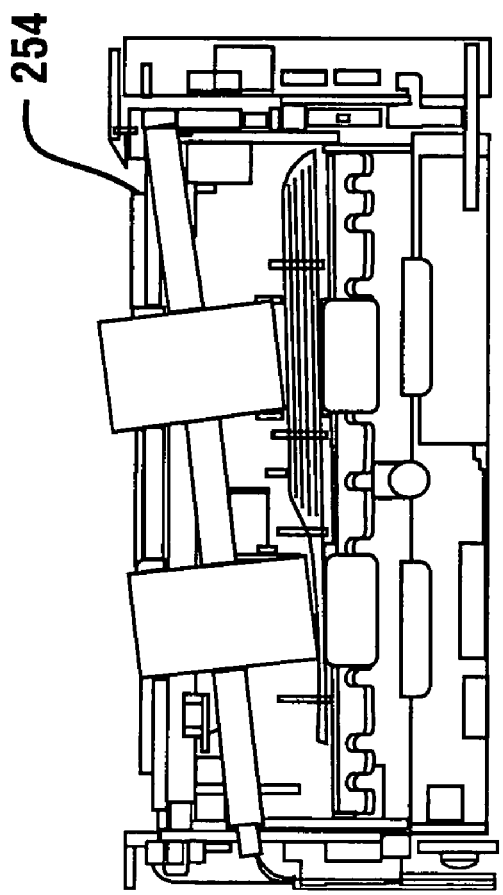
FIG. 27 is a view of the outer end of the transport showing acceptance of an irregularly shaped deposit envelope including sheets and the displacement of the roller shaft associated with such acceptance in a manner similar to that shown in FIG. 24.

FIG. 24 is representative of the useful properties of the exemplary mounting provided for outlet shaft 224 and outlet rolls 222. The ability of the shaft to move in the angled slots 238 responsive to envelopes of varying thickness facilitates the ability thereof to conform the height of the envelopes so that the transport belts 180 may engage the envelopes sufficiently so as to move the envelopes therein. Further, the elastic nature of the transport belts in combination with the angled slots 238 serves to bias the outlet rolls 222 along with the transport belts into engagement with the envelopes. FIG. 26 shows an exemplary envelope containing coin 252. In envelope 252 the coin is shown disposed to one side of the envelope. The clearance provided within the transport enables this coin containing envelope to be moved by the transport belts into the transport. An alternative envelope is shown within the transport in FIG. 27. This envelope 254 contains folded notes which enter the transport and underlie the outlet rolls 222. As represented in FIG. 27, the outlet rolls and the transport belts supported thereon are enabled to move so as to allow the envelope to pass while remaining in engagement with the envelope. This generally enables the envelope to be transported without tearing or breaking open.

Further, as can be appreciated in FIGS. 19 and 20, the displaceable character of the pressure applying rolls 226 which in the exemplary embodiment are mounted to be displaceable on curved leaf springs 227 help to maintain the engagement of the transport belts with the envelopes after the envelope is moved past the outlet rolls 222. Further, the flexible biased mounting of the pressure rolls 226 enables envelopes of varying contours and thickness to pass. In addition, the curved portion 215 of the platen 214 and the forces applied by the overlying transport belts maintain a transported envelope in captured relation between the surface of the platen, belt support rolls and the belts so as to facilitate movement thereof. As represented by the force vector arrows in FIGS. 19 and 20, the force of the belts serves to maintain such engagement. In the exemplary embodiment this enables envelopes of uneven contour to be moved intact to the area of the gap 188 from which the envelopes may pass into the deposit holding container 128. Of course it should be understood that these approaches are exemplary. However, the principles described may be applied in many embodiments to achieve the transport of envelopes or other media or stacks thereof having regular or irregular contours.

Figure 28:
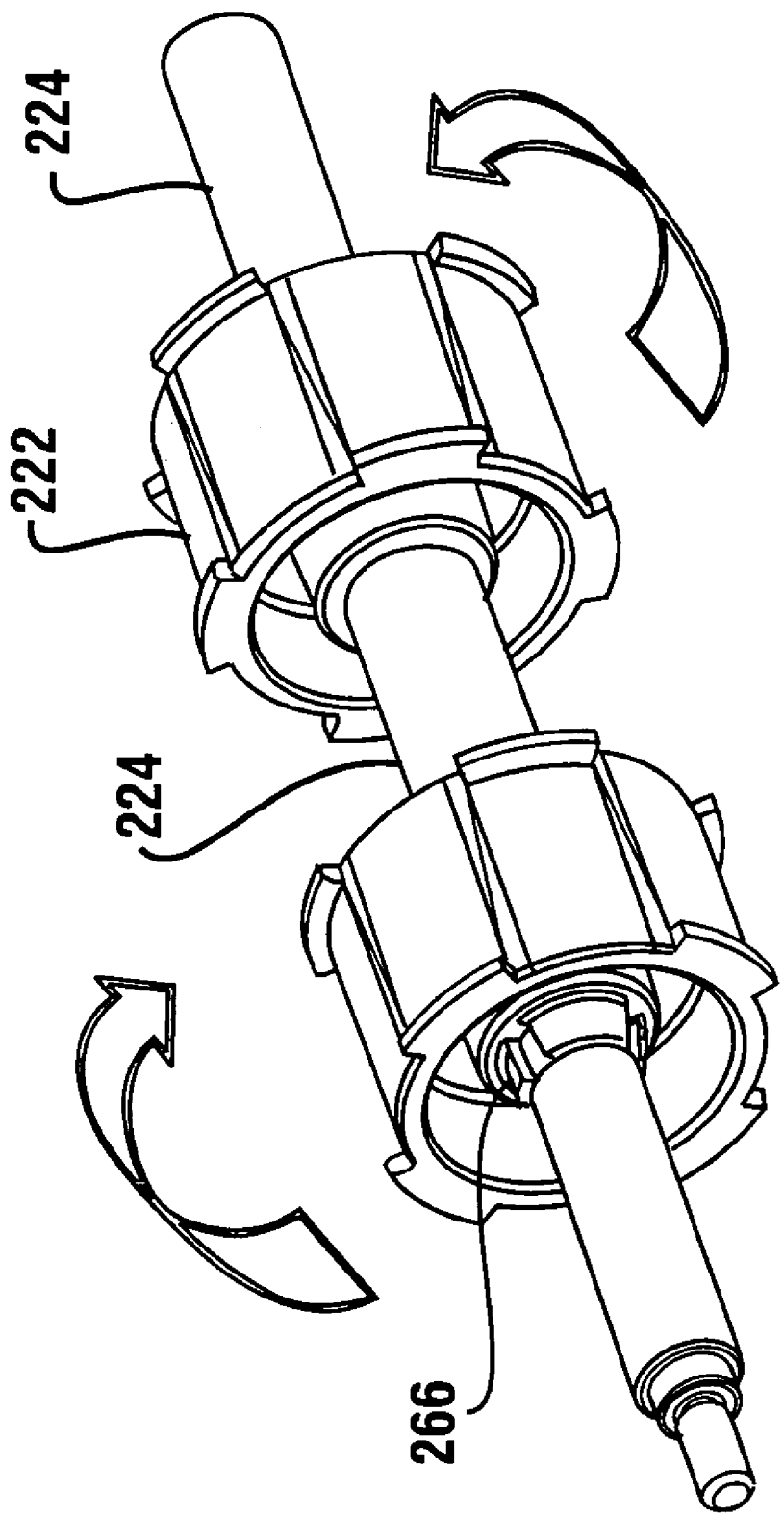
FIG. 28 is an isometric view of rollers and a supporting shaft which may be used in conjunction with an exemplary embodiment of the envelope depository system.
Figure 29:
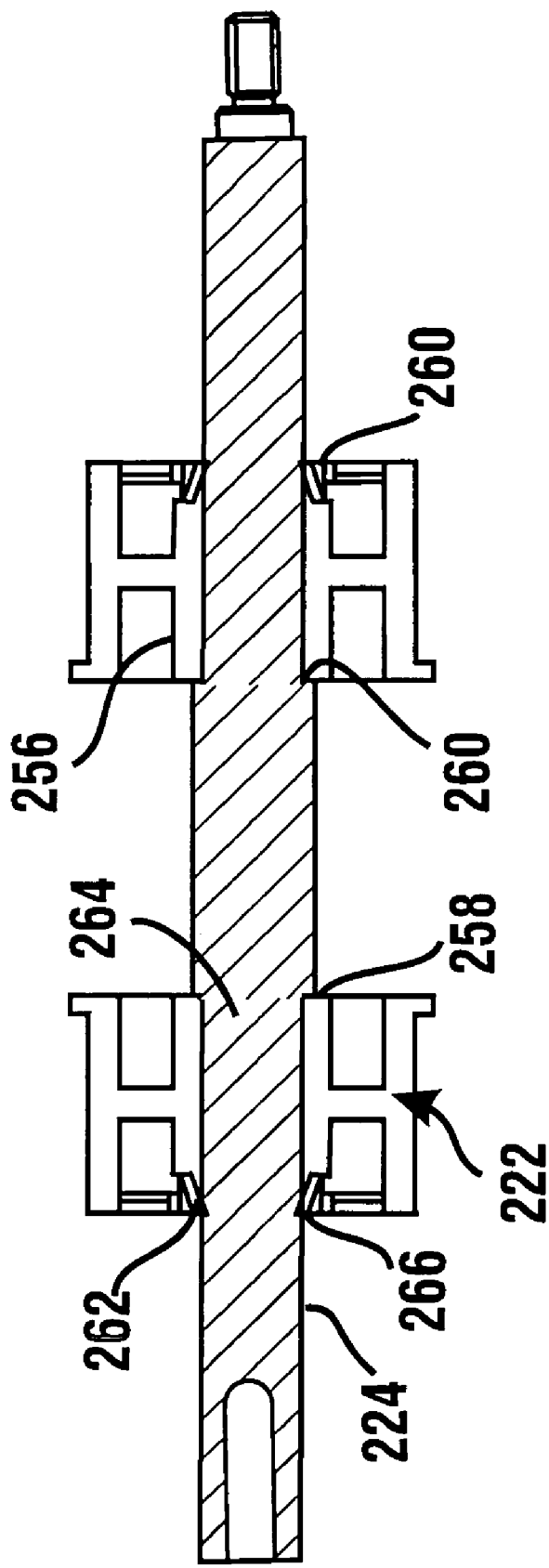
FIG. 29 is a cross-sectional view of the rollers shown in FIG. 28.
Figure 30:
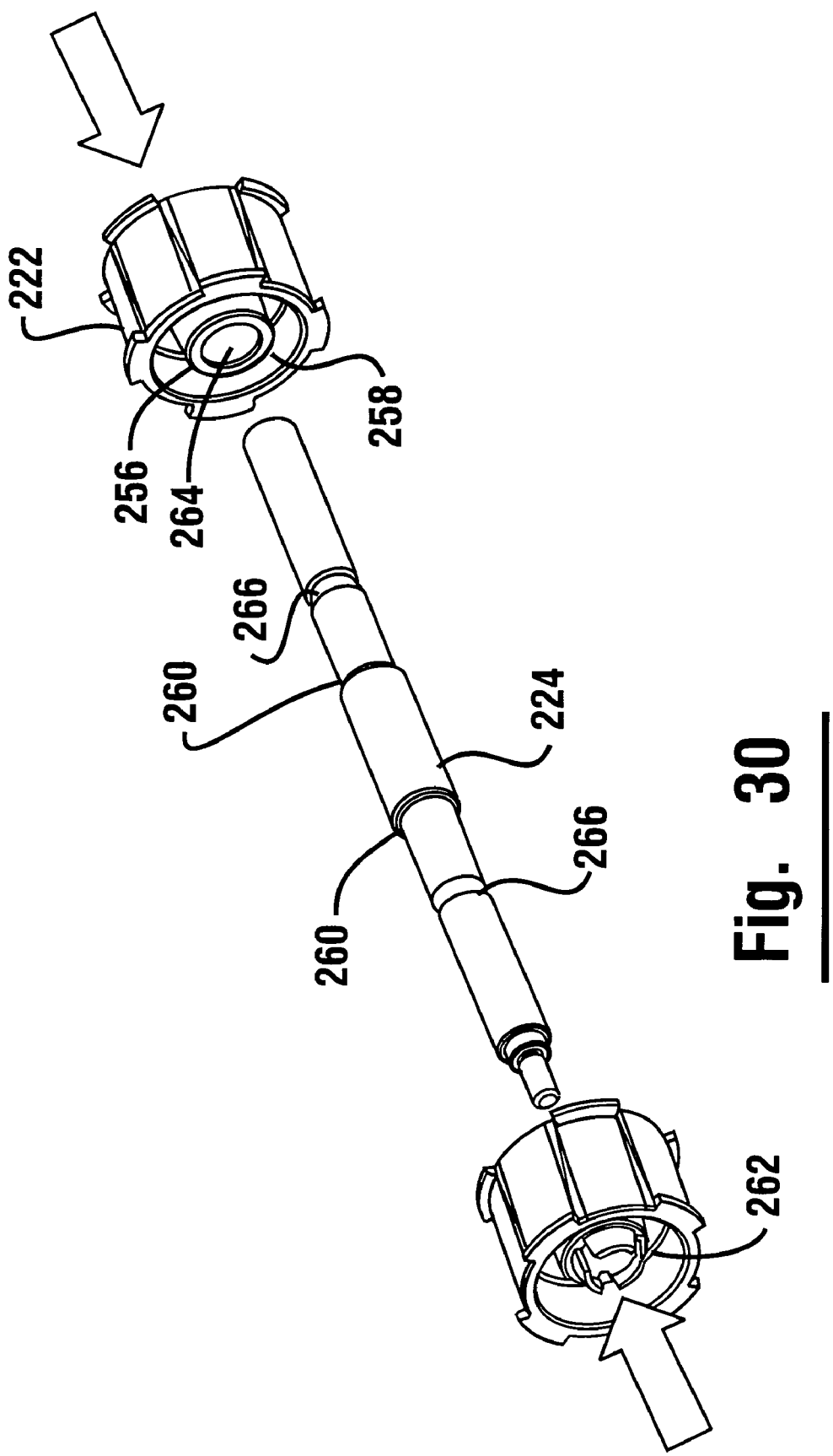
FIG. 30 is a schematic view showing the mounting of the rollers shown in FIG. 28 on the shaft.

In an exemplary embodiment the rolls used for the outlet rolls 222 of the transport and the outlet shaft 224 may have the structures shown in FIGS. 28 through 30. As shown in these Figures the rolls 222 are shown without the crowned outer cover that engages the transport belts when the rolls are in operation. In some exemplary embodiments the outlet rolls 222 are free wheeling relative to the shaft. Further, in some exemplary embodiments it is desirable that the rolls rotate in either direction with low resistance to friction, be readily assembled on the shaft and be reliable in terms of maintaining engagement with and their position relative to the shaft. In the exemplary embodiment this is achieved by the rolls being formed with a body having an integral bushing portion 256. Bushing portion 256 terminates at an inboard end at an annular flat surface 258. The annular flat surface 258 is adapted to engage in slidable relation with a radially extending annular step surface 260 on the shaft. The engagement of the annular flat surface with the radially extending step surface is operative to limit the axial movement of the roller relative to the shaft.

The exemplary bushing portion 256 includes thereon at an opposed annular end from the annular flat surface, a plurality of radially inward extending deformable fingers 262. In the exemplary embodiment the inward extending fingers have outward edges that extend radially inward relative to the bore 264 which is sized to accept the shaft and which extends through the bushing portion. In the exemplary embodiment the inward extending fingers 262 as well as the bushing portion are comprised of generally rigid but resilient material such that the inward extending fingers may deform but quickly reassume their original inward extending contour.

The shaft 224 of the exemplary embodiment includes therein annular recesses 266. The annular recesses 266 are axially disposed from the step surfaces a distance generally corresponding to the axial distance between the annular flat surface 258 and the inward extending fingers 262 of the rolls.

Further, the size and distance between the step surface and annular recesses is such that in some exemplary embodiments the rolls 222 are enabled to readily rotate relative to the shaft when the roller is mounted thereon such that the inward extending fingers are extended into and movable in the adjacent annular recess.

A further useful aspect of the exemplary embodiment is that the rollers 222 may be mounted on the shaft 224 without the use of tools or fasteners. As represented in FIGS. 28 and 30, the rolls are moved relatively axially onto the shaft so that the shaft is extended into the bore 264 of the bushing portion. The inward extending fingers 262 are deformed from their original position temporarily as the roll is moved axially inward relative to the shaft. However, once the inward extending fingers reach the annular recesses 266, the fingers resume their normal shape. This engagement of the fingers within the annular recesses serves to hold the rollers in position relative to the shaft. Further, when the roller is moved axially such that the finger portions engage in the annular recess, the annular flat surface comes into abutting relation with the annular step surface on the shaft. Such engagement prevents further axial movement of the roller which may cause the fingers to move out of the annular recess. Once additional axial force moving the roller is stopped, the engagement of the fingers in the annular recess causes the annular flat surface in the exemplary embodiment to be adjacent to but disposed slightly away from the annular step surface, so as to enable the generally free rotation of the roller relative to the shaft. In this position the annular flat surface 258 of the roller is disposed sufficiently adjacent to the corresponding step surface 260 such that the roller is enabled to freely rotate relative to the shaft but is generally prevented from moving further axially inward by engagement with the step surface. Further, in this exemplary embodiment the tapered contour of the inwardly extending fingers 262 causes forces tending to move the rollers axially outward on the shaft to be resisted by engagement of the outer ends of the fingers with the radially outward extending surfaces on the axially outward side of the annual recesses 266. As can be appreciated, this approach and method provides a ready low-friction mounting for the rollers relative to the shaft and reliable low-friction positioning and rotation of the rollers relative to the shaft.

Figure 31:
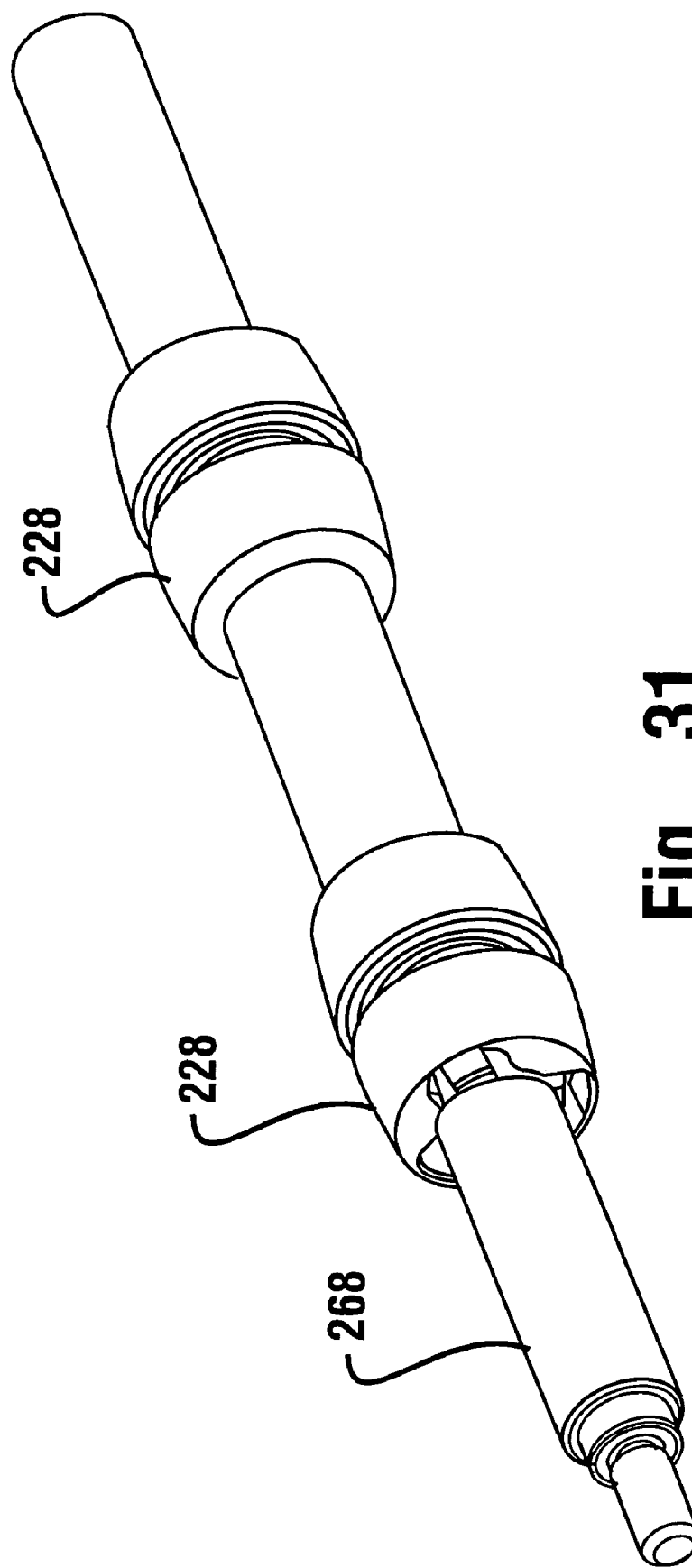
FIG. 31 is an isometric view showing alternative rollers utilizing similar mounting features to those shown in connection with the rollers in FIG. 28-30.

In the exemplary embodiment the principles described in conjunction with the mounting of outlet rolls 222 may also be applied to other rolls. FIG. 31 shows an exemplary form of the guide rolls 228 used in the transport for guiding the return flight of the transport belts. Guide rolls 228 are shown mounted on a guide shaft 268. The guide rolls 228 include structures similar to that described in connection with rolls 222 to enable the ready mounting and rotation of the rolls relative to the shaft. Of course it should be understood that these approaches are exemplary and in other embodiments other approaches may be used. Specifically and without limitation, in some embodiments specific features may be included for purposes of providing rolls that are in fixed engagement so that the rolls rotate with the drive shaft. This may be accomplished for example by including interengaging projections and recesses on the rolls and shaft structures. Such structures may include axially extending or radially extending projections or a combination of both, depending on the nature of the application and the nature of the forces being transmitted. Those having skill in the art may devise various approaches for achieving the desired degree of force transmission between the rolls and shafts.

Figure 39:
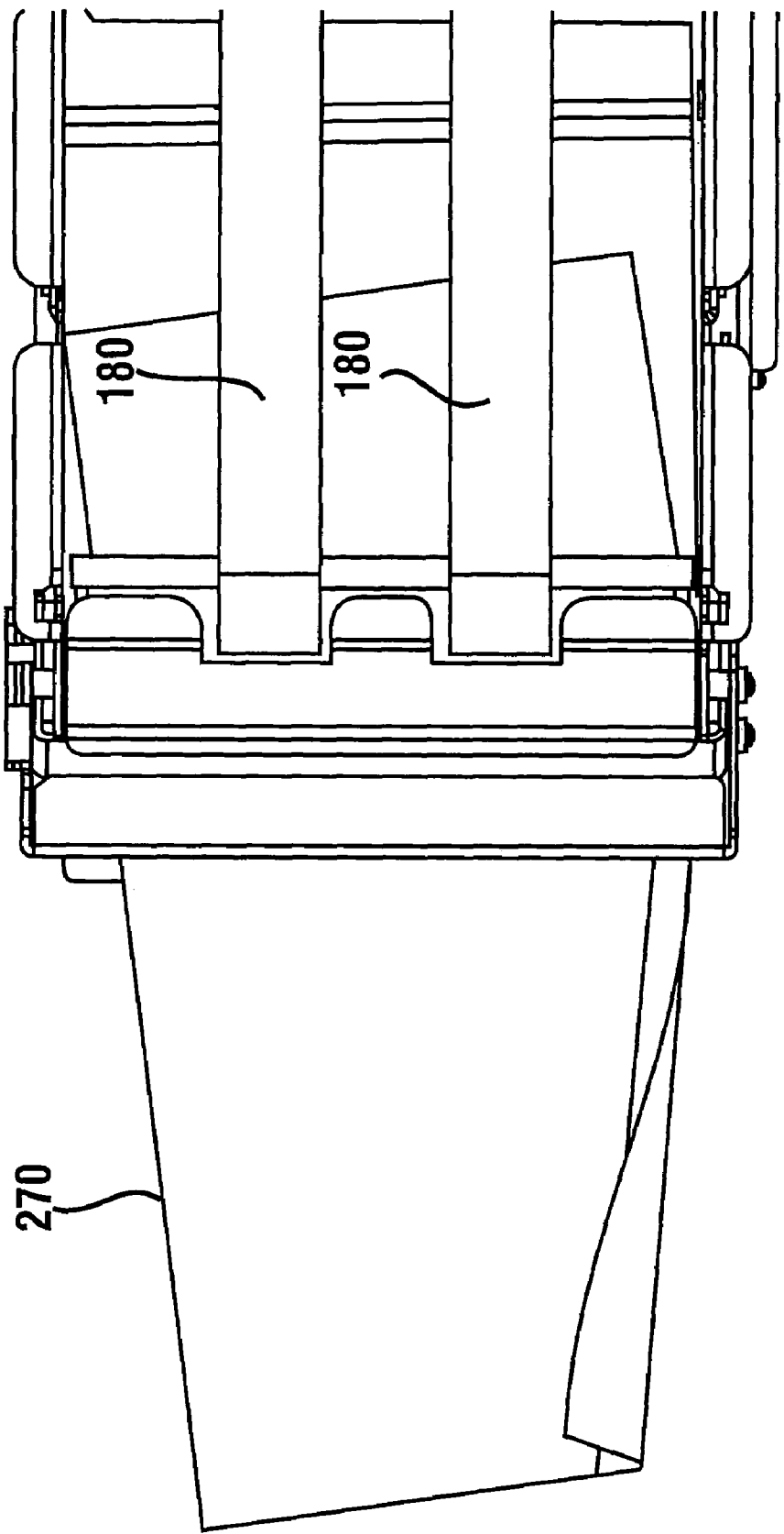
FIG. 39 is a top plan view of the outer end of the transport showing the misaligned envelope in connection therewith, the transport in FIG. 39 not including the guides shown in FIG. 34.
Figure 40:
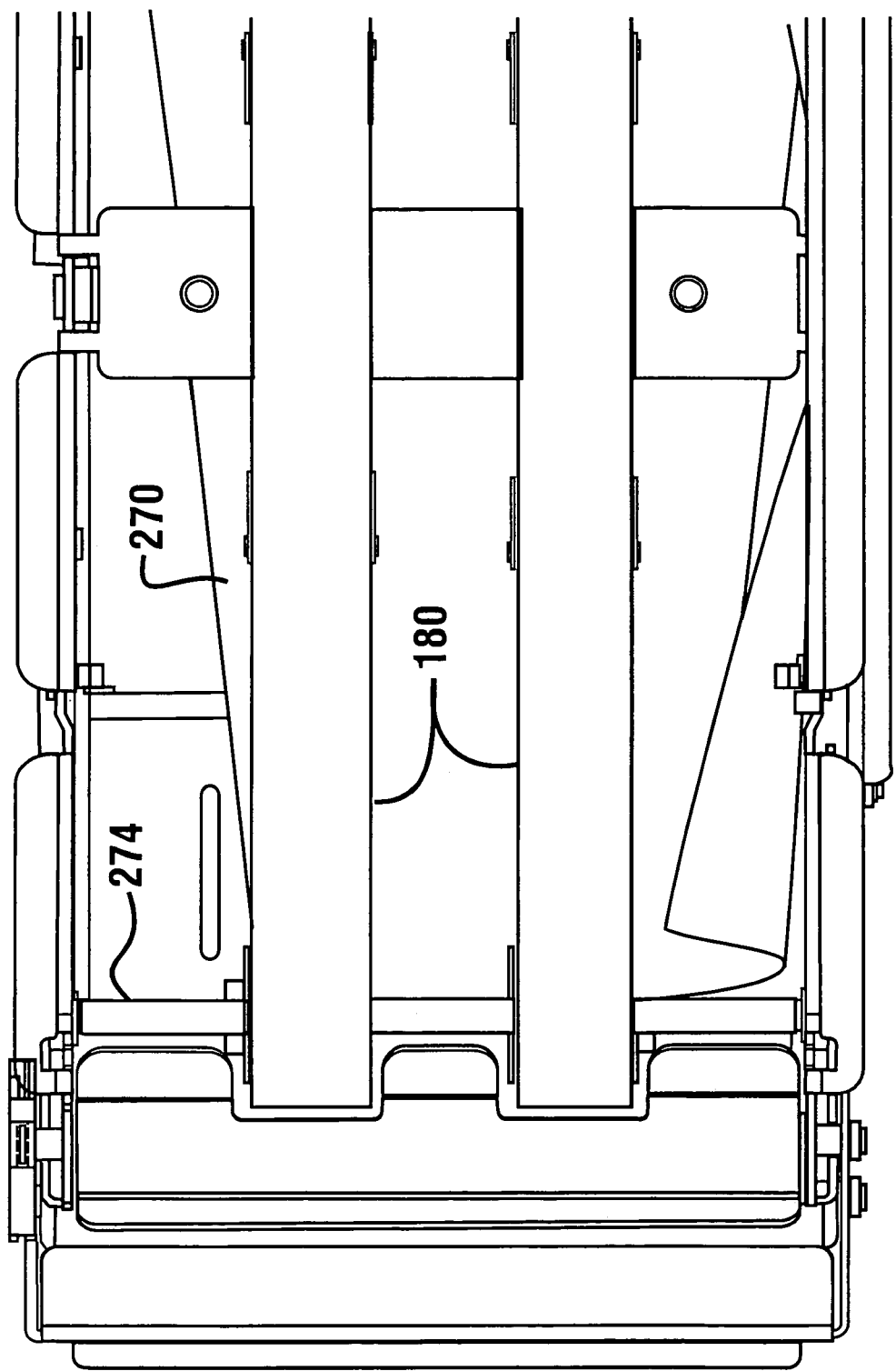
FIG. 40 is a top plan view of the envelope transport with the envelope shown in FIG. 39 moved further into the transport.

In some exemplary embodiments of the deposit accepting mechanism 120, difficulties may be presented by envelopes that enter or exit the transport in a manner that is skewed relative to the direction of movement of the transport belts 180. For example in FIG. 41, an envelope 270 is shown with an edge extending that is folded on the right side of the transport as shown due to envelope skewing. This may occur for example by the envelope 270 having become skewed in the transport while being dispensed and having moved outward through the transport in a skewed position. Alternatively, such skewing may have occurred due to a user inserting the envelope in a skewed manner. FIG. 40 is a top view showing the envelope with the folded edge within the transport and having an edge thereof adjacent to the outlet shaft 224. FIG. 39 is representative of the envelope 270 being entered into the transport for deposit in a skewed manner.

Figure 41:
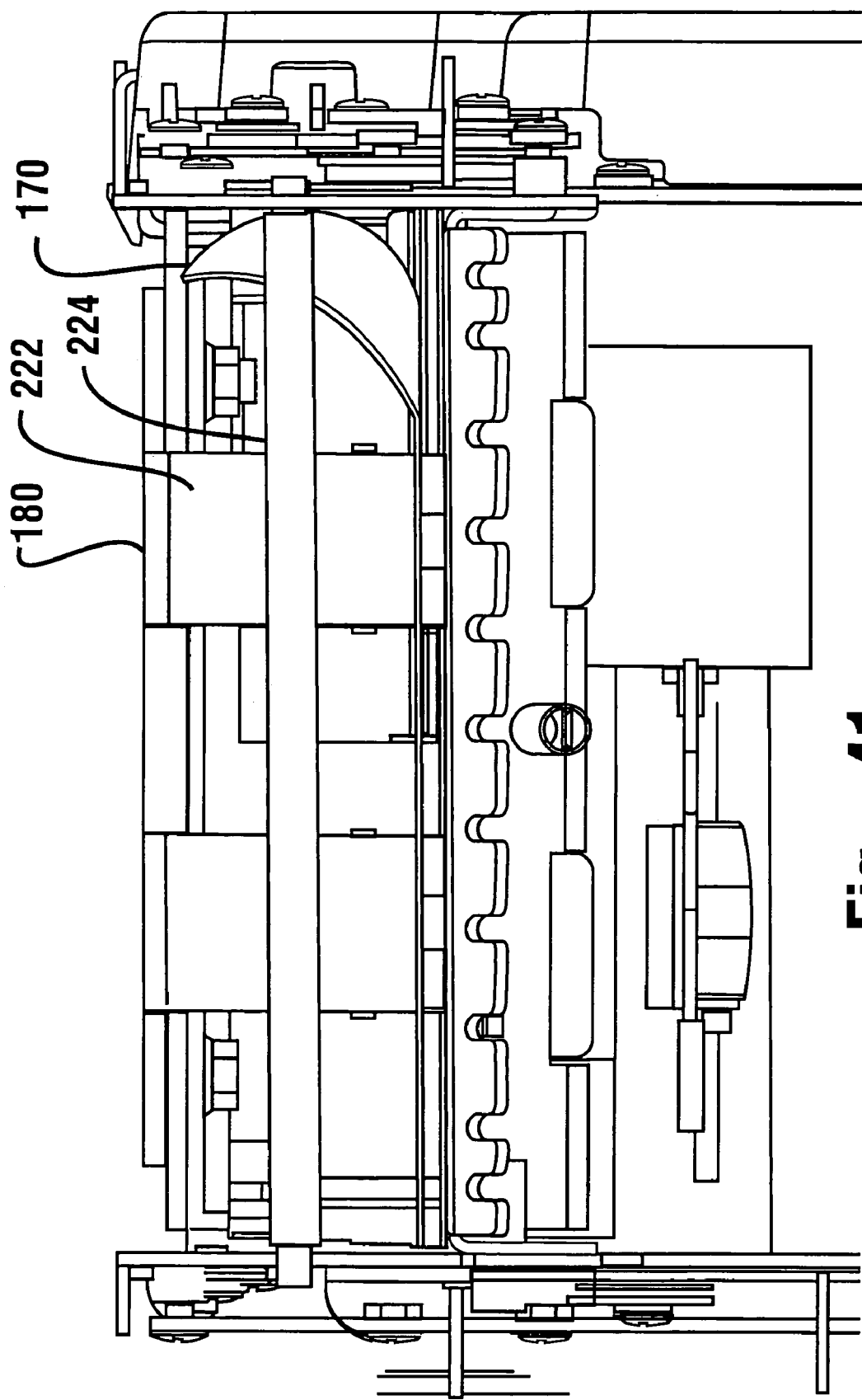
FIG. 41 is an end view of the transport shown in FIG. 39 and representing the condition that may occur with regard to rejecting a misaligned envelope or in dispensing a misaligned envelope if the guides shown in FIG. 34 are not used.

As can best be appreciated from FIG. 41, in the exemplary embodiment the skewed nature of an envelope can present problems in operation. Such problems may occur both in envelope dispensing and in receiving envelopes. For example, if an envelope is being dispensed to a user and it is skewed in the manner shown in FIG. 41, the folded end of the envelope may be obstructed in passing outward by the outlet shaft 224. When this occurs, a jam will be sensed adjacent the outlet and/or the envelope may be torn or damaged when presented to the user. Likewise, skewed envelopes may also be a problem with regard to deposit accepting operations. For example, an envelope may be accepted into the transport and then due to the envelope having certain sensed parameters that suggests that it should be returned to the customer, the controller operates to reverse the transport belts 180 so as to pass the envelope back to the user. If in these circumstances the envelope is skewed and the trailing edge is already moved into the transport past the outlet shaft 224, the folded edge of the envelope may catch on the shaft. This may result in an inability to return the envelope and/or envelope tearing or damage.

In some alternative embodiments the problems associated with skewed envelopes can be reduced through use of envelope guides. Such envelope guides may operate to urge skewed envelopes to assume a particular contour or configuration which more readily enables them to pass into and/or out of the transport without engaging other structures which may cause damage, jams or tearing. An exemplary embodiment of such guides is shown in FIGS. 34-37. Envelope guides 272 and 274 are mounted on opposed sides of the transport belts in supporting connection with the side walls of the transport. Of course as can be appreciated in FIG. 34, the left side transport belt is not shown for purposes of clarity. While in the exemplary embodiment the envelope guides are mounted in fixed relation relative to side walls 236, in other embodiments such guides may be movably mounted and/or spring loaded.

Figure 35:
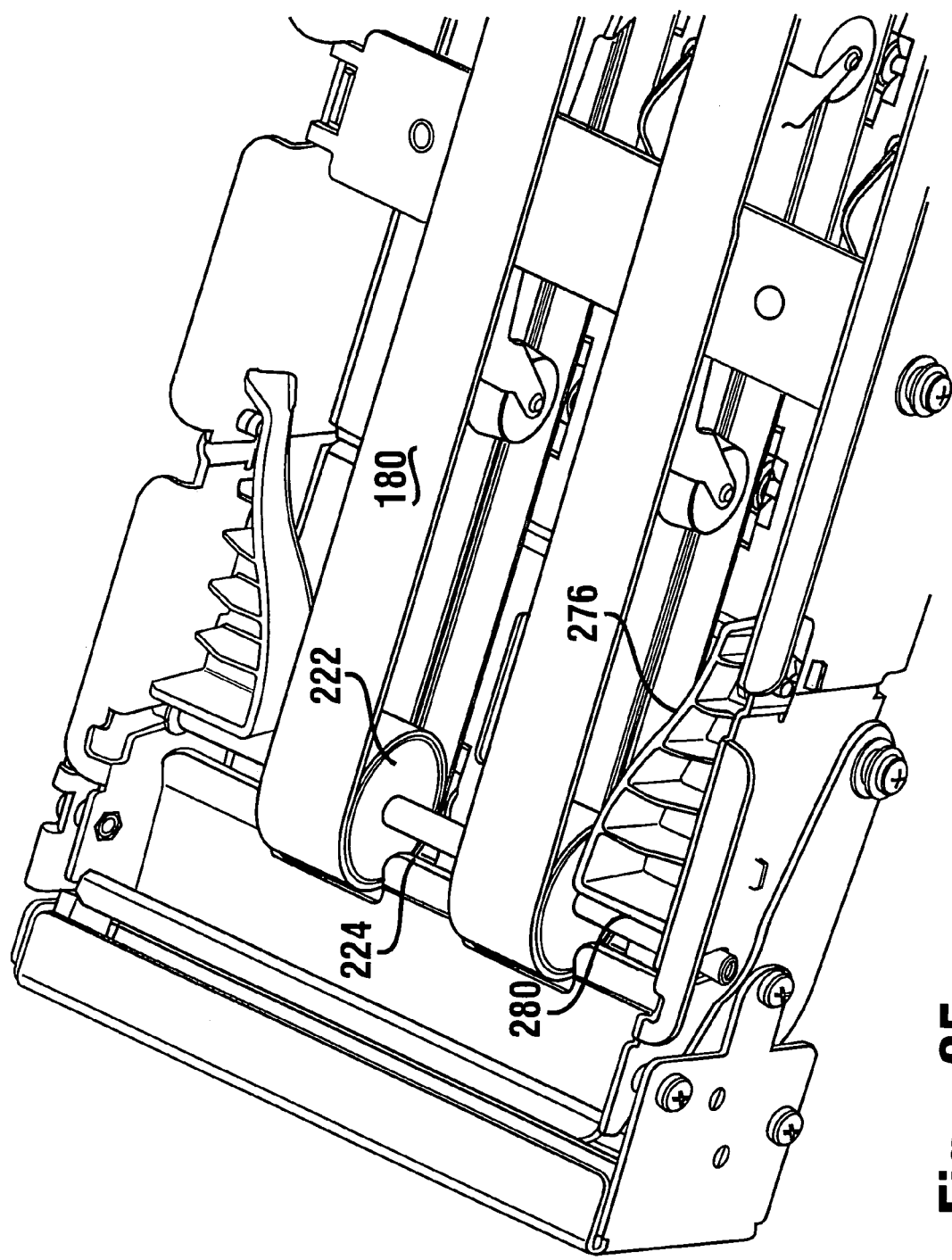
FIG. 35 is a further isometric view of the outer end of the transport shown in FIG. 34 including the envelope guides.

As the envelope guides 272 and 274 are mirror images of each other, only guide 272 will be described in detail. The guide 272 includes a contoured generally vertically extending surface 276. In the exemplary embodiment the vertical guide 276 extends in a generally inward depending shape so as to be extending further inward relative to the transport with increasing proximity to the outlet shaft 224. The exemplary form of the envelope guide 272 further includes a generally downward facing surface 278. Downward facing surface 278 is tapered so as to be closer to the platen surface of the transport with increasing proximity to the outlet shaft. This urges items to move below the outlet shaft. Of course as can be appreciated, the exemplary form of the envelope guide 272 has a vertically extending termination surface 280 that is sufficiently disposed from the outlet shaft 224 so as not to interfere with the movement thereof. This is shown in FIG. 35.

Figure 34:
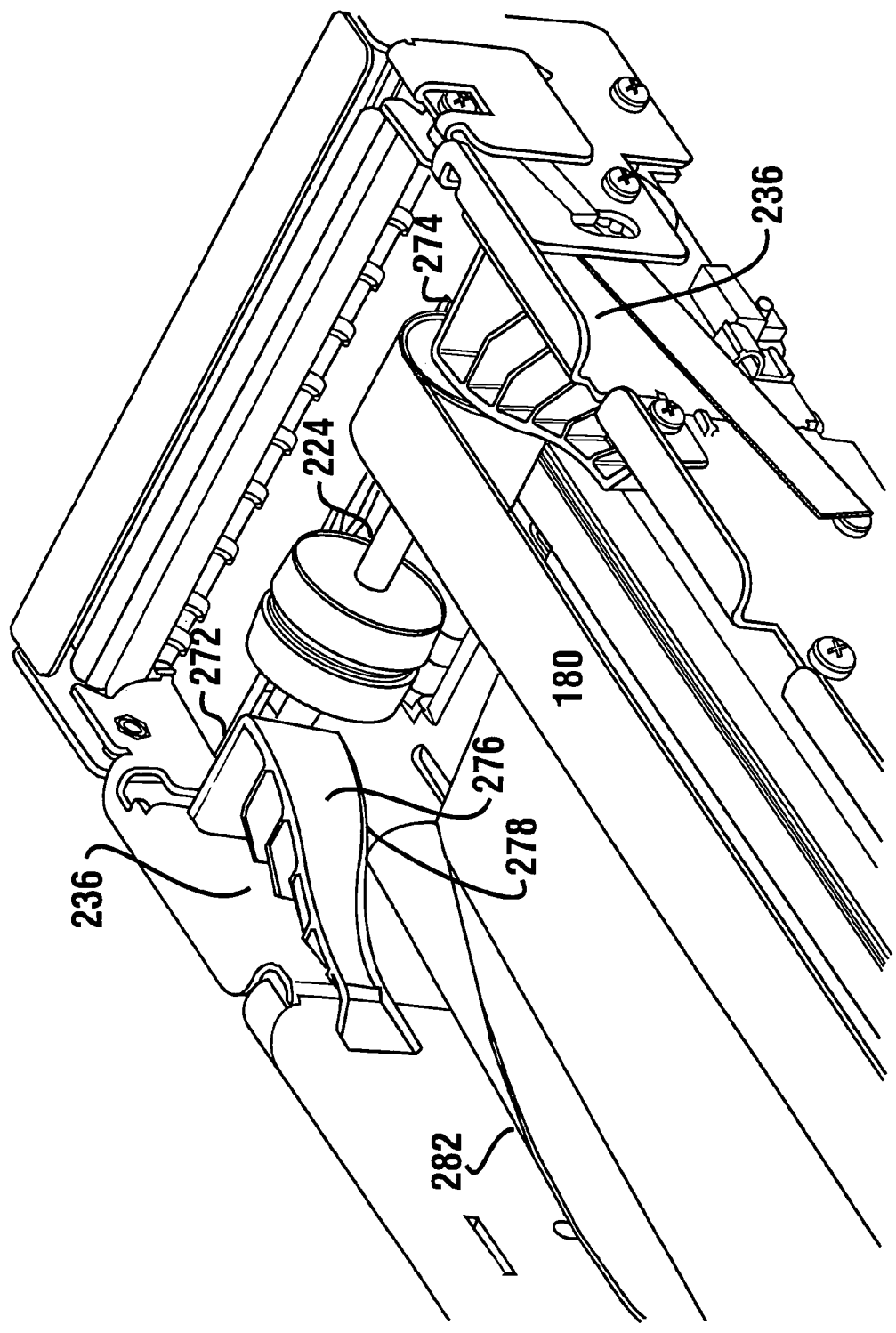
FIG. 34 is an alternative structure for an outer end of a transport including transversely disposed envelope guides to facilitate the outward travel of envelopes that may be misaligned in the transport.
Figure 36:
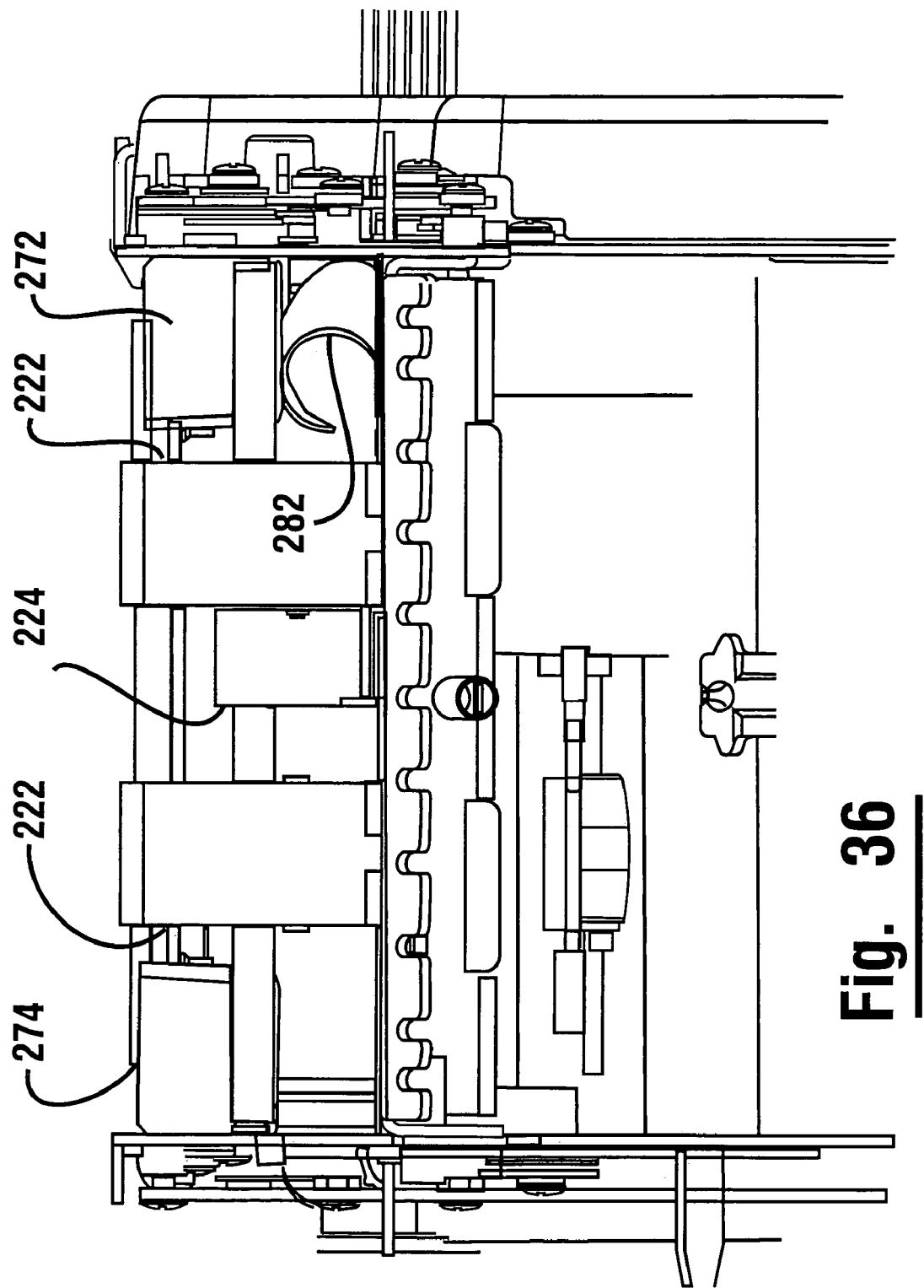
FIG. 36 is an end view demonstrating the operation of the disclosed envelope guides in connection with handling envelopes which are not aligned.

As best represented in FIGS. 34 and 36, an envelope 282 which is skewed relative to the transport is enabled to be more readily moved inward and outward past the outlet rolls 222. This results because if the envelope is being dispensed and is skewed in the manner shown in FIG. 34, the leading folded edge of the envelope engages the downward facing surfaces of the envelope guides and is caused to be deformed in a manner so that the folded edge of the envelope may move beneath the outlet shaft 224. This is further shown by the relationship between the downward facing surface 278 of the guide which extends generally at about the level of the bottom of the undeformed position of the outlet shaft 224. Thus as the envelope is moved outward, the folded edge passes beneath the outlet shaft and does not become caught thereon. Further, as can be appreciated the inward extending vertical guide surfaces facilitate envelopes which may be skewed sufficiently severely to be moved so that the folded over edges thereof engage the rollers and through the action thereof are moved to deform and pass under the outlet shaft.

Figure 37:
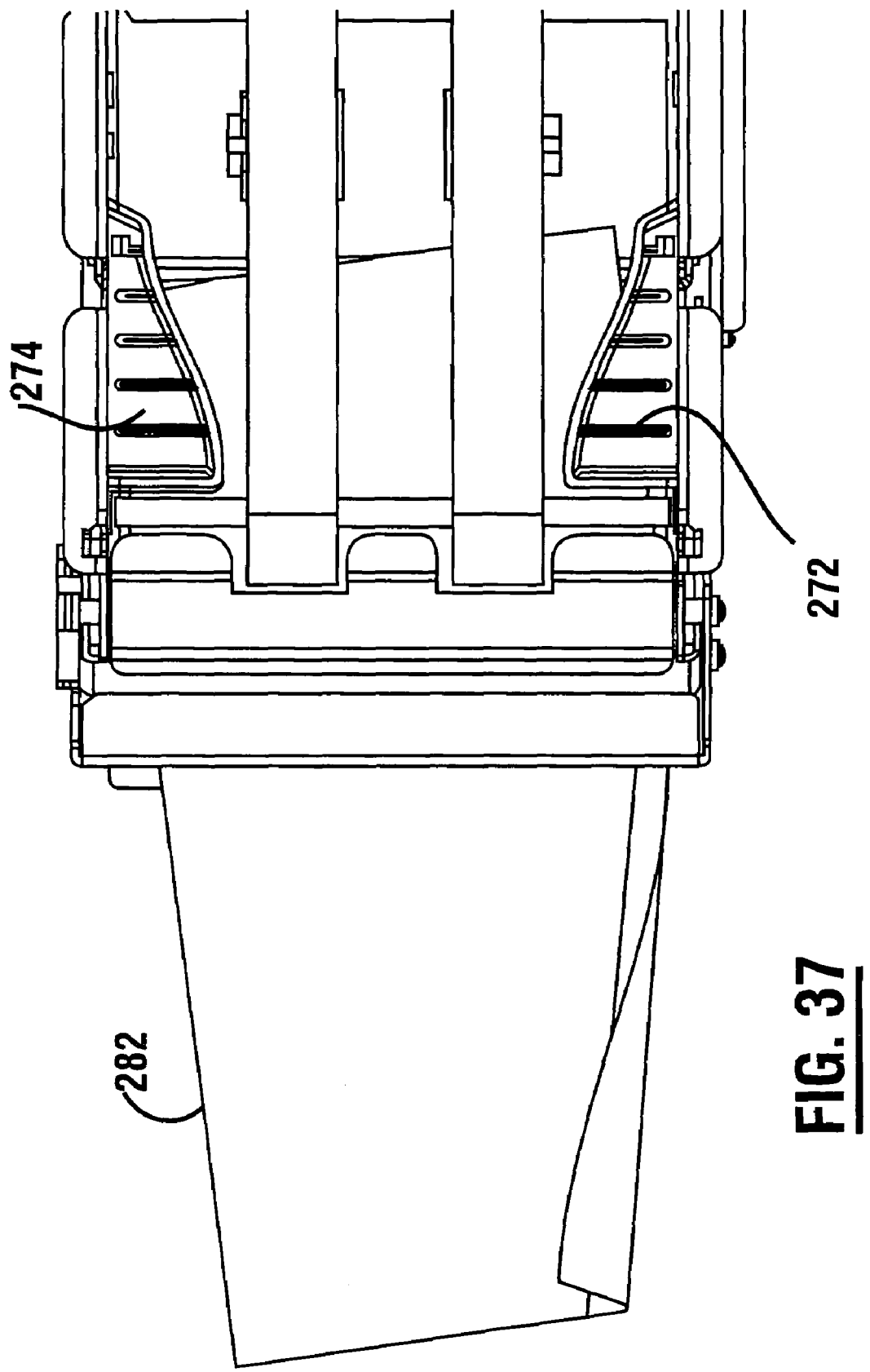
FIG. 37 is a top schematic view showing the outer end of the transport with an envelope in misaligned relation therewith.
Figure 38:
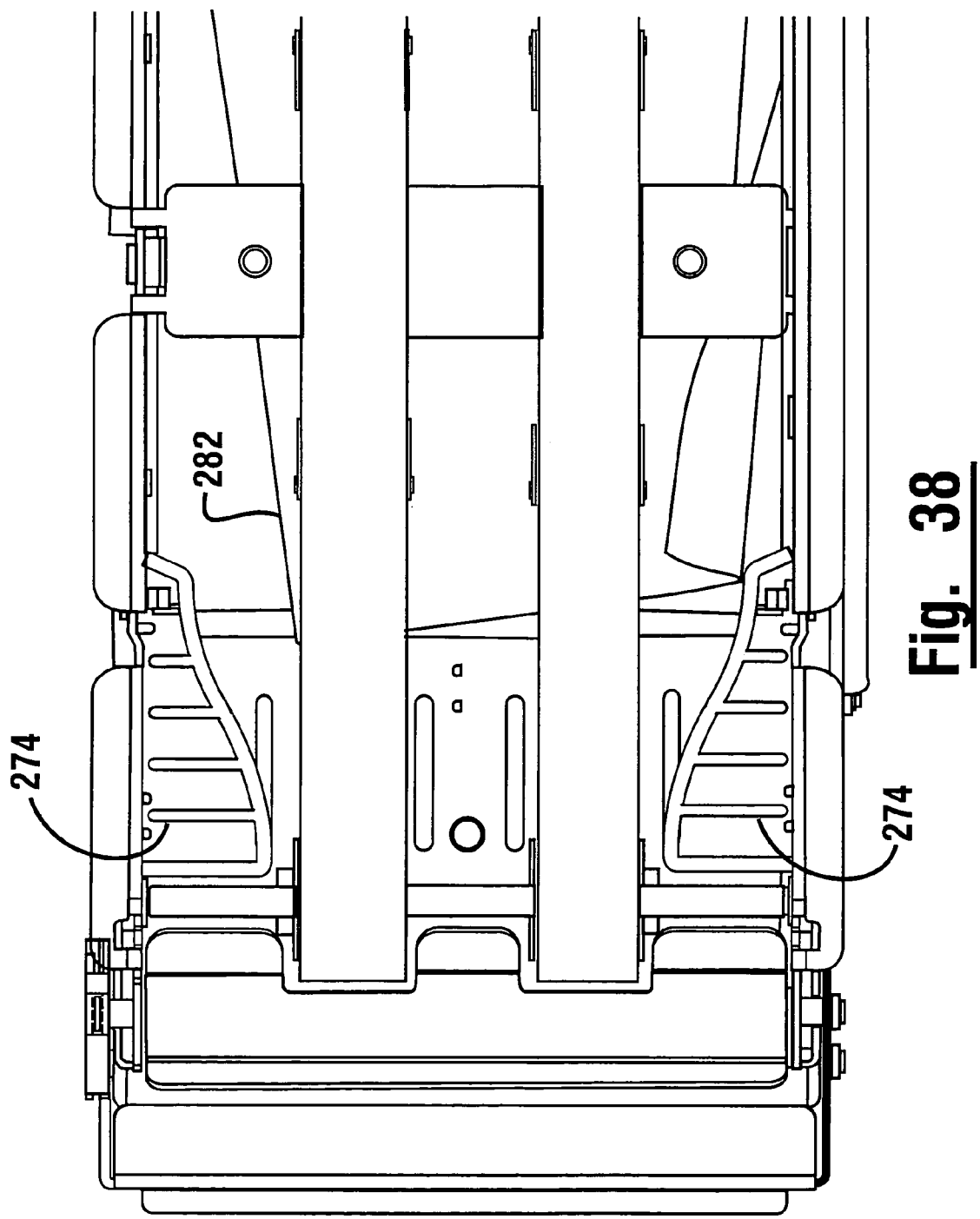
FIG. 38 is a top view of the transport with the guides showing the misaligned envelope moved further into the transport.

Similar principles may be applied in circumstances where an envelope is inserted into the transport in a skewed manner such as is represented in FIG. 37. In such circumstances the skewed envelope will generally be deformed and folded so as to move past the outlet rolls 222. However, if it is necessary to reject the deposited envelope, the guides will operate so as to deform the edges so that the envelope can pass outward underneath the outlet shaft. Such approaches facilitate reliable movement of envelopes into and out of the transport despite such envelopes being skewed and may avoid envelope jams and provide increased reliability. Of course that these approaches are exemplary and in other embodiments other approaches may be used.

In some embodiments challenges may be faced by users attempting to insert relatively large and/or uneven contoured envelopes into the automated banking machine for deposit. In some cases such envelopes may not be readily accepted because the movably mounted outlet rolls 222 and the transport belts 180 supported thereon may not readily displace upwardly to a sufficient degree in response to engaging the envelope to enable an envelope of high thickness to enter in between. This may be particularly a challenge in situations where there are relatively thick or unevenly contoured envelopes which are comprised of low friction material. In such circumstances the transport belts may not have sufficient frictional engagement with the envelope so as to enable the envelope to move into the nip between the outlet rolls 222 and the associated transport belts and rollers 220. Such deficiencies may result in users trying to force envelopes into the transport. This increases the risks of envelope breakage and/or jamming.

Figure 32:
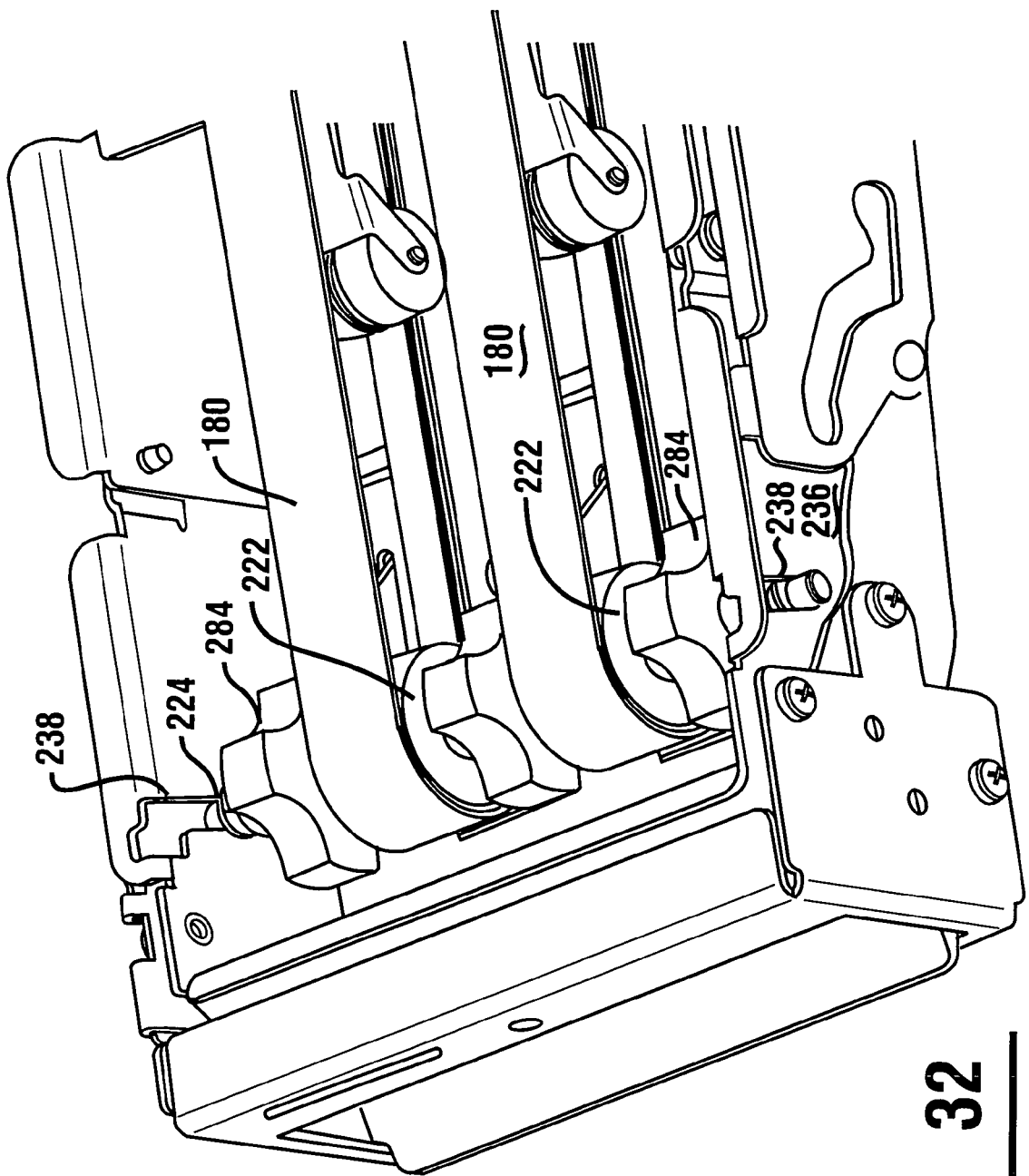
FIG. 32 is an isometric view of an alternative exit end construction for an envelope transport system including members that facilitate acceptance into the transport of irregularly contoured items.
Figure 33:
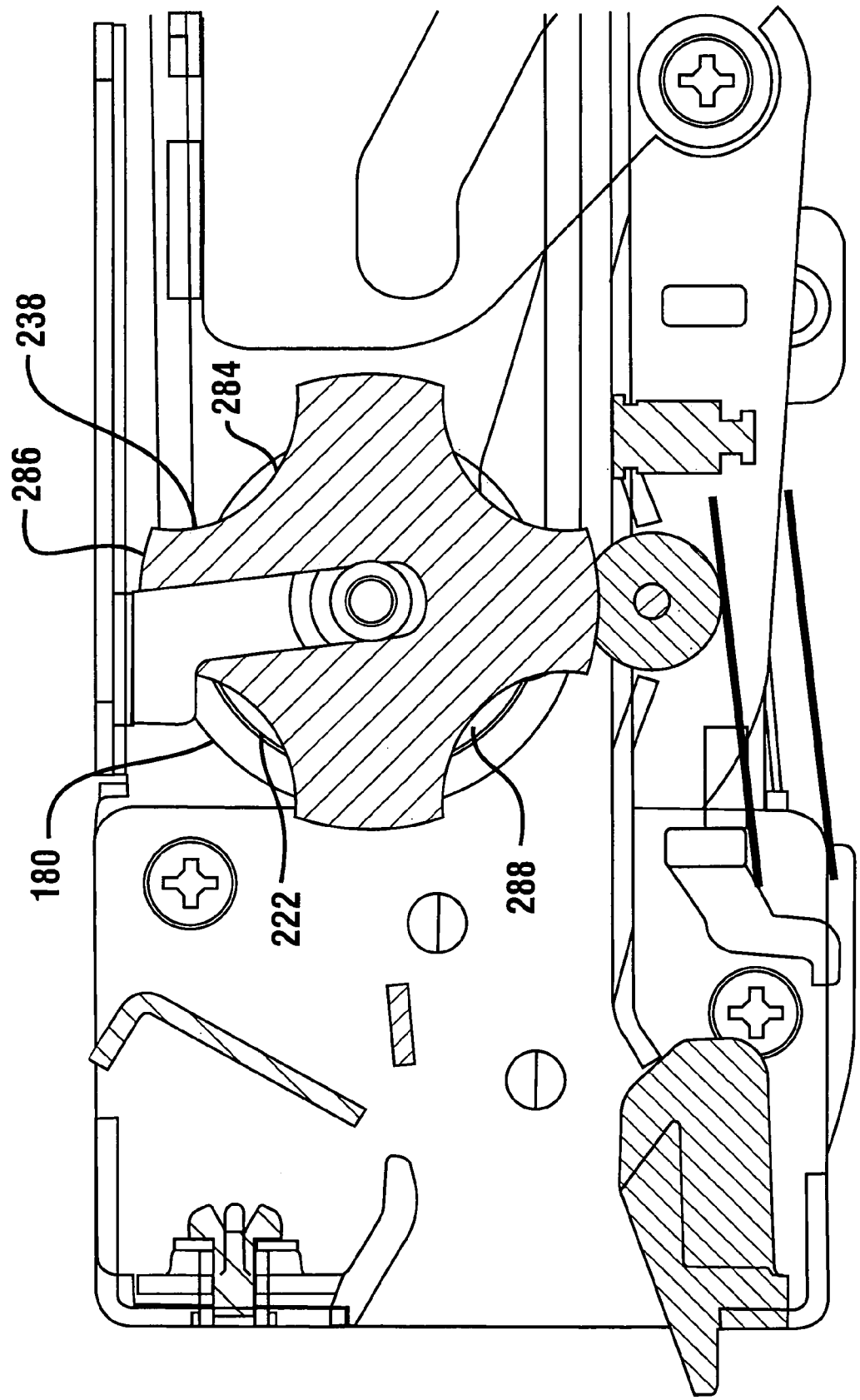
FIG. 33 is a side view of the structures shown in FIG. 32.

To enable envelopes having higher thicknesses and/or lower frictional properties to more readily enter the outer end of the envelope transport, some alternative embodiments of the invention may incorporate structures like that shown in FIGS. 32 and 33. In this exemplary alternative embodiment, the outlet rolls 222 are mounted relative to the outlet shaft 224 such that rotation of the outlet rolls responsive to the transport belts 180 cause shaft 224 to rotate. This may be done for example in the manner previously discussed by providing engaging connection between the outlet rolls 222 and the shaft. Of course alternative means for fixing the outlet rolls to the shaft such that they rotate together, may be employed.

In this exemplary alternative embodiment knobby rolls 284 are mounted to and rotate with the outlet shaft 224. For purposes of this disclosure, knobby rolls are rolls with outer surfaces which include projections that provide enhanced gripping action. In the exemplary embodiment knobby rolls 284 are mounted such that there is one position on the shaft in intermediate relation of the outlet rolls 222 as well as one on each outboard side between the outlet rolls 222 and the side wall 236. In the exemplary embodiment the knobby rolls are comprised of generally firm but resilient material in the area of engagement with the envelope. Such area of engagement is also comprised of material having sufficient gripping frictional properties so as to facilitate engaging and moving the envelopes. In the exemplary embodiment the knobby rolls 284 are comprised of generally a cross shape with generally curved outer surfaces 286. As best shown in FIG. 33, the exemplary form of the knobby rolls provide for the curved surfaces 286 to extend somewhat further radially outward than the surface of the transport belts 180 on the outlet rolls 222. However, the outer surfaces 286 are positioned so that when the outlet shaft 224 is at the bottom of the angled slot 238, the outer surfaces 286 are enabled to pass the base surface of the transport without engagement.

In operation of this alternative embodiment, the knobby rolls 284 rotate with the outlet rolls 222 and the transport belts 180. Upon engagement with an envelope the outer surfaces 286 of the knobby rolls provide additional traction on the envelope, urging it to move into the transport to facilitate movement of the outlet shaft 224 upward. In addition in the exemplary embodiment arcuate recesses 288 which extend between the outer surfaces 286 provide a further engaging force at the areas leading to the outer surfaces which further serve to help the shaft to move upward and to pull envelopes past the outlet shaft 224. This action enables the alternative transport to handle larger sized envelope thicknesses or uneven contours without damage to the envelopes. Further, as can be appreciated, the nature of the knobby rolls 284 is such that the rolls provide similar traction in moving envelopes in an outward direction through the transport. This may facilitate the rejection of envelopes within the transport that must be returned to the customer. The knobby rolls may also serve to facilitate the movement out of a transport of a stack of empty envelopes which due to malfunction in loading have become engaged together and which may only be moved from the transport as part of a stack. This may occur for example with certain types of envelopes which have tabs which may have been inadvertently interlocked or which through contamination or errors in the manufacturing process have become stuck together. Of course it should be understood that the structures described in connection with knobby rolls are exemplary and in other embodiments other approaches may be used.

Figure 42:
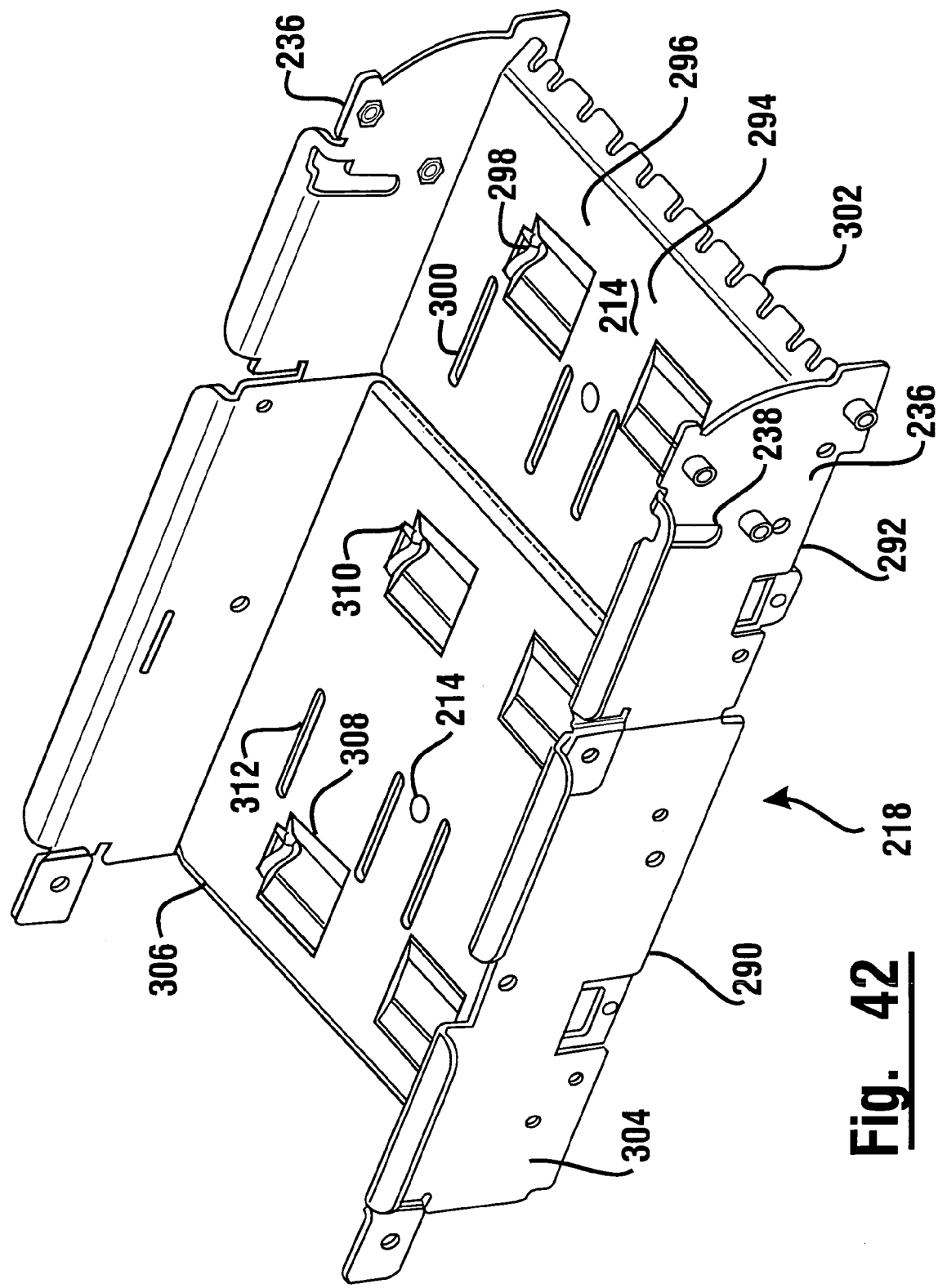
FIG. 42 is an isometric view of the construction of the supporting base for the outer end of the transport.
Figure 43:
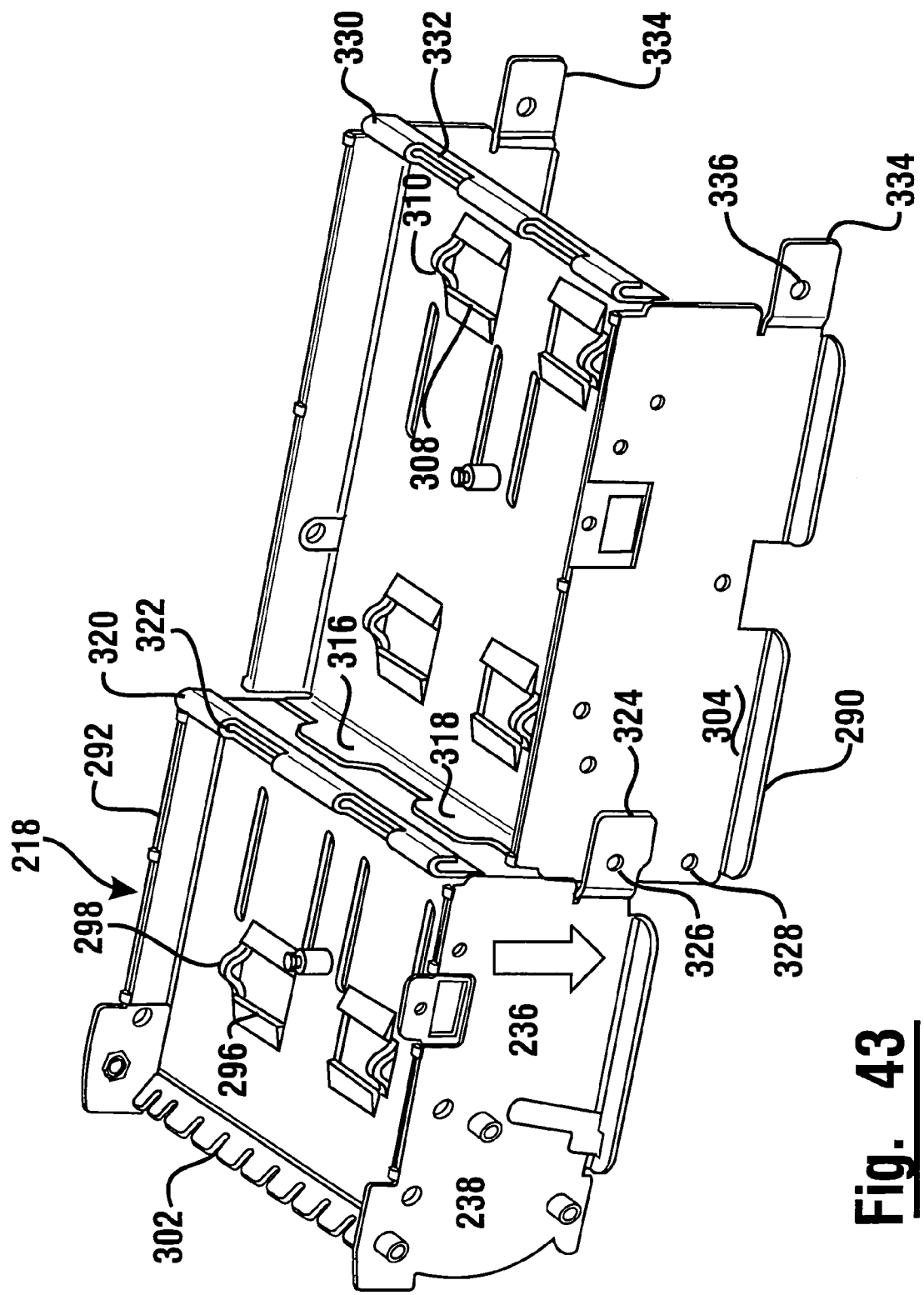
FIG. 43 is a bottom isometric view demonstrating the assembly of the components of the base used in the outer end of the transport.
Figure 44:
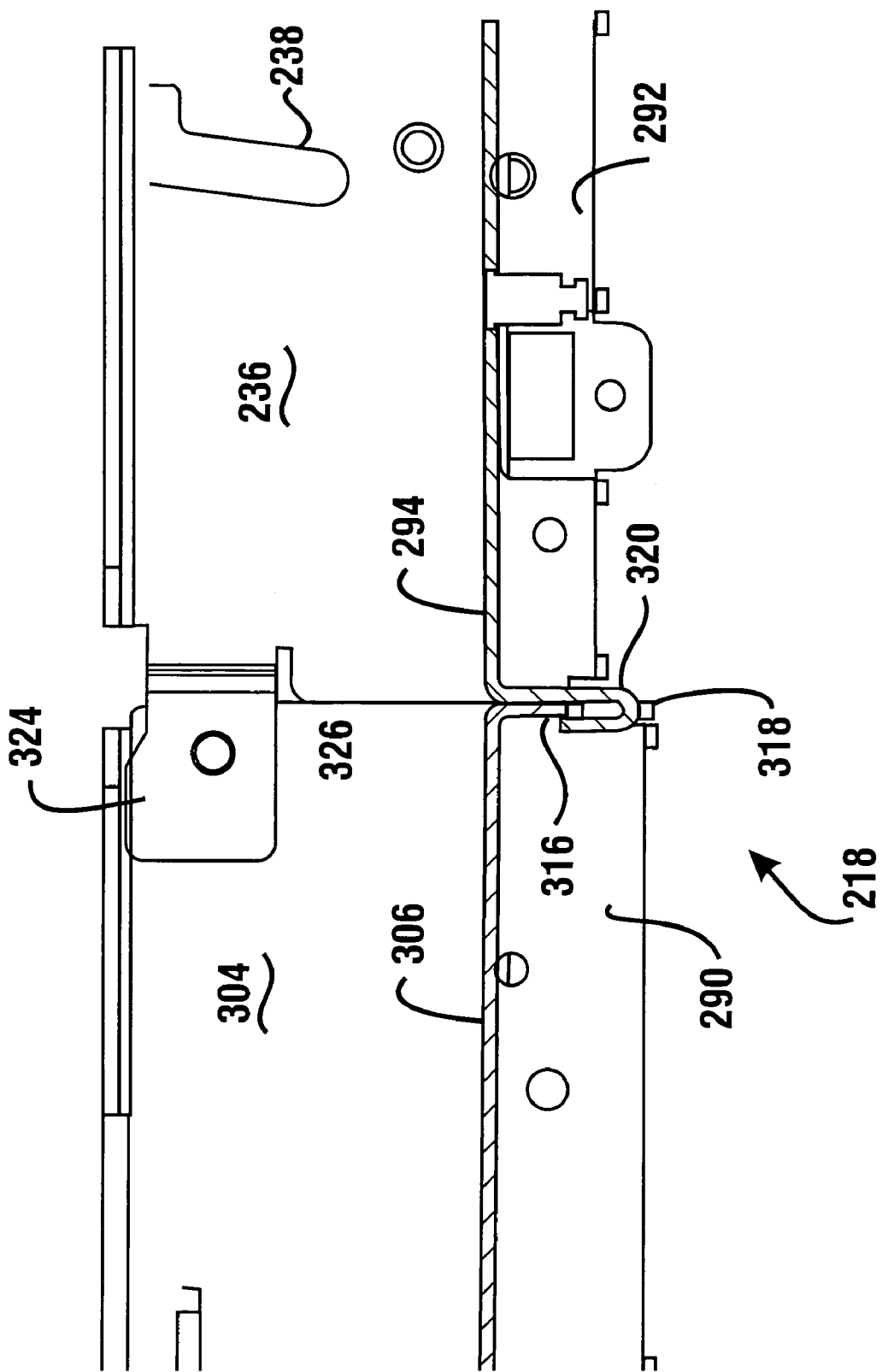
FIG. 44 is a side view showing the assembled members making up the base of the outer end of the transport.

A further useful aspect of the exemplary form of the envelope accepting mechanism 120 is that the mechanism may be more readily adapted for use in various types of automated banking machines. This is enabled by providing that the delivery section 218 may extend horizontally beyond curved portion 215 by varying distances. This may be useful for utilizing the mechanism within various types of machines where the position of the components within the machine relative to the opening at the outer end may vary. FIGS. 42-44 show an exemplary structure used in an embodiment of the invention so as to facilitate the delivery section 218 being of different lengths.

In the exemplary delivery section 218 shown, the delivery section is comprised of two interengaging sections 290 and 292. Delivery section 292 in this exemplary embodiment is positioned adjacent to the outer end 122 and includes the structures associated with the outlet rolls and shaft. Section 292 includes the side walls 236 having angled slots 238. Further as can be seen in FIGS. 42 and 43, Section 292 includes a base platen surface 294 having apertures 296 therein in which the belt support rollers 220 which underlie the outlet rolls 222 are mounted. In the exemplary embodiment the base surface 294 includes at opposed transverse ends, formed shaft supporting pockets 298. Shaft supporting pockets 298 are adapted for the receipt of shafts portions 299 therein (see FIG. 23), which shafts support the rollers which extend in the apertures when the unit is assembled. Further section 292 includes slots 300 through which the contacting movable fingers associated with envelope sensor 248 extend. Section 292 further includes an angled lead-in surface 302. Lead-in surface 302 in the exemplary embodiment is serrated for purposes of cooperating with the gate member 246 in a manner later discussed.

Section 290 also includes side walls 304 and a base platen surface 306. Base platen surface 306 includes apertures 308 for accepting belt support rollers as well as shaft supporting pockets 310 similar to shaft supporting pockets 298. In the exemplary form of section 290 the base surface 306 also includes slots 312 for purposes of allowing fingers associated with a mid-transport envelope sensor to movably extend there through. Further, sections 290 and 292 further include fastening openings 214 which are used for mounting further structures thereon such as rib 250. Of course it should be understood that these structures are exemplary and other embodiments or other structures may be used.

As best shown in FIG. 43, section 290 includes at a forward end thereof, a downward depending wall 316 with locator tabs 318 extending thereon. Recesses extend between the locator tabs 318. Section 292 includes a downward extending U-shaped wall 320. U-shaped wall 320 includes cutouts 322 therein. U-shaped wall 320 is configured such that the distance between the legs which comprise the U-shaped wall are spaced sufficiently apart to accept wall 316 of section 290 therein. Further, the cutouts 322 are sized and positioned such that tabs 318 are enabled to be engaged therewith in aligned relation. This is represented in FIG. 44. As can be appreciated when the tabs and cutouts are engaged, the walls 236 and 304 of sections 290 and 292 are generally aligned as are the adjacent portions of base platen surfaces 294 and 306. Further as shown in FIG. 44 in the exemplary embodiment, the areas where the sections come together are rounded so as to facilitate the movement of envelopes or other media through the area of the joint while minimizing the risk of snagging.

Further in the exemplary embodiment section 292 includes an ear portion 324. Ear portion 324 includes an aperture 326 therein. Aperture 326 is positioned in aligned relation with an opening 328 in side wall 304 when the sections 290 and 292 are assembled. The fastener device (not separately shown) is extended to engage the aperture 326 and the opening 328 so as to hold the sections in engaged relation.

As further shown in FIG. 43, section 290 includes a further folded wall portion 330 having cutouts 332 therein. Further section 290 includes ear portions 334 with apertures 336 therein. As can be appreciated, these structures are similar to those used to join sections 290 and 292 and may be used to engage section 290 with a further transport section such as a further horizontally extending section or an upper end of the curved platen 214.

As can be appreciated, in this exemplary embodiment the delivery section 218 which extends horizontally outward between the fascia of the automated banking machine and the curved portion of the transport, may be made of various lengths depending on the length and number of sections used. Therefore the envelope depository mechanism of the exemplary embodiment may be utilized in more types of machines. Further the structures employed are readily assembled and minimize the risk of envelopes snagging as they pass between the sections of the transport. Of course it should be understood that these structures are exemplary and in other embodiments, other structures and approaches may be used.

In an exemplary embodiment of the deposit mechanism 120, a gate device is employed to minimize the risk that persons will access the transport and the interior of the banking machine in attempts to gain access to valuable items therein. In the exemplary embodiment the gate is positioned adjacent to the outer end 122 and operates to control access through the opening 244. In the exemplary embodiment the gate operates so as to only provide access through the opening when the controller operates the machine to dispense an envelope to a user, or when the machine is operating to conduct a transaction in which a deposit envelope is to be received within the machine. Of course it should be understood that the structures and methods described are exemplary and in other embodiments other approaches may be used.

As best shown in FIGS. 45-50, a gate member 246 is rotatable about a pivot 338. The pivot 338 is supported by side walls 236 of transport section 292. Further, the gate member 246 and pivot are positioned behind bezel 242. In the exemplary embodiment bezel 242 includes both a front wall 340 and side walls 342. In the exemplary embodiment the side walls extend rearward from the front wall and overlie the gate as well as the outer end of section 292 so as to reduce the risk of tampering. Further, in the exemplary embodiment bezel 242 includes a top wall 344 and a bottom wall 346. The top and bottom walls further overlie the gate and the end of section 292 to reduce the risk of tampering. Of course it should be understood that these structures are exemplary and in other embodiments other approaches may be used.

Exemplary bezel 242 includes walls 348, 350 which bound the opening 244 at the upper and lower sides respectively. Bezel 244 also includes inwardly tapered side walls 352. Walls 348, 350 and 352 form a funnel shaped throat so as to facilitate movement of envelopes into and out of the opening 244. Further bezel front wall 340 includes an aperture 354. In the exemplary embodiment aperture 354 enables user observation of illumination devices such as LEDs that are selectively illuminated responsive to the controller. This provides for the controller to illuminate the lighting devices so as to draw a user's attention to the opening 244 at appropriate times during transactions. This may include for example when the unit is dispensing an envelope to a user and/or when the user is expected to deposit an envelope into the device. In some exemplary embodiments the light emitting devices may provide for illumination in different colors and/or may flash at different frequencies in response to the controller. This may further facilitate guiding a user of the automated banking machine's attention to the opening at appropriate times. Of course these approaches are exemplary.

Figure 50:
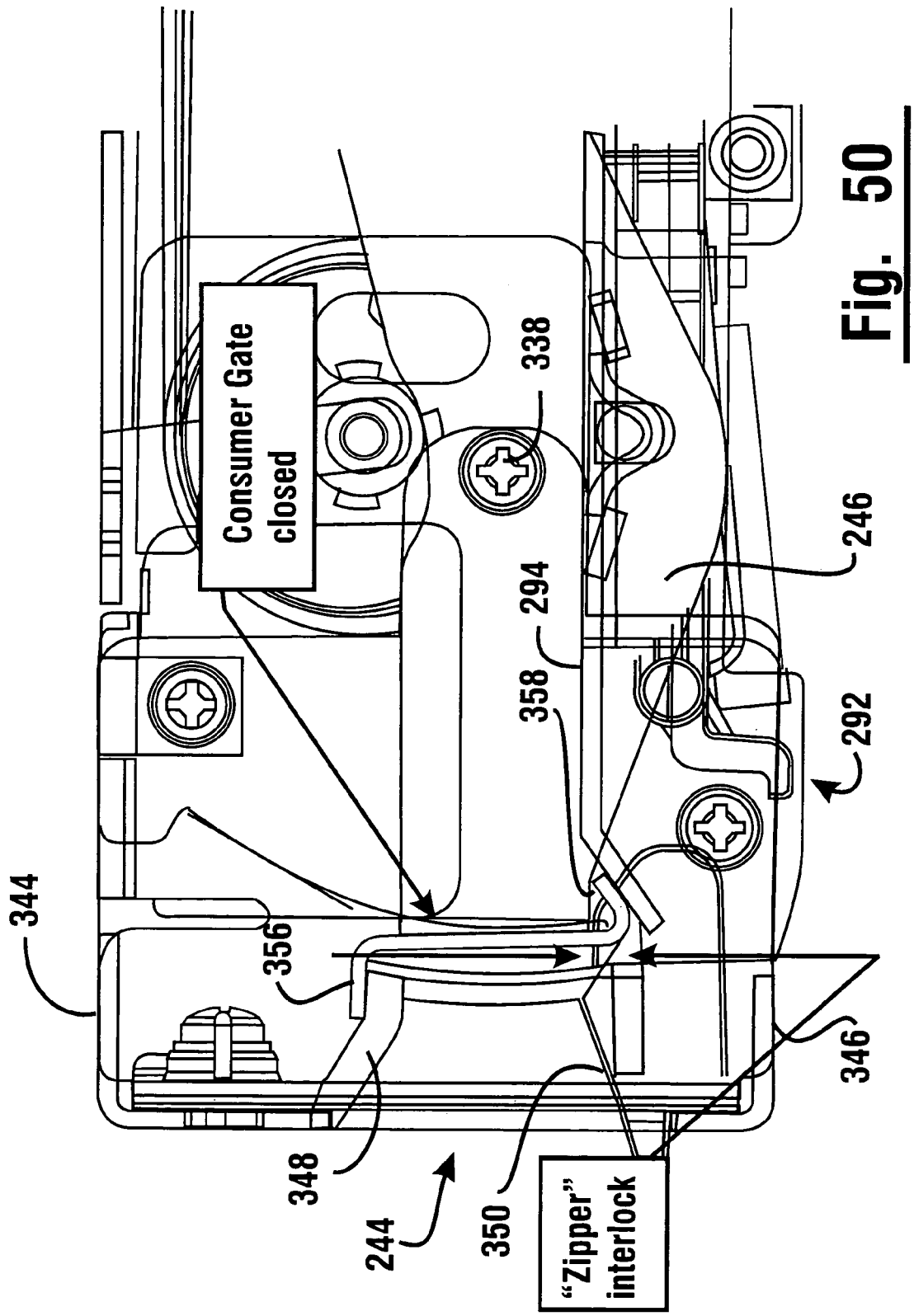
FIG. 50 is a view similar to FIG. 47 with the gate in a fully closed position in which the gate engages with adjacent structures so as to minimize the risk of unauthorized access to the transport.

As best shown in FIG. 50, in the exemplary embodiment gate 246 includes an outward extending portion 356. Outward extending portion 356 in the closed position of the gate shown in FIG. 50 overlies the inside of the upper wall 348 of the bezel. This serves to reduce opportunities for unauthorized access to the interior of the machine when the gate is closed.

Further as shown in FIG. 50, gate 246 includes a lower inward extending portion 358. Inward extending portion 358 comprises a plurality of transversely disposed recesses which provide a generally serrated surface in the exemplary embodiment. This surface meshes in interengaging relation with a plurality of projections that are elongated in the direction of movement of envelopes in the transport, and which are alternatively referred to herein as zipper portions 380. In the closed position of the gate, the projections also extend through the serrated lead-in surface 302 of base 294. In this exemplary embodiment the interengaging relation of the projections, the serrated inward extending portion 358 and the serrated lead-in portion 302 in the closed position of the gate 246 helps to minimize the risk of tampering. This is achieved because deformation of the gate by persons attempting tampering may cause the gate to interlock and jam adjacent structures so as to prevent the opening thereof. Further, the structure of the exemplary embodiment reduces the opportunities for persons to gain access to the interior of the banking machine through the use of prying tools or other devices.

Figure 46:
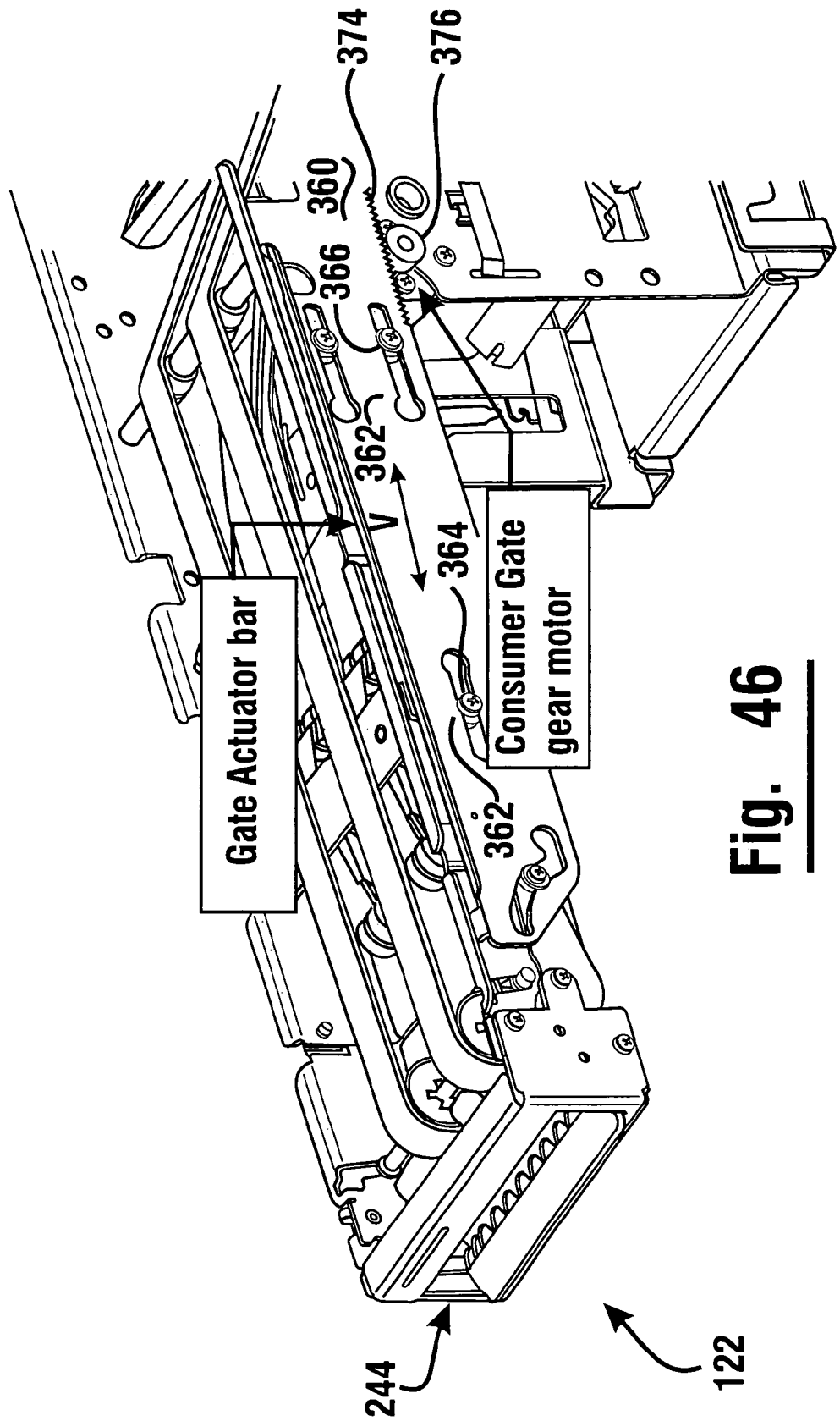
FIG. 46 is an isometric view schematically showing the components associated with movement of the gate which selectively blocks access to the transport.

In the exemplary embodiment an actuator member 360 is movably mounted in supporting connection with the delivery section 218 as best shown in FIG. 46. Actuator member 360 in the exemplary embodiment is enabled to move back and forth generally transverse to the direction of movement of the gate along the lines of Arrow V through the action of interengaging pins and slots 362. In the exemplary embodiment the slots 364 have an enlarged circular end portion through which the enlarged heads of the pins 366 may be extended. However, the configuration of the enlarged end portions of the slots are such that the actuator member can only be engaged and disengaged from certain of the pins in particular positions. As a result the risk that the actuator member may be disengaged from its 'supporting pins in any particular position in the course of its travel is reduced.

In the exemplary embodiment the actuator member includes a cam slot 368 adjacent to the forward end thereof The cam slot is bounded within the actuator by a cam surface. A cam follower 370 is in connection with the gate 246 and is engaged in the cam slot 368. Further in the exemplary embodiment the cam slot 368 includes an enlarged area 372 at an extreme end thereof. The enlarged area 372 is in an area of the cam slot beyond where the cam follower is positioned when the gate moves between the open and closed positions. The enlarged area is used for facilitating assembly by providing access for the head 370 of the cam follower to extend into the cam slot. However, as is the case with the other pin and guide structures, once the head is moved away from the enlarged area in the cam slot as would be the case at all times during normal operation of the mechanism, the enlarged head is unable to move out of the engaging slot.

As shown in FIG. 46, the actuator member 360 includes a gear rack portion 374 in operative connection therewith. The gear rack portion is engaged with a rotatable gear 376 which is driven by a drive (not separately shown). The drive is operated to rotate the gear selectively in either direction responsive to the controller in the banking machine. In the exemplary embodiment the condition of the gate is determined by sensing the position of the actuator member.

Figure 47:
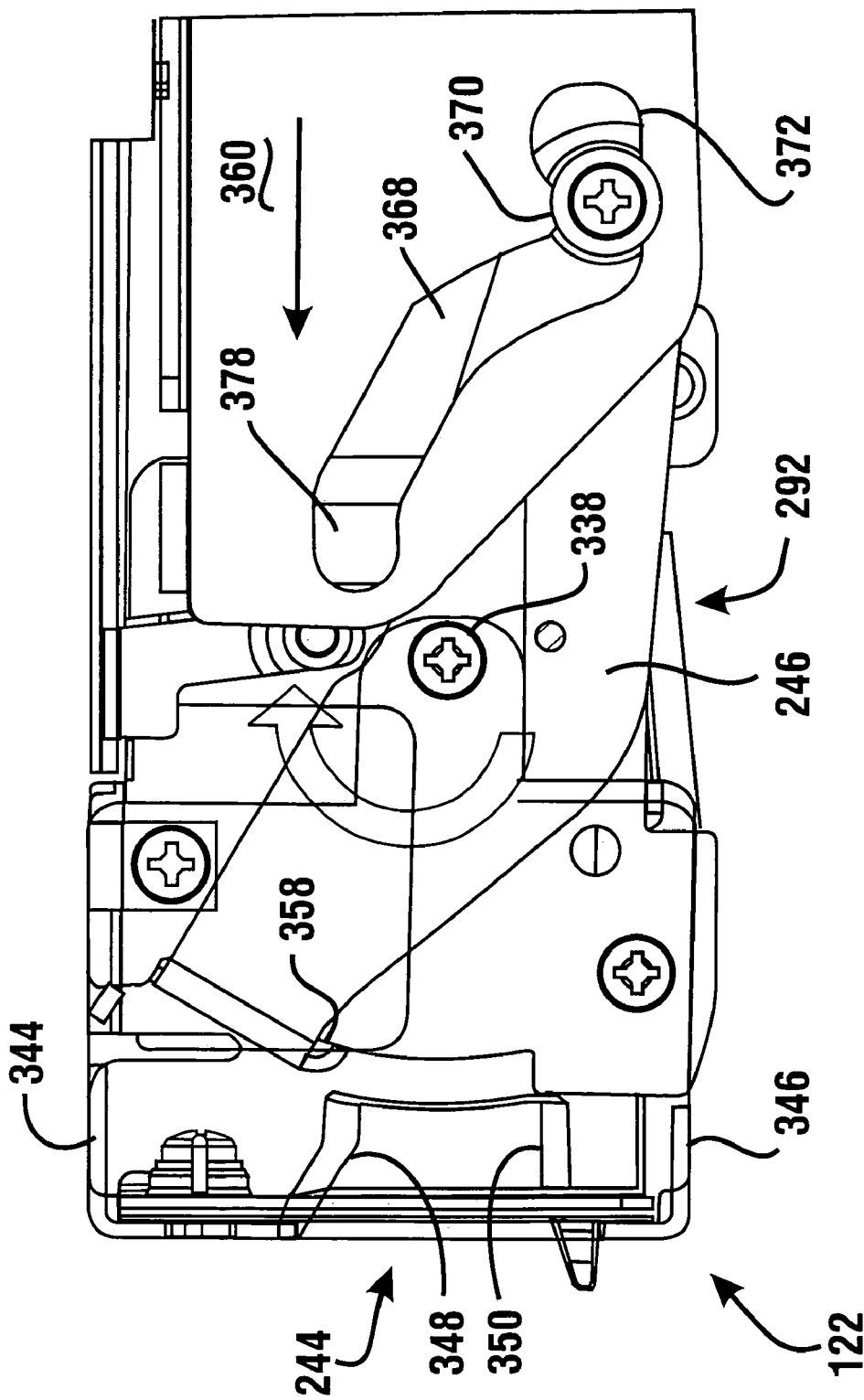
FIG. 47 is a side view showing the transport gate in a fully open position.

In the operation of the banking machine when the gate member 246 is to be opened, the actuator member 360 is moved to the forward position shown in FIG. 47. This causes the cam follower 370 to move from the cam slot 368 to a relatively low position in a generally horizontally extending end portion of the cam slot. Because the cam follower is positioned on an opposite side of the pivot 338, the inward extending portion 358 of the gate is moved upward beyond the opening 244. This is the position of the gate shown in FIG. 23 and enables items to pass in and out of the transport.

Figure 45:
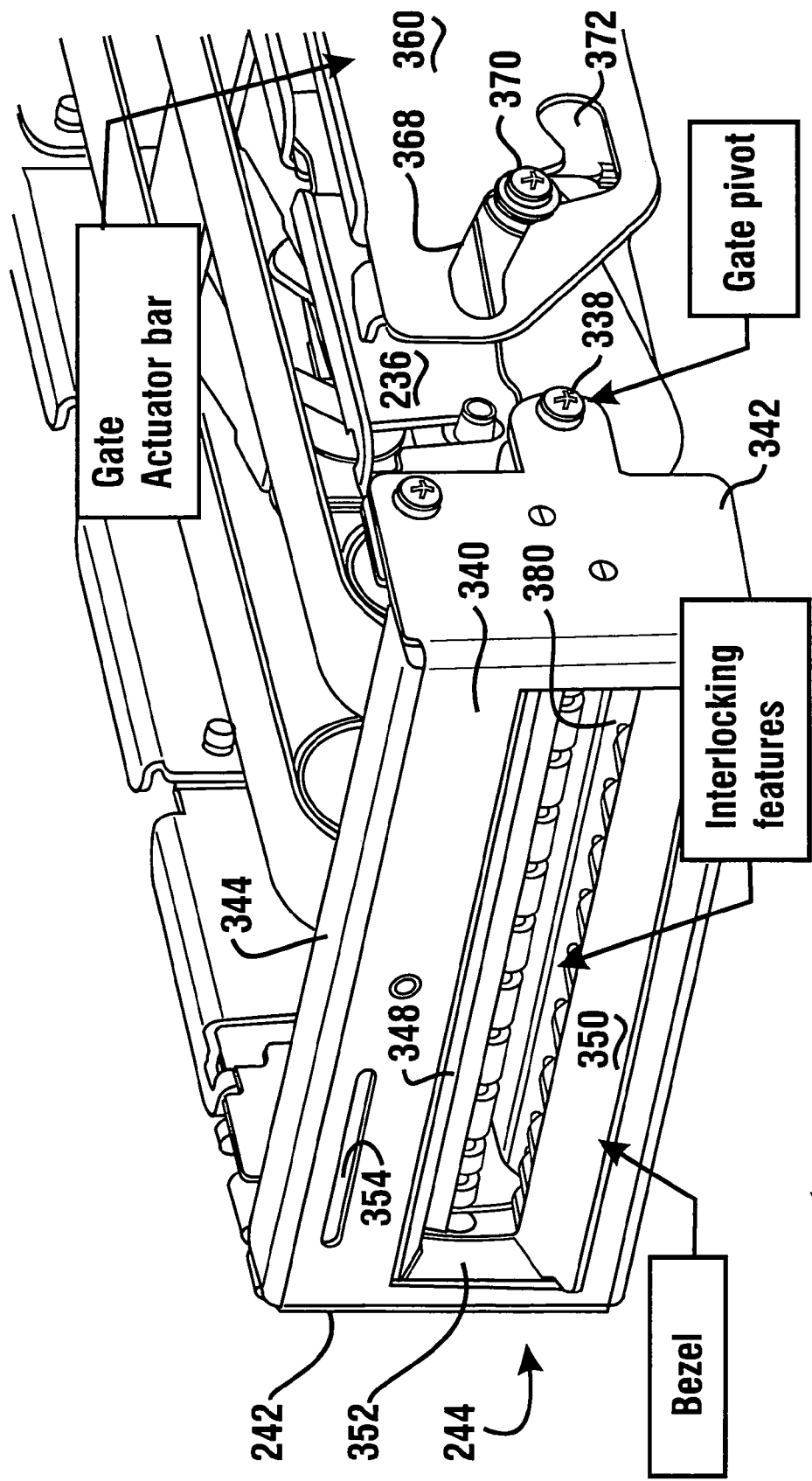
FIG. 45 is an isometric view showing the outer end of the transport including overlying bezel and movable gate portions.
Figure 48:
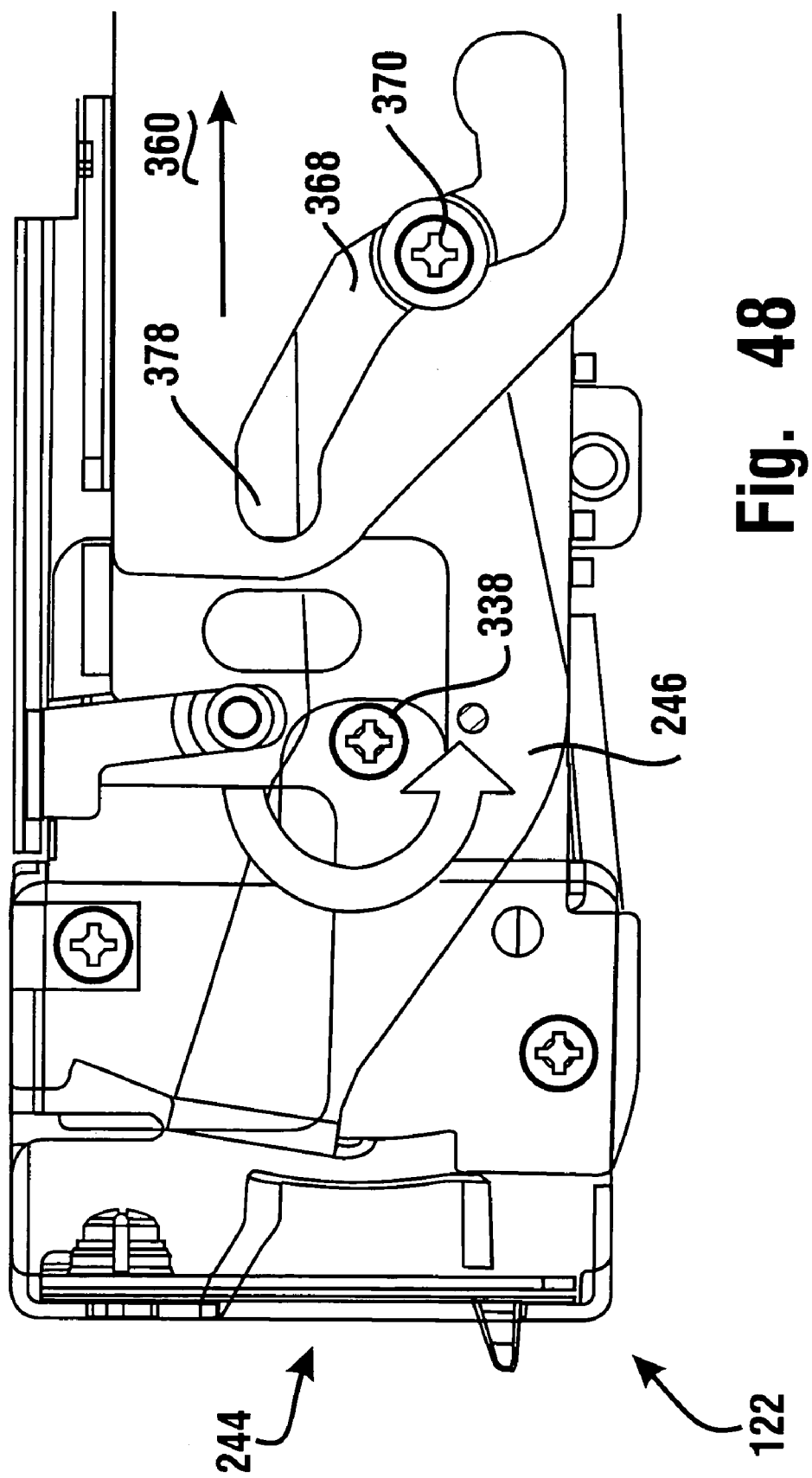
FIG. 48 is a side view similar to FIG. 47 showing the gate in a partially open position.
Figure 49:
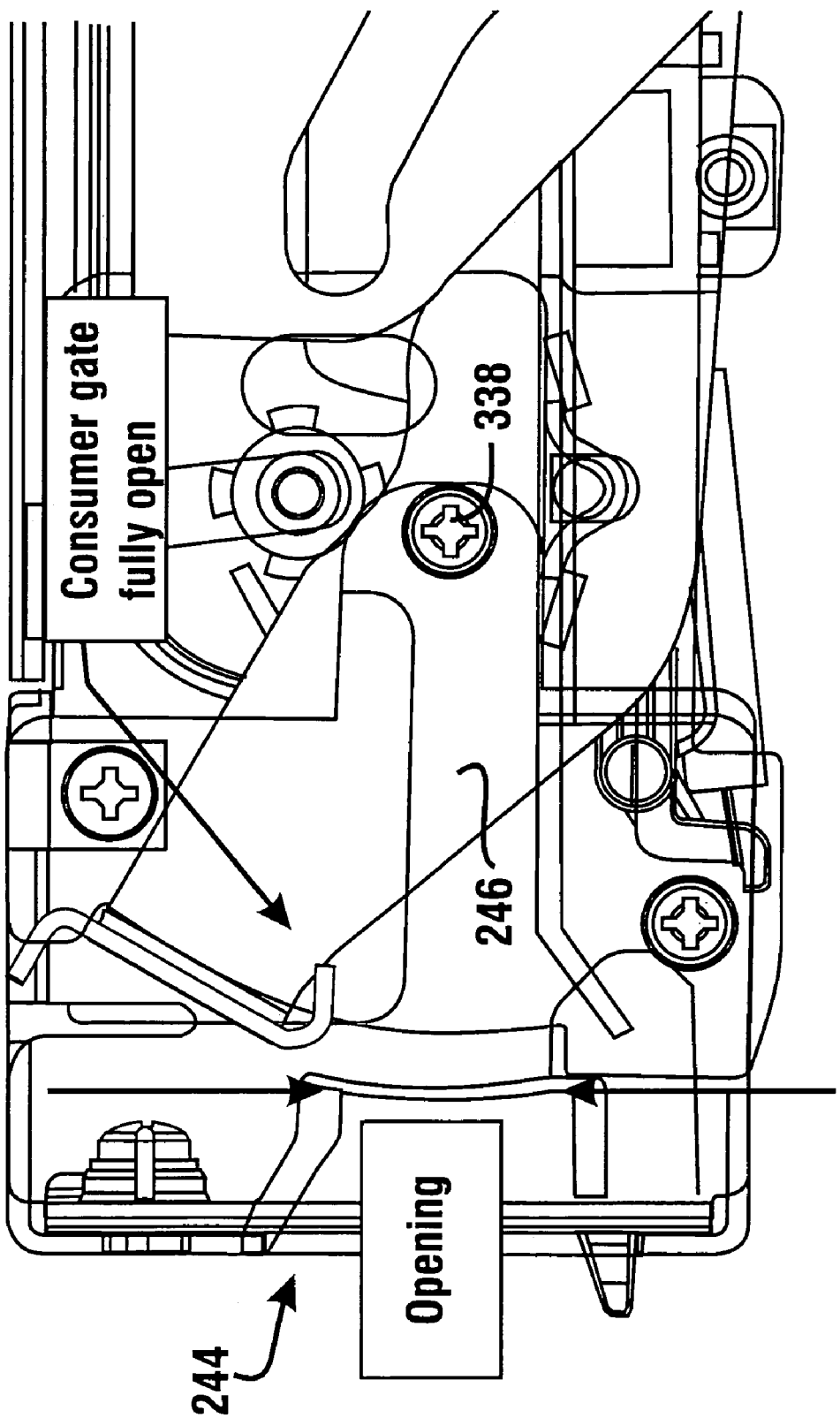
FIG. 49 is a side view similar to FIG. 47 showing the transport gate in an open position.

Movement of the actuator member 360 rearward causes the cam follower 370 to move to an intermediate position in a middle portion of the cam slot 368 which is shown in FIGS. 45 and 48. In this position the gate 246 is between the open and closed positions. Further movement of actuator member 360 rearward from the position shown in FIGS. 45 and 48 moves the cam follower by engagement with the cam surface bounding the slot into a generally horizontally extending upper end portion 378 of the cam slot 368. In this position the gate is moved to the forward closed position shown in FIG. 50. As can be appreciated from FIGS. 48 and 47, the upper end portion of the cam slot extends in a generally horizontal and a somewhat downward facing orientation. In the exemplary embodiment this reduces the risk that the gate member can be forced open by causing the actuator member 360 to move. This results because external force applied toward opening the gate does not result in the cam follower 370 applying force on the actuator member 360 that would tend to cause it to translate along the direction of Arrow V. Of course these approaches are exemplary and in other embodiments other approaches may be used.

As previously mentioned, in the exemplary embodiment the bezel includes in supporting connection therewith projections which are referred to as zipper portions 380. Zipper portions 380 are operative in the exemplary embodiment to extend in engaged relation in recesses in inward extending portion 358 of the gate member 246 and the serrated lead in surface 302 of the base 294. Zipper portions 380 extend in the direction of transport and in interlocking relation between the openings in the members when the gate is in the closed position. Such zipper portions may further serve to provide resistance to deformation and tampering with the gate member. Of course these structures are exemplary and in other embodiments other approaches may be used.

Further in the exemplary embodiment circuitry and programming of the controller may be employed to facilitate dealing with situations and may occur at the ATM and which may otherwise cause problems or an out of service condition. Such conditions may sometimes result from persons sticking their fingers or other objects in the opening to the transport at times when the gate is to move from the open to the closed position. Other conditions which may occur may result from moisture entering the area adjacent to the gate and then freezing due to the ATM being positioned in an outdoor environment. When this occurs the ice that forms may cause the gate to be frozen shut. A further alternative condition that may occur may be a situation when the envelope such as one that has been dispensed from the mechanism to a customer or alternatively one that a customer may have begun to insert, is left in the opening in an area underneath the gate.

In an exemplary embodiment the controller in conjunction with associated circuitry is operative to monitor at least one parameter associated with gate movement as a function of time. In the exemplary embodiment, the parameter monitored is current and the controller is operative to compare a normal profile of current versus time for a normal gate opening and/or closing operation with a current versus time profile that is encountered during each opening and closing operation of the gate. This is achieved in the exemplary embodiment by monitoring the current draw versus time for the drive that moves gear 376. Such comparisons which are ongoing in the opening and closing operations, enable detection of undesirable or unusual conditions and the controller operates in accordance with its programming to prevent malfunctions or to minimize damage that may result from such conditions.

If for example the gate is frozen in the closed position due to freezing rain or other conditions, the current versus time profile encountered when the controller operates to try to open the gate would indicate a high electrical current in a short period of time after the gate is commanded to open. The comparison executed by the processor of the encountered current versus time profile to the expected profile would indicate the anomaly to the controller which would then operate in accordance with its programmed instructions to prevent further attempts to open the gate and/or would indicate a problem to a user and/or servicer. Further in some exemplary embodiments the programming associated with the controller may continue to enable the machine to operate to carry out transactions even though the deposit transaction is unavailable. In some exemplary embodiments the controller may further operate in accordance with its programming to attempt further corrective action such as causing the drive for the geared actuator to go into a vibratory mode of the type previously discussed through the use of stepper motors so as to break loose any obstruction. Alternatively or in addition the controller may operate to turn on heaters, cause a de-icing material to be applied to the area of the gate or to take other action which may be suitable for purposes of bringing the machine back into normal operation. The controller may operate after attempting the corrective action to operate the gate and take repeat or other corrective action if a problem is still encountered.

In other exemplary circumstances a person may stick their fingers or other objects into the area of the open gate. Again, in these circumstances the circuitry and/or processor comparing the current versus time profile encountered for the drive attempting to move the actuator member would detect the discrepancy between what is actually being encountered and that which is normally expected. In such circumstances, however, the controller may operate in accordance with its programming to cause the drive to reverse the direction of the actuator so as to open the gate. In addition or in the alternative the controller may operate in accordance with its programming to take steps to clear the jam. This may include for example taking repeated steps to open and close the gate. Alternatively or in addition the controller may operate to cause the drive to run the transport belts and/or to dispense and/or retract one or more envelopes from the transport so as to attempt to clear the obstructions.

Alternatively or in addition the controller within the machine that is operative to compare the current versus time profile encountered in a given situation to that which is normally expected may be programmably operated to take actions selectively depending on the nature of the profile encountered. For example, if the current versus time profile encountered shows a moderate and/or gradual rise in current draw as the gate is reaching the closed position, this may be indicative of the presence of fingers, an envelope or other generally soft material. Alternatively if a rapid rise occurs it may indicate the insertion of a hard substance or tool into the transport. This may be indicative of a burglary attempt or other malfunction, and appropriate authorities may be notified. This may be done in the manner indicated in U.S. Pat. No. 5,984,178, the disclosure of which is incorporated by reference. Alternatively, the ATM or associated device may be operative to capture and store images of the user and/or the machine. This may be done in the manner shown in U.S. Pat. No. 6,583,810, which is also incorporated herein by reference. The controller may operate to take actions based on its programming responsive to the profile encountered.

Further in some exemplary embodiments the features associated with monitoring the current versus time profile in a given situation and comparing it to an expected current versus time profile may be combined with other sensing features such as sensing the position in which the gate encounters the obstruction, sensing the area of the gate with the obstruction, the temperature in the area of the gate and other appropriate sensors so as to enable the controller to make selective determinations as to actions to be attempted. Of course, these approaches are exemplary and in other embodiments other or additional approaches may be used.

Figure 51:
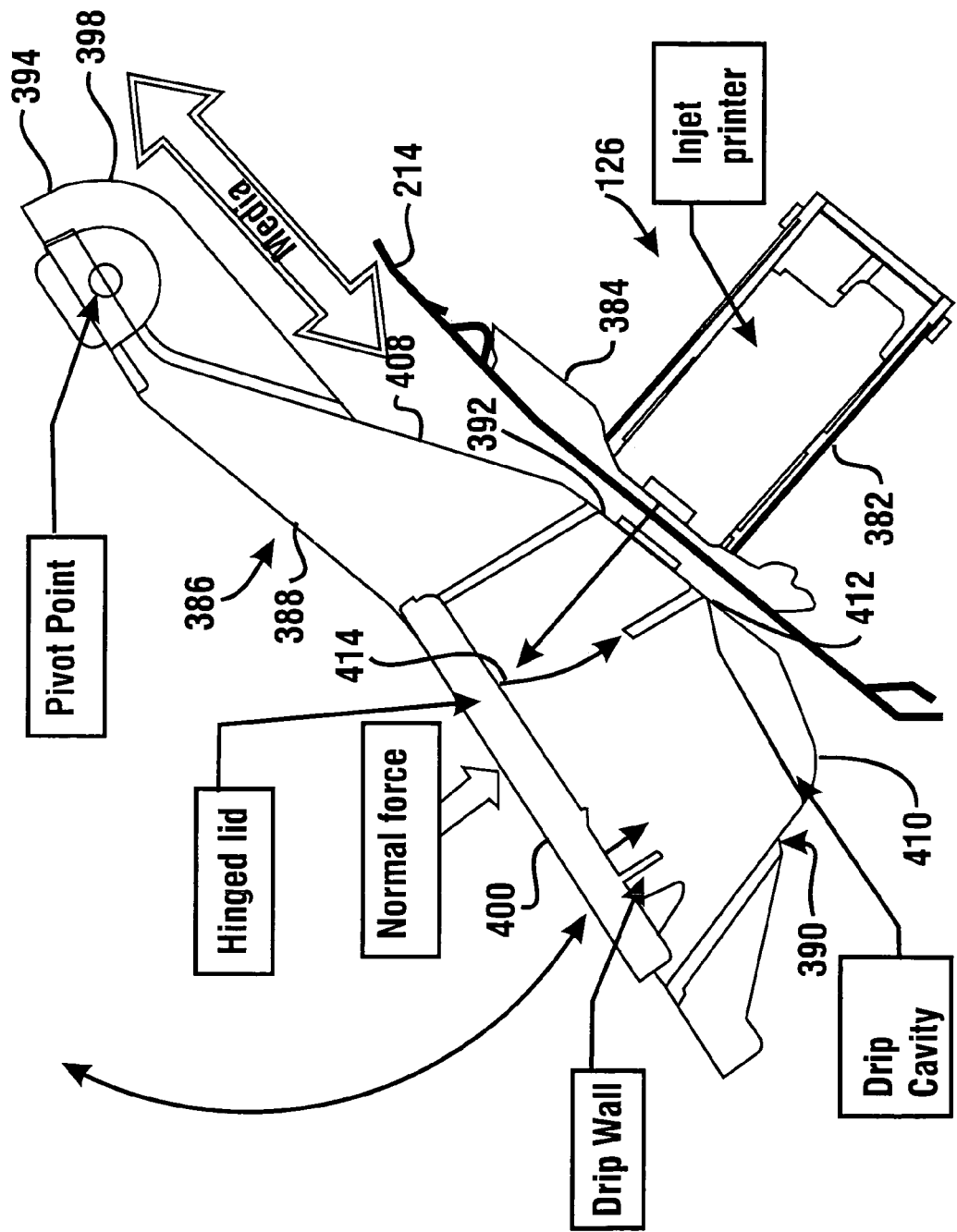
FIG. 51 is a side schematic view showing an exemplary form of the portion of the transport including an inkjet printing device and a further ink capture device or vessel for capturing excess ink from the printing device.
Figure 52:
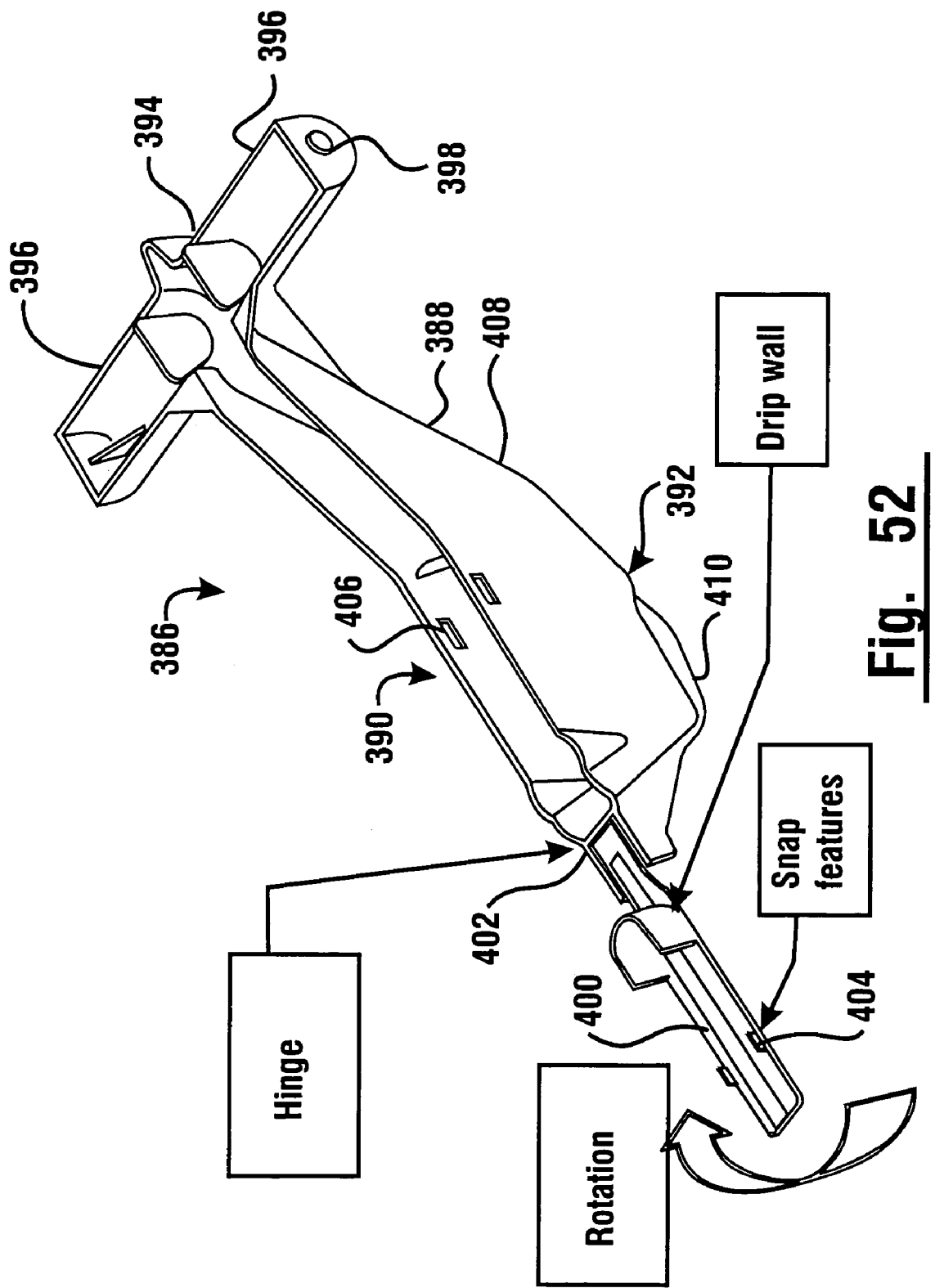
FIG. 52 is an isometric view showing the ink capture device of FIG. 51 with the access door thereto in an open position.
Figure 53:
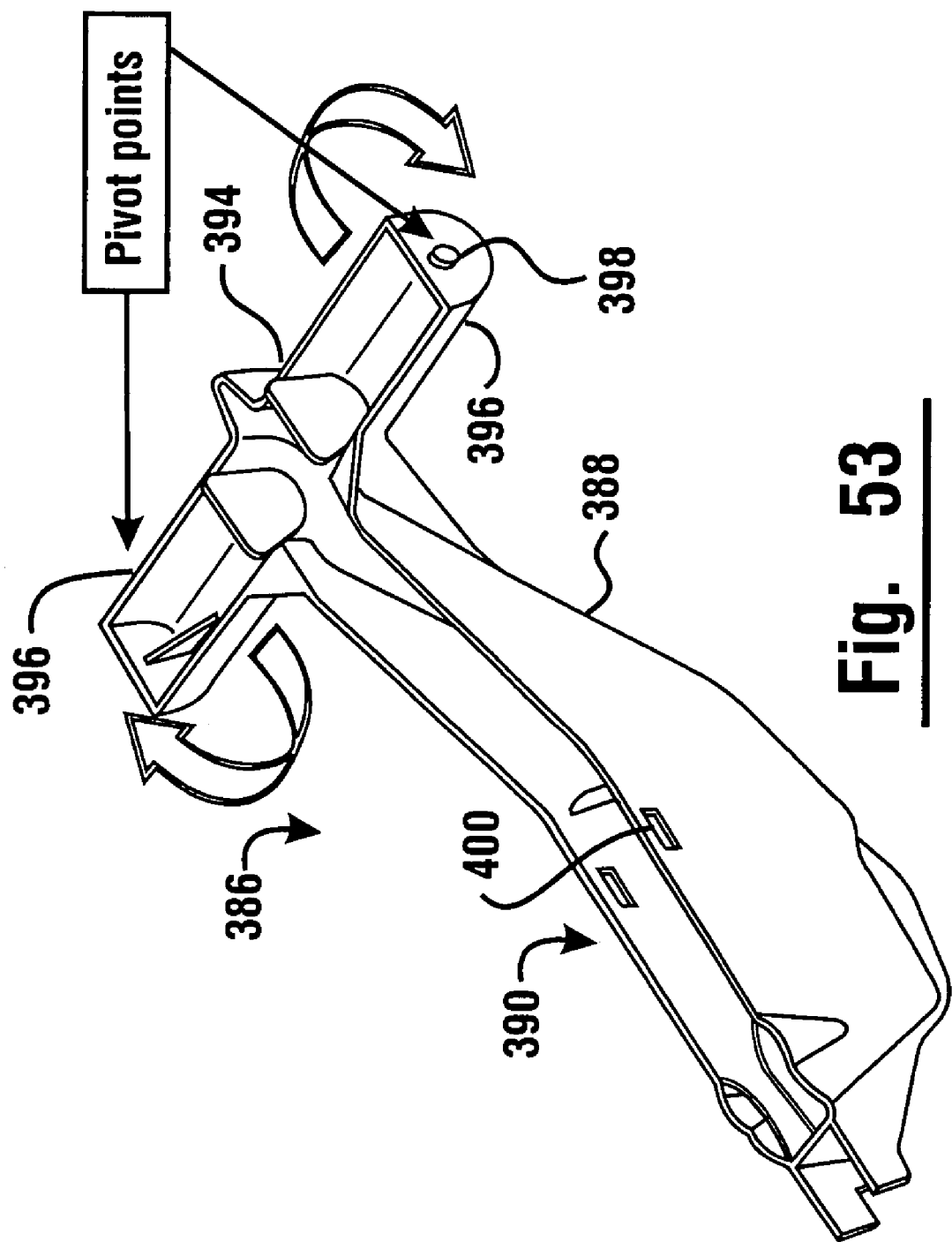
FIG. 53 is an isometric view similar to FIG. 52 but showing the ink capture device with the access door thereto in an closed position and schematically indicating removable rotatable mounting thereof.

As previously discussed, in an exemplary embodiment a recording device which comprises an inkjet printer is used. As shown in FIG. 51, in the exemplary embodiment an inkjet printer 382 comprises a removable cartridge that is mounted with a print head including nozzles adjacent to platen 214. The inkjet printer is operated such that ink is sprayed out of the nozzles in the print head to produce patterns of indicia onto envelopes that pass through the transport in supporting connection with platen 214. In the exemplary embodiment the inkjet printer is operative to produce the indicia by directing ink through an opening in a wiper device 384 as later discussed.

In the exemplary embodiment a mechanism for catching excess ink which is not deposited onto envelopes, as well as which helps to maintain envelopes in an appropriate position is provided. In the exemplary embodiment this is accomplished through an ink spittoon generally indicated 386. The exemplary form of the ink spittoon which serves as a vessel and which includes a generally hollow body 388 with a cavity 390 therein. Cavity 390 has an opening thereto indicated 392. Opening 392 generally overlies the nozzles of the inkjet printer 382 in the operative position of the spittoon as shown in FIG. 51. As can be appreciated, this enables ink that is output by the nozzles of the print head to pass into the cavity 390 within the body 388 through the opening 392 if no envelope or other item is present in intermediate relation in the transport.

The exemplary form of the spittoon 386 includes a head portion 394. Head portion 394 includes a pair of outward-extending arms 396 which terminate in pivot pins 398. In the exemplary embodiment pins 398 are releasibly engageable in opposed walls bounding the area above the curved platen 214 to provide a pivot mount. In addition, pins 398 are engaged with such walls so as to enable the spittoon to generally readily rotate about the pins for purposes that are later explained, and to generally bias the opening 392 toward the location of the nozzles.

In the exemplary embodiment, the body 388 includes in operative connection therewith a rotatable door 400 which serves as an access member that enables access to the interior cavity within the spittoon. Door 400 is rotatable about a hinge portion 402 so as to enable access to the cavity 390. Door 400 of the exemplary embodiment includes integral snap projections 404 which are operative to releasibly engage snap accepting recesses 406 in the side walls of the body 388 bounding the cavity 390. Door 400 enables the interior of the cavity to be readily accessed for purposes of cleaning ink from the interior thereof.

In the exemplary embodiment of the spittoon 386, the body 388 is configured to include a cam surface 408. Cam surface 408 is contoured so as to urge envelopes or other media moving inward in supporting connection with platen 214 to be moved towards the nozzles of the inkjet printer 382. Body 388 further includes a cam surface 410. Cam surface 410 is contoured so as to direct envelopes or other media moving outward past the inkjet printer to be urged towards the platen 214 and the printer nozzles. In the exemplary embodiment a generally planer surface 412, which includes the opening 392, extends between cam surfaces 408 and 410. Of course, this structure is exemplary and in other embodiments other approaches may be used.

In the exemplary embodiment of the spittoon 386 the cavity 390 includes therein a portion which extends below the opening 392. As a result, ink which may pass into the cavity through the opening tends to drip from the interior of the lid and walls bounding the cavity and to collect in the lower portion thereof below the opening. In the exemplary embodiment as represented in FIG. 51, which shows the cavity in cross-section, a weir 414 is provided within the cavity so as to enable ink to build up therein on the lower side of the weir away from the opening 392 to a level vertically above the opening 392. This construction further facilitates the spittoon operating for an extended period before it needs to be cleaned or replaced.

In operation of the exemplary embodiment circumstances may occur when the controller operates the machine to print indicia on envelopes during which no envelope is present. In such circumstances, the ink passes from the nozzles through the opening 392 and is captured within the cavity 388. This ink may otherwise collect on other surfaces within the unit eventually causing the malfunction thereof. In addition or in the alternative, misdirected ink may result in collection of ink or other material on envelopes, rollers and other surfaces that may impede appropriate marking of envelopes. In addition, inkjet printers may sometimes benefit from periodic efforts to test and clear inkjet nozzles that may become clogged. The exemplary structures enable such testing to be done with no envelope present, as the ink can be captured within the cavity of the spittoon structure. In addition, the structure further avoids the need for a cotton pad or other similar structure which is sometimes used in printers to collect excess ink which must be captured when no media is present. In alternative embodiments sensors may be provided on the spittoon either inside or on an outer surface thereof to sense for operational aspects of the printer.

A further useful aspect of the exemplary spittoon structure is that the body is biased about the pins toward an overlying relation with the nozzles of the print head of the inkjet print cartridge. The body thereby serves to cover the inkjet nozzles and reduce the risk of airborne dust or other contaminants collecting therein. In addition, the cam surfaces 408 and 410 serve to guide envelopes and/or other media moving past the inkjet printer into an appropriate position adjacent to the inkjet nozzles so as to facilitate printing thereon. A further useful aspect of the exemplary embodiment is that the pins and arm structures enable the ready disengagement of the body from the mechanism so as to facilitate replacement or cleaning. Further, the flip-open door bounding the cavity further facilitates collecting the ink while enabling more ready cleaning of the interior thereof. Of course, it should be understood that these features are exemplary and in other embodiments, other or additional features may be used.

Figure 57:
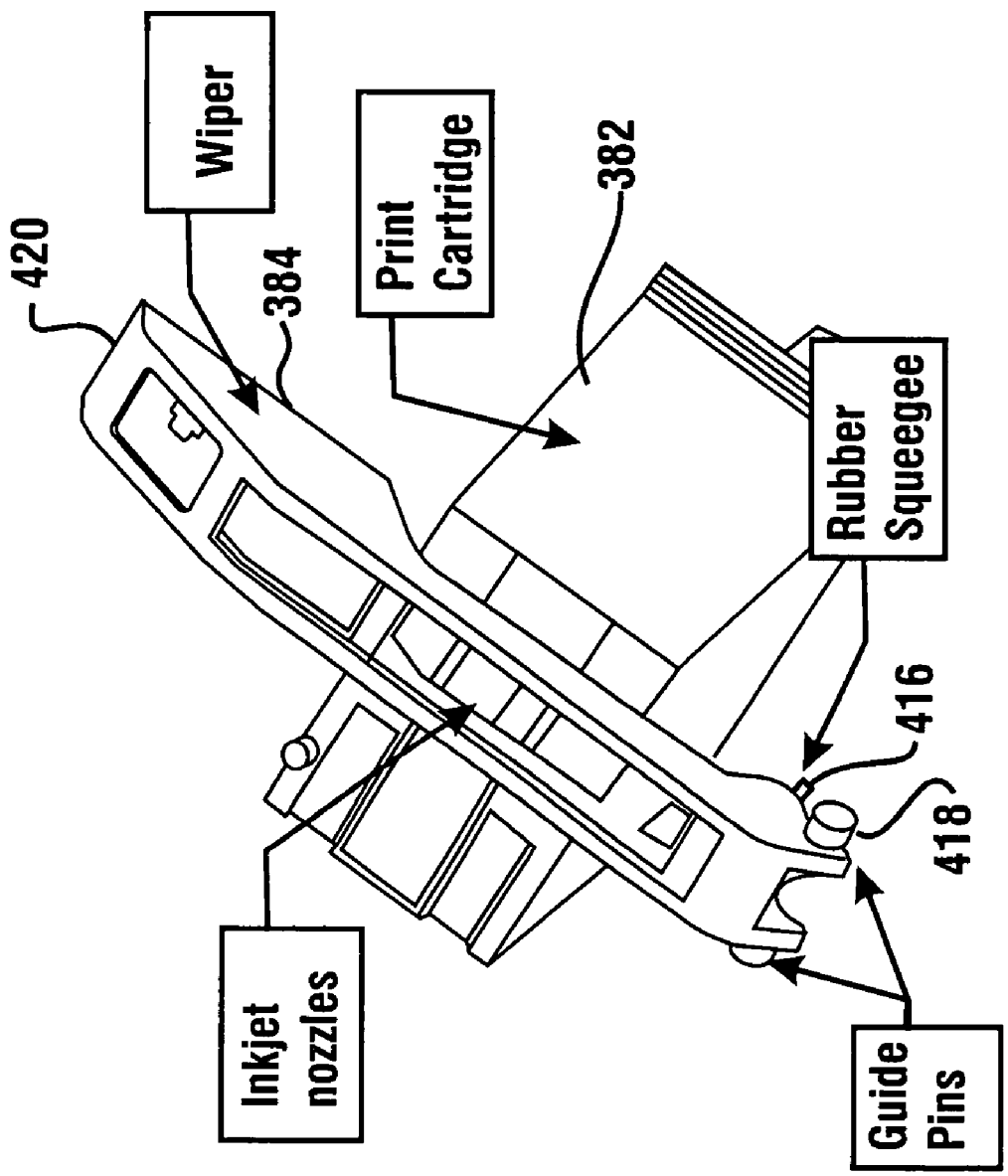
FIG. 57 is a further isometric view showing the wiping member and the printhead.
Figure 58:
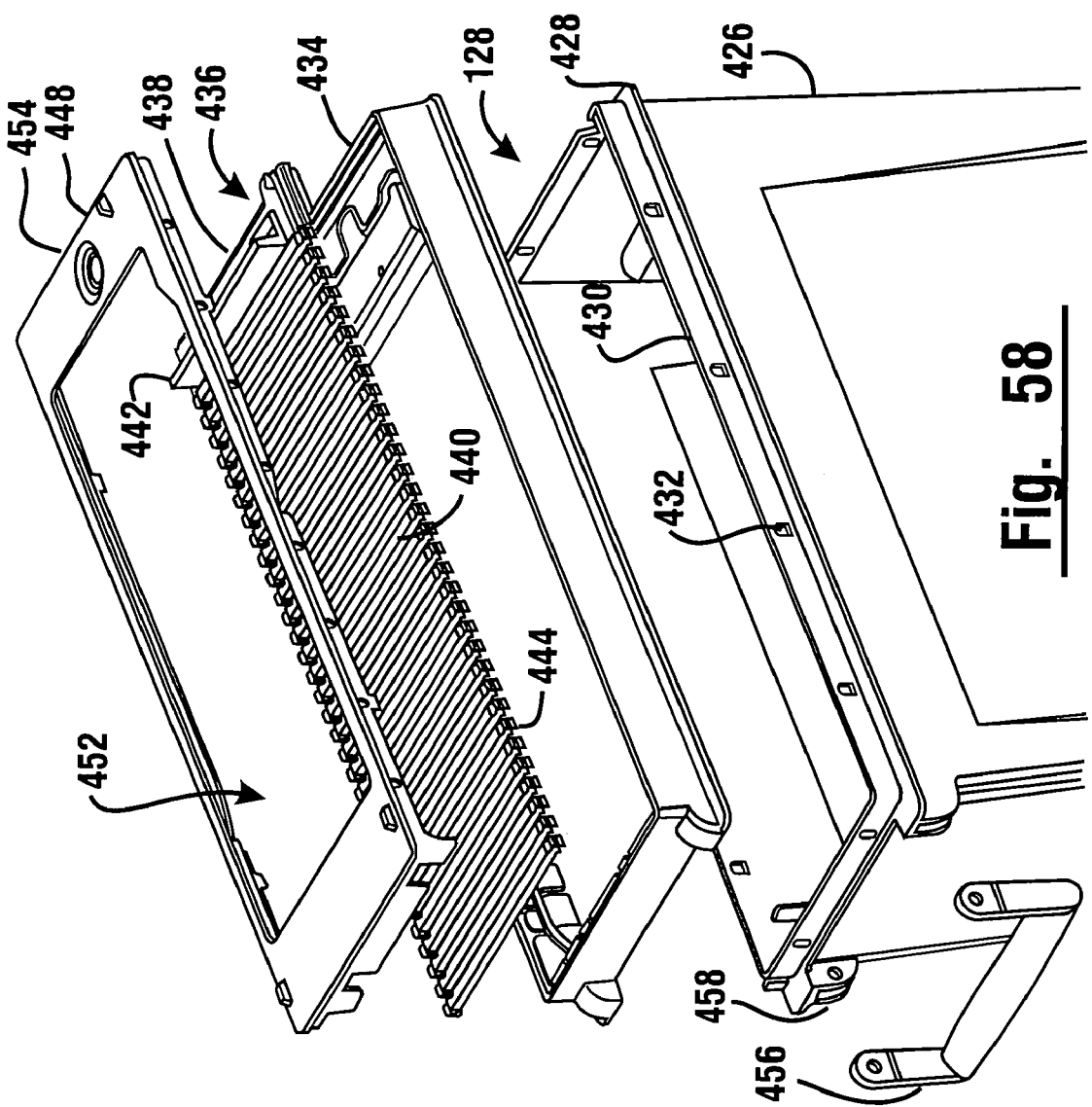
FIG. 58 is an exploded view of a removable deposit holding container and the movable door mechanism used in connection with an exemplary embodiment.

Also, in the exemplary embodiment, tending of the nozzles of the inkjet printer 382 is achieved through movement of the wiper device 384. As previously discussed, in the exemplary embodiment, the wiper device spans the nozzle area of the inkjet printer 382 and includes openings therein through which the nozzles may spray ink. This is best shown in the operative position of the member 384 represented in FIG. 57. Wiper device 384 includes a resilient squeegee portion 416 that extends downward and is adapted to engage the surface of the inkjet printer including the ink nozzles. A pair of opposed pin members 418 extend outward from the wiper device 384 in an area to the rear and above the squeegee portion.

Figure 54:
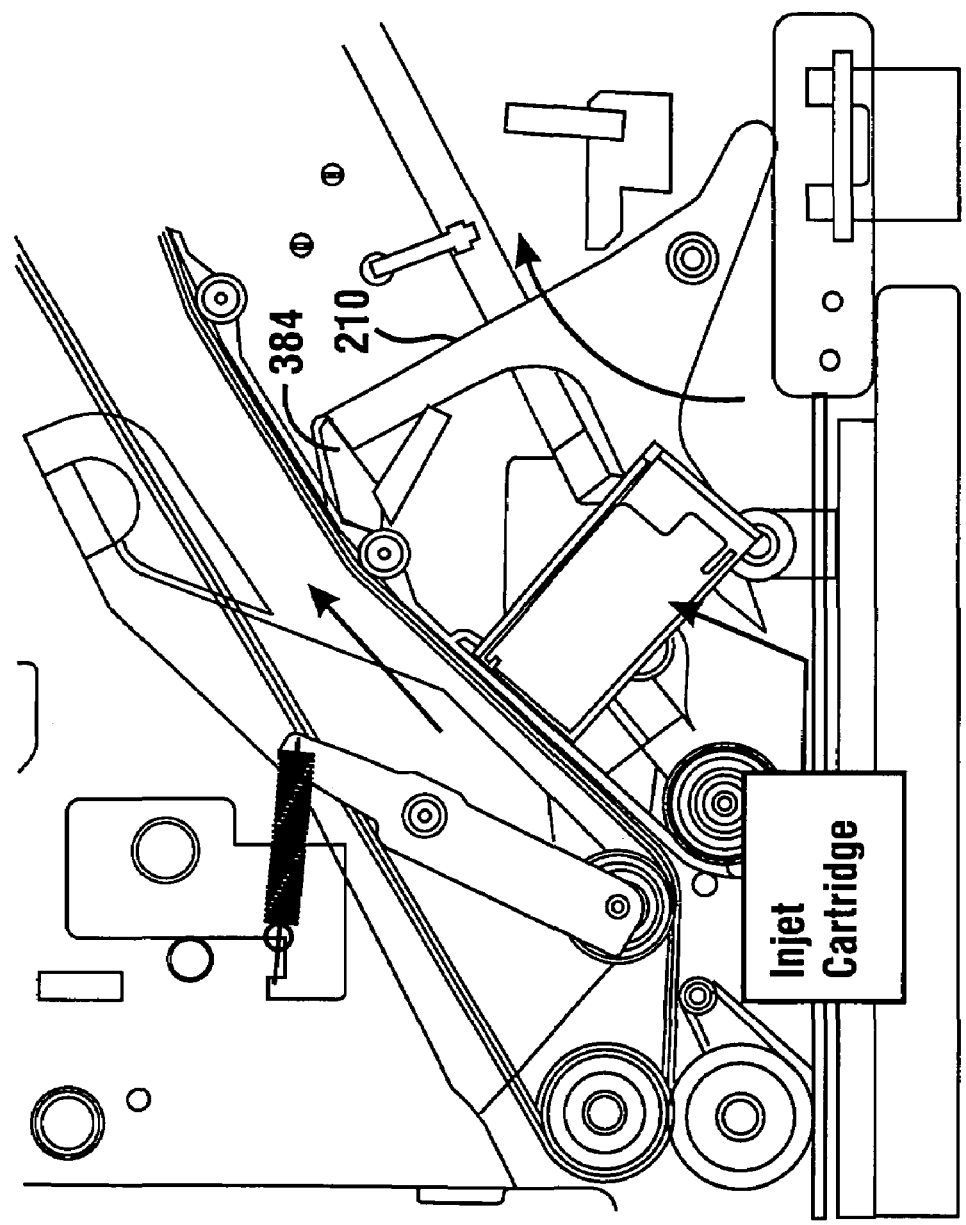
FIG. 54 is a side schematic view showing the mechanism for tending to nozzles of the inkjet cartridge of the exemplary embodiment through wiping action.

It is best shown in FIGS. 18 and 54 the leading end 420 of the wiper device 384 is operatively connected to arm 210. In the exemplary embodiment the wiper is made generally readily releasable from the arm such as through a shaft and detent connection. Arm 210 is operative to rotate responsive to movement of the baffle 196 by the drive assembly 200. This occurs due to the action of head tend roller 208 operating on a cam surface which is operatively connected to arm 210.

Figure 55:
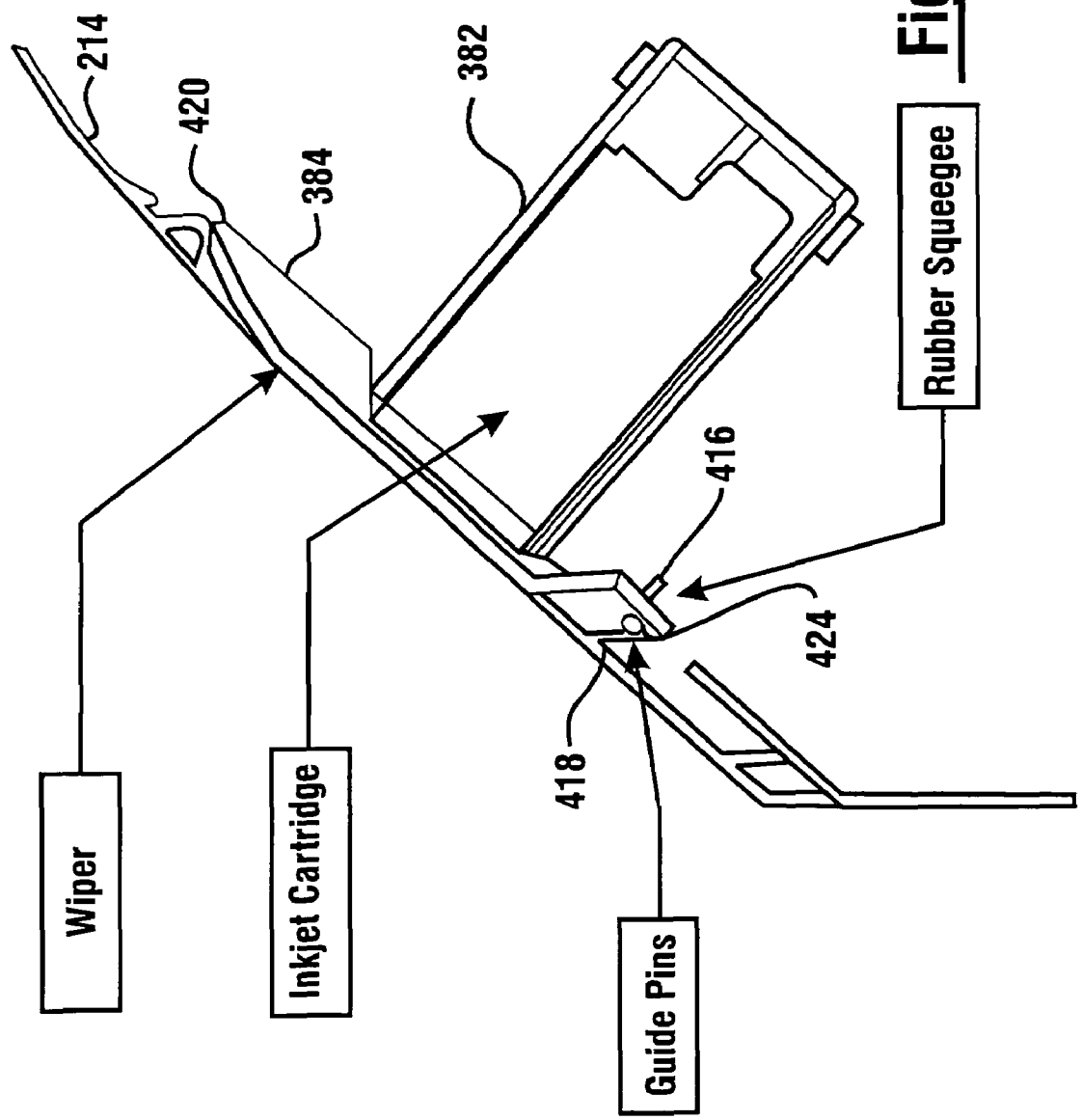
FIG. 55 is a side view showing the inkjet cartridge of the exemplary embodiment along with a movable wiper member providing with a squeegee portion such wiping action.
Figure 56:
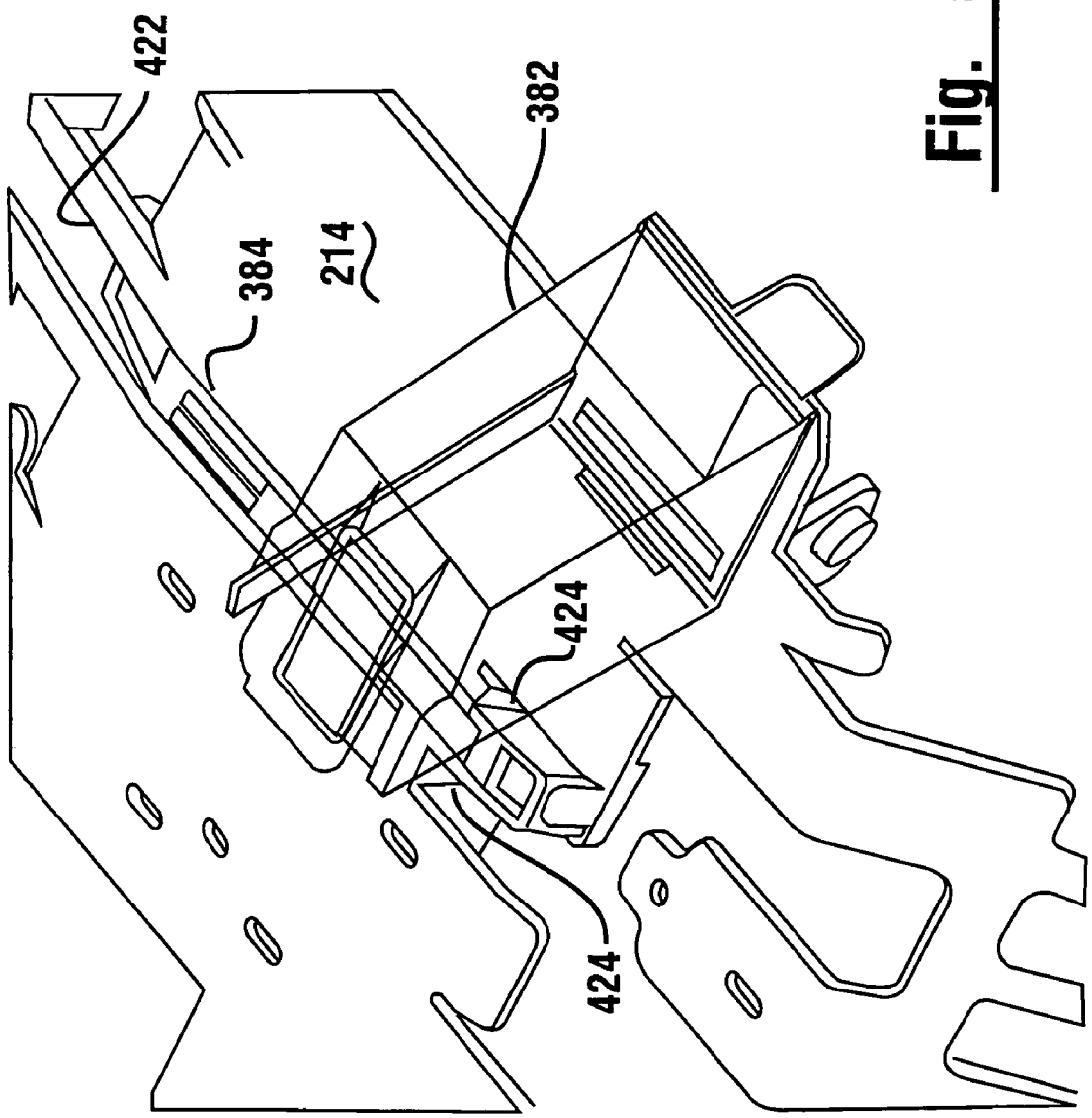
FIG. 56 is an isometric view showing schematically the wiper member on the printhead.

As represented in FIG. 55, platen 214 as formed therein a slot 422 in which the wiper device 384 is moveable. Adjacent to the slot in the area of pins 418 are a pair of disposed ramp portions 424. Initially the wiper is positioned generally flush with the deposit item engaging surface of the platen. Responsive to movement of the baffle 196, roller 208 engages the cam on arm 210. Arm 210 moves and causes the wiper device 384 to move to the right as shown in FIGS. 54 through 57. As wiper device 384 moves it is guided and maintained within the slot 422. As the wiper device 384 moves forward, pins 418 move upward as shown in engagement with ramp portions 424. This causes pins 418 to move upward and on to the upper surface of the platen 214. In this position the squeegee portion 416 continues to extend in the slot.

As the wiper device 384 moves forward the squeegee portion 416 is moved forward across the inkjet nozzles. Wiping force is further provided to the squeegee portion by the engagement of the wiper device 384 with the surface 412 of the overlying body 388 of the spittoon 386. Further, once the wiper device 384 has moved to a fully-forward position, the controller operates the drive so as to return the baffle 396 to its original position. As this occurs the wiper device 384 moves to the left as shown causing the squeegee portion 416 to again wipe the inkjet nozzles. The wiper device eventually returns to a position where its upper surface is flush with the platen. This wiping activity maintains the nozzles generally without an accumulation of ink adjacent thereto and helps to preserve the proper operation thereof. Further in the exemplary embodiment this activity maintaining the proper condition of the inkjet nozzles is accomplished in conjunction with movement of the baffle which provides for the picking of empty deposit envelopes and the acceptance of deposit envelopes into the deposit holder container. Therefore because of interconnection between the gate, picking and head tending functions, the activities tending to the inkjet nozzles is carried out when activities involving use of the printer are executed by the machine. Of course, this approach is exemplary and in other embodiments other approaches may be used.

In the exemplary embodiment servicing procedures may be readily conducted so as to service and/or replace the inkjet printer cartridge, ink holding spittoon, and/or wiper. In the exemplary embodiment a servicer commences servicing by unlocking the lock that enables accessing the cabinet portion of the housing where the transport is located. As later discussed, in the exemplary embodiment the base portion 144 of the deposit mechanism is movably mounted on slides so as to enable it to be extended outside the machine for more ready servicing. As later discussed in detail, such movement is controlled so as to minimize the risk that persons who are servicing the machine and who only have access to the cabinet portion do not improperly access deposit items. Therefore in some embodiments, servicers who have authority to access the chest portion and remove the deposit holding container so as to enable moving the deposit mechanism out of the machine may do so, which may make conducting the service procedures even easier.

In the exemplary embodiment the spittoon 386 may be readily disengaged from supporting connection with the housing by disengaging the pins 398 extending on the head portion from the engaging recesses on the housing. This enables the spittoon to be moved away from the nozzles of the ink jet printer as well as to be moved outside the machine. Thereafter a servicer may open the door 400 on the spittoon to access the internal cavity and remove the accumulated ink therefrom. Alternatively a servicer may replace the spittoon with ink therein with a different spittoon which has no accumulated ink therein. The servicer may thereafter replace the emptied spittoon or replacement spittoon in operative connection with the housing of the machine by engaging the pins thereon with the housing.

In addition, preferably with the spittoon removed from the machine, a servicer may choose to clean or replace the wiper. This may be accomplished by the servicer disengaging the wiper 384 from the arm 210. Such disengagement enables the wiper, including the squeegee portion thereon, to be moved outward from the opening in the platen 214 in which the wiper is normally positioned. With the wiper removed, a servicer may clean and/or inspect the wiper, replace it in the opening, and reengage the wiper with the arm. Alternatively, a servicer may choose to replace the wiper with a new one. In such case the servicer will place the substitute wiper in the opening in the platen and reconnect the arm. As generally it will be more efficient to replace the wiper with the spittoon removed, the servicer will reinstall the spittoon in movable engagement with the housing after the wiper is reinstalled.

Alternatively or in addition, a servicer may at the time of serving the spittoon and/or the wiper replace the inkjet printer cartridge 382. As previously discussed, the printer cartridge is made to be removably mounted in supporting connection with the housing. This is preferably done through deformable members which provide secure engagement for the cartridge but which enable rapid snap disengagement from the housing as well as the electrical connections to the cartridge. A replacement cartridge may thereafter be substituted and placed in engagement with the housing. In some methods of servicing, the servicer may replace the cartridge without removing the spittoon or wiper, or may remove and/or replace certain items without replacing the other. The approach taken will depend on the particular circumstances and the reason for servicing.

Generally once the servicer has conducted the service activities the servicer will operate the machine so as to test the operation of the transport and the printer. This may be done, for example, by passing an envelope through the transport and printing indicia thereon. In an exemplary embodiment the servicer provides one or more inputs to the machine so that the controller is operative to cause the printer to print test patterns of indicia so as to verify that the printer is working properly. Once the servicer has verified that proper operation of the printer and transport is occurring, the servicer may close the housing and return the ATM to service. Of course these methods are exemplary and in other embodiments other methods may be used.

The deposit holding container 128 and associated structures used in an exemplary embodiment are now described in connection with FIGS. 58 through 66. In accordance with an exemplary embodiment, the container 128 comprises a holding body 426 which is comprised of generally rigid, plastic material. The holding body 426 includes a pair of outward extending lip portions which include retaining lips 428 which in the operative position of the container extends horizontally. A projecting portion 430 extends on the container generally vertically upward above the lips 428. In the exemplary embodiment the projecting portion includes a plurality of apertures 432.

Figure 60:
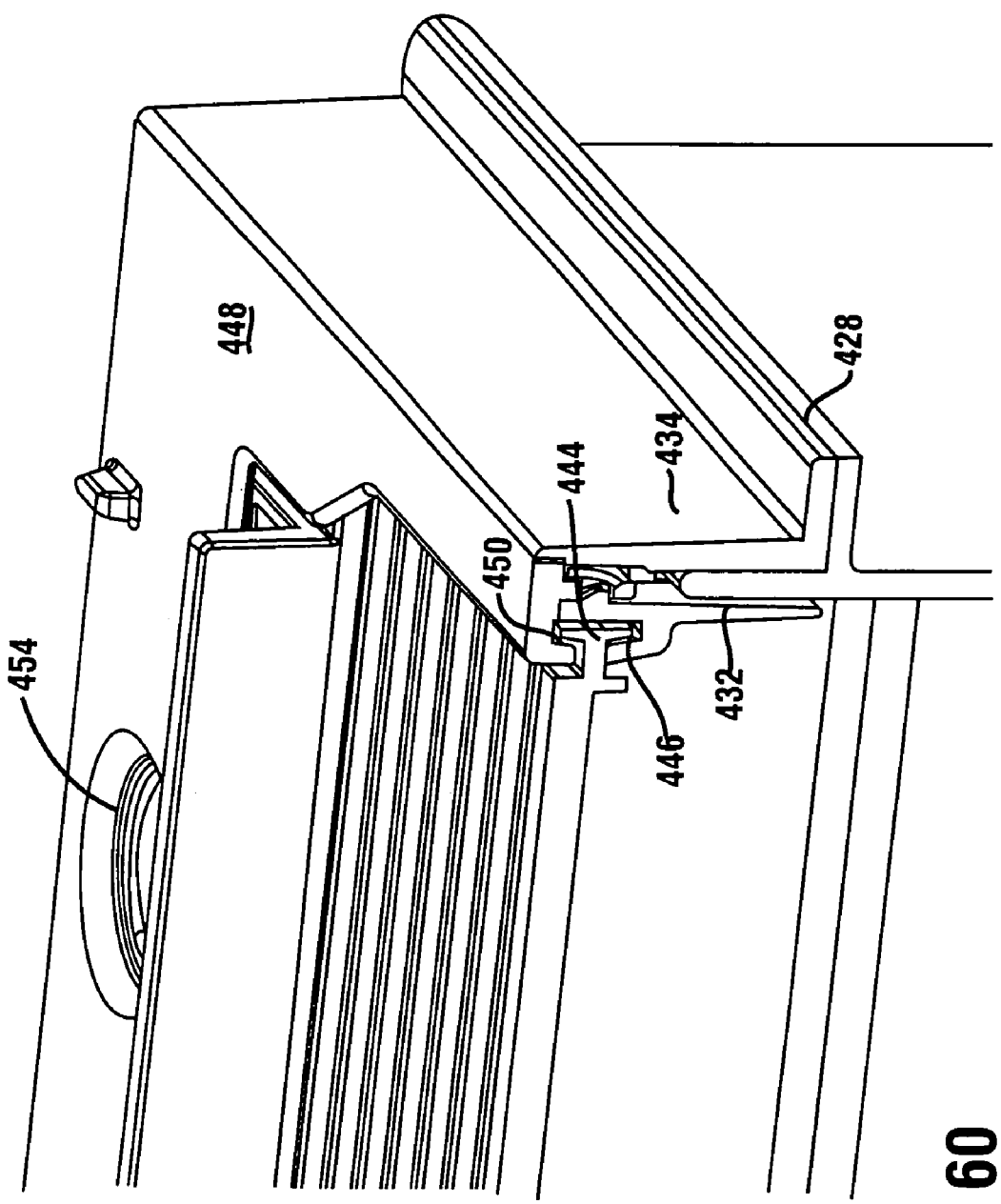
FIG. 60 is an isometric cut-away view showing the construction of the movable door mechanism used in connection with an exemplary embodiment.

A housing 434 is sized to engage projecting portion 430. The housing 434 includes projecting clip members therein which are adapted to engage the apertures 432 in the projecting portion. As shown in FIG. 60, the housing 434 includes surfaces adapted to both overlie and underlie the projecting portion 432.

A generally flexible tambour door 436 is adapted to engage housing 434. Tambour door 436 is preferably comprised of plastic material and includes a generally rigid end portion 438 and a generally flexible portion 440. The flexible portion of the exemplary embodiment is comprised of connected transversely extending slat structures. End portion 438 includes a generally rigid, upward-extending ledge 442, the purpose of which is later discussed in detail. The transverse ends of flexible portion 440 include a plurality of T-shaped cover projections 444. As best shown in FIG. 60 housing 434 includes a recessed track portion 446 on each transverse side thereof. Projections 444 extend in and are enabled to move along the track.

A cover 448 fits in snapped, overlying relation of housing 434. Cover 448 includes a track portion 450 which corresponds to track portion 446 and overlies projections 444. The track portions form a surrounding track in which the cover protections are constrained to move. Cover 448 engages housing 434 in fixed relation such that once they are joined they are not readily separated, and thus the projections 444 attached to the tambour door are enabled to slide in the tracks formed by portion 446 and 450 so as to enable the tambour door to selectively open and close an opening 452 that extends through the cover. As the tambour door moves to the open position, the flexible portion of the tambour door moves into the interior area of the container. In the exemplary embodiment cover 448 also includes an opening 454 for mounting a cylinder key lock therein. The key lock associated with a cylinder in opening 454 may be used for purposes that are later discussed. Further in the exemplary embodiment a handle 456 is pivotally mounted in connection with ears 458 that are molded into holding body 426.

In the exemplary embodiment, the deposit holding container 128 is releasibly mounted within a chest portion of the banking machine. In operation of the exemplary embodiment only authorized persons are enabled to have access to the chest portion. However, in the exemplary embodiment other portions of the deposit accepting mechanism such as those components which are supported above the base 144 are adapted to be positioned in the cabinet portion and outside the chest. While this facilitates servicing of those components outside the chest, it may present risks. Unauthorized persons who gain access to areas of the machine outside the chest may attempt to gain access to the interior of the deposit holding container through the tray opening 204, which corresponds to an opening in the dividing wall that bounds the top of the chest. This must necessarily be accomplished, however, by moving the mechanisms which provide for dispensing of envelopes and moving envelopes to and from the outer end 122. In embodiments where such mechanisms are mounted in supporting connection with the chest in ways that prevent such mechanisms from being cleared away, this may provide adequate security.

In other embodiments, however, it may prove desirable to facilitate more ready servicing of the deposit-accepting mechanism that is positioned above the secure chest. This is accomplished in some embodiments by mounting the base 144 in movable supporting connection with slides 460 which are shown in FIG. 8. In exemplary embodiments the slides are in supporting connection with the dividing wall and may be used to move the base and deposit mechanism and components supported thereon away from the operative position so as to facilitate the servicing thereof. In some exemplary embodiments a service door located on the rear of the machine to the cabinet portion may be unlocked and opened, and the base and other associated components moved outward there through in supporting connection with the slides 460. Because in such embodiments there is a risk that unauthorized persons may gain access to the area above the chest and move the mechanism so as to access the deposit envelope opening in the top of the chest, it may be appropriate to provide a mechanism for reducing the risk of this. This is done in the exemplary embodiment through an interlock mechanism that is shown in connection with FIGS. 63 through 66.

Figure 65:
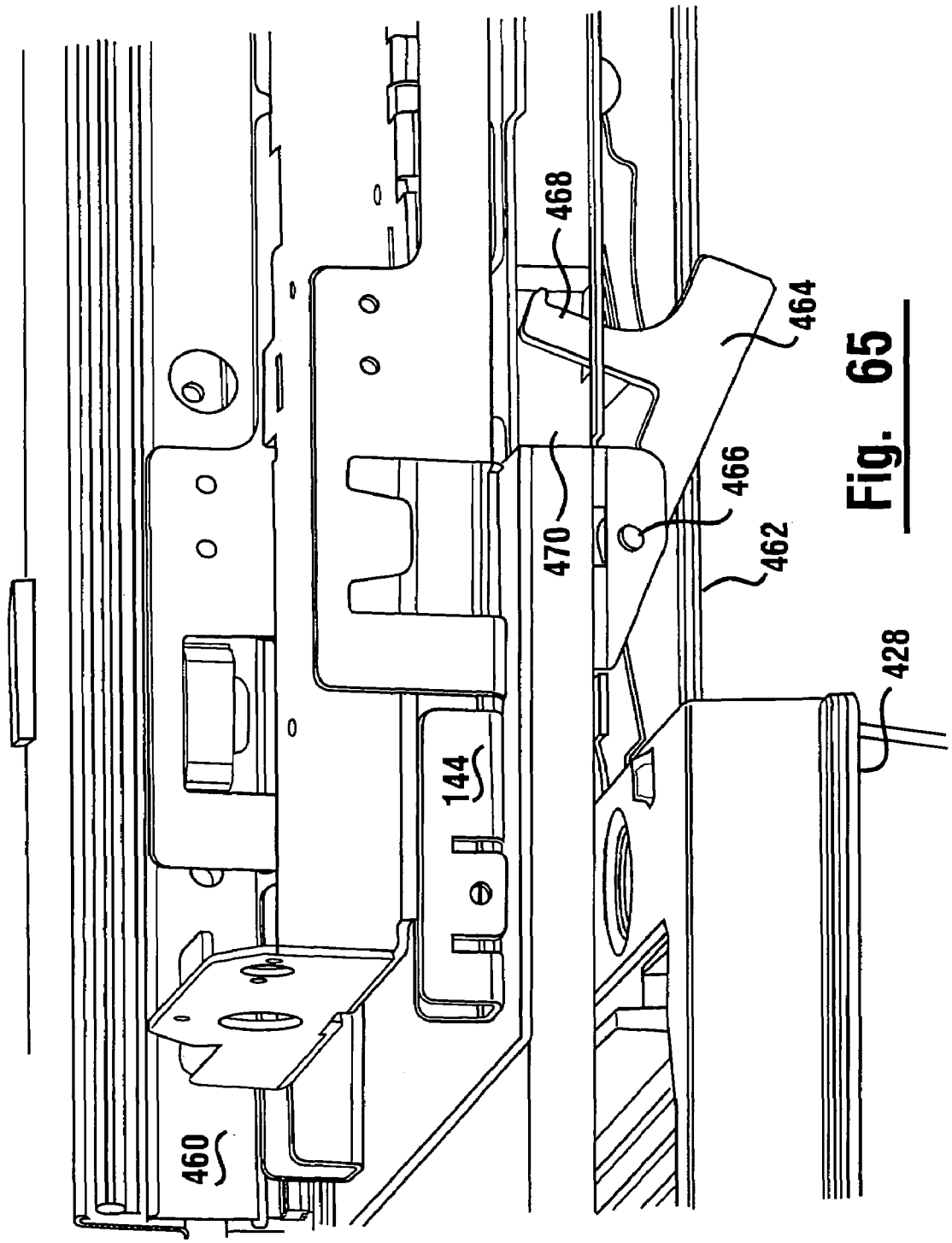
FIG. 65 is a further isometric view showing the interlock mechanism enabling movement of the deposit accepting mechanism when the deposit holding container has been moved from the operative position.

In this exemplary form of the interlock mechanism container 128 is supported within the secure chest by engagement of the lower side of each lip portion 428 along each long side of the container with an inward extending projection 462 located on each side of the container (see FIG. 65). Projections 462 enable the container to be slid into and out of the operative position when the door to the secure chest portion is unlocked and open. In an exemplary embodiment the orientation of the container and chest door is such that the container cannot be moved from the operative position unless the chest door is open. A latch 464 of the interlock mechanism which is rotatable about a pivot 466 includes a projection 468. The projection 468 is aligned with an opening 470 in the dividing wall bounding the chest portion and is operative to engage an opening 472 in the base 144 when the base is in an operative position.

When the deposit holding container 128 is installed in the operative position within the chest portion, the latch 464 is engaged with the cover 448, which causes the projection 468 to extend fully upward and engage the opening in the base 472. This is shown, for example, in FIGS. 63 and 64. In this position of the projection 468, the base 144 is generally prevented from being moved on slides 460 to a servicing position in which the deposit mechanism is moved away from the deposit envelope opening. As a result, when the deposit-holding container is within the chest portion such that it may contain deposits, unauthorized persons who access the cabinet portion are generally prevented from moving the base so as to gain access to the opening in the chest that may allow them to access such deposits.

However, in circumstances where the chest has been opened and the deposit-holding container has been removed from the chest, indicating that an authorized person has secured access to such deposits, the base is enabled to be moved in connection with the slides 460. This is enabled because the withdrawal of the deposit-holding cassette causes the latch 464 to fall, retracting projection 468 from the opening 472. This enables movement to the base 144 in supporting connection with the slides 460 to a position in which the depository mechanism extends outside the housing. Of course, it should be understood that this approach is exemplary and in other embodiments other interlocking mechanisms and approaches may be used.

Figure 67:
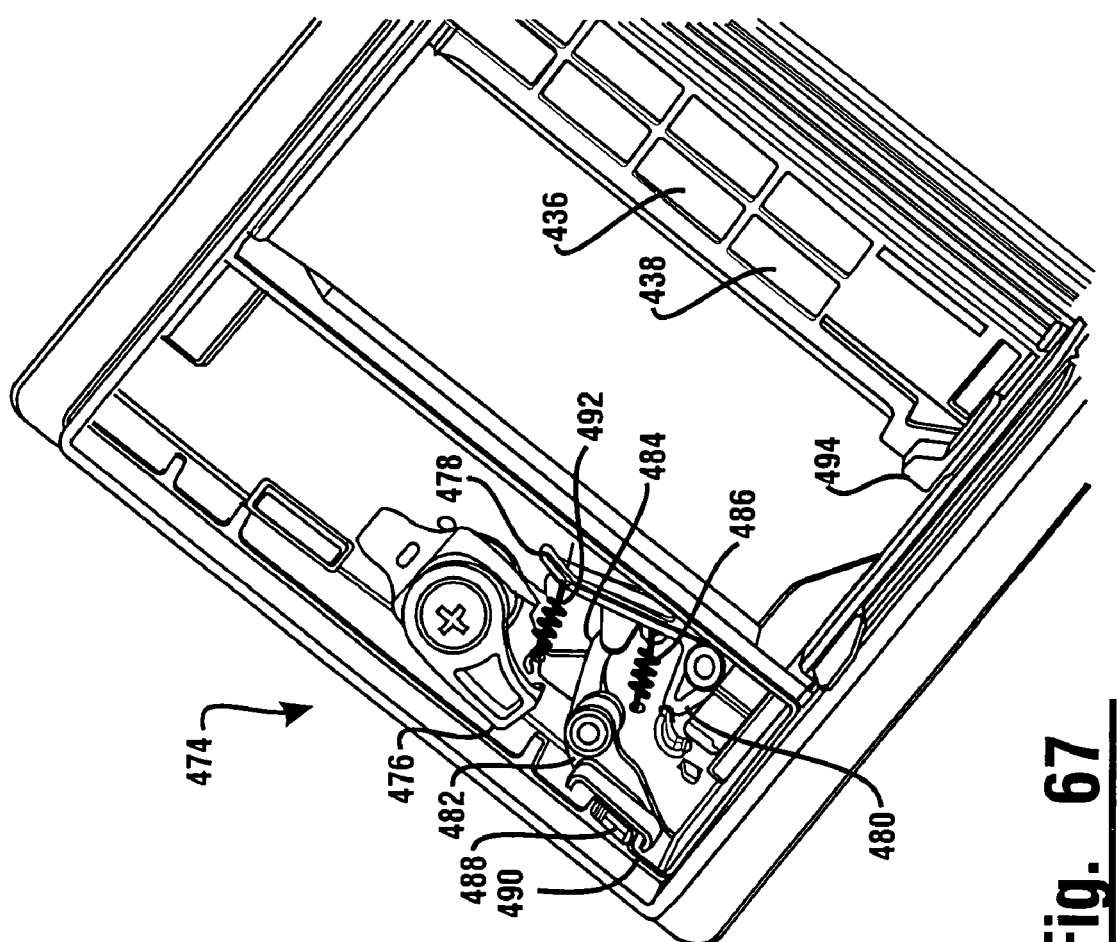
FIG. 67 is a top plan view similar to FIG. 62 but with the exemplary locking mechanism shown in a position enabling opening of the door of the deposit holding container.

A further useful aspect of an exemplary embodiment is the ability to automatically cause the tambour door to be opened upon insertion of the deposit-holding container into the operative position, and to further cause the tambour door to automatically be locked when the deposit-holding container is removed from the machine. This is achieved in the exemplary embodiment by the housing including therein a lock mechanism 474 shown in FIGS. 62 and 67. Lock mechanism 474 includes a rotating member 476 which is in operative connection with a key cylinder and which can only be rotated from the outside of the cassette by having an appropriate key in the key cylinder. Rotating the member 476 in a counterclockwise direction from that shown in FIG. 67 causes engagement and clockwise rotation about a pivot of a latching member 478. Latching member 478 includes thereon a lock projection 480. Once moved to the open position, a lock projection is temporarily held therein by a trigger member 482. Trigger member 482 includes an extension 484 which holds the latching member 478 in an unlocked position against a biasing force provided by a spring 486 which operates to urge the latching member 478 to move in a counterclockwise direction as shown.

In the exemplary embodiment trigger member 482 is accessible through an opening 488 that extends through the housing 434. A flat portion 490 of trigger member 482 is biased toward the opening responsive to biasing force imparted by a spring 492, which is also schematically shown.

Extending on an interior face of end portion 438 of tambour door 436 is a formed latch projection 494. Latch projection 494 is contoured to engage lock projection 480 on latching member 478 when the latching member 478 is in the position shown in FIG. 62. In the exemplary embodiment this enables the tambour door to be latched and held in a closed position. As can be appreciated from FIGS. 62 and 67, after the key has been used to open the lock, the latching member 478 is held in the position shown in FIG. 67 by the action of trigger member 482 in engagement therewith. In this position the tambour door may be opened and closed as the latch projection 494 may move freely into and out of the area adjacent to lock projection 480.

Figure 62:
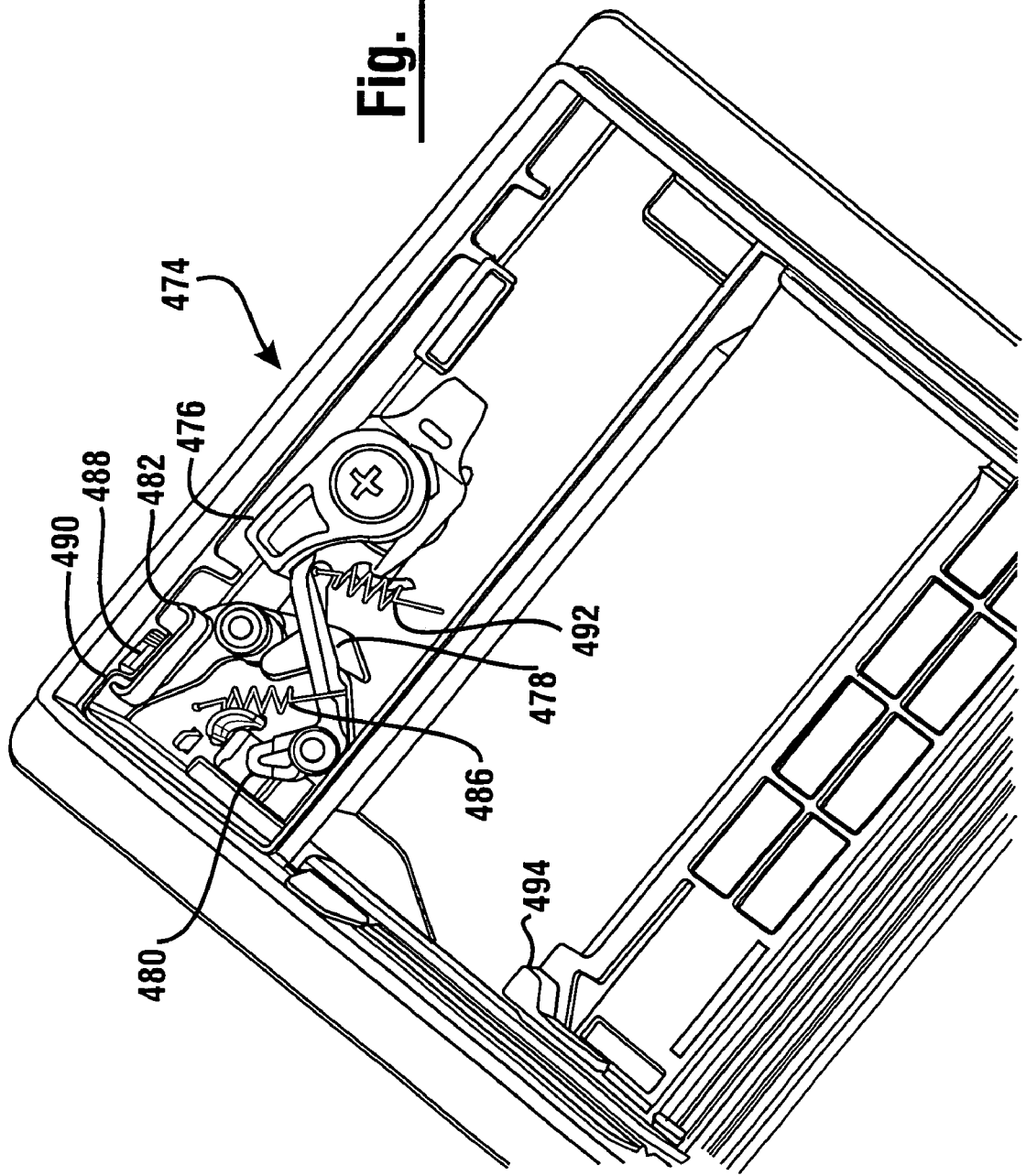
FIG. 62 is a top isometric view showing a locking mechanism used in conjunction with locking the movable door of the deposit holding container of an exemplary embodiment.
Figure 63:
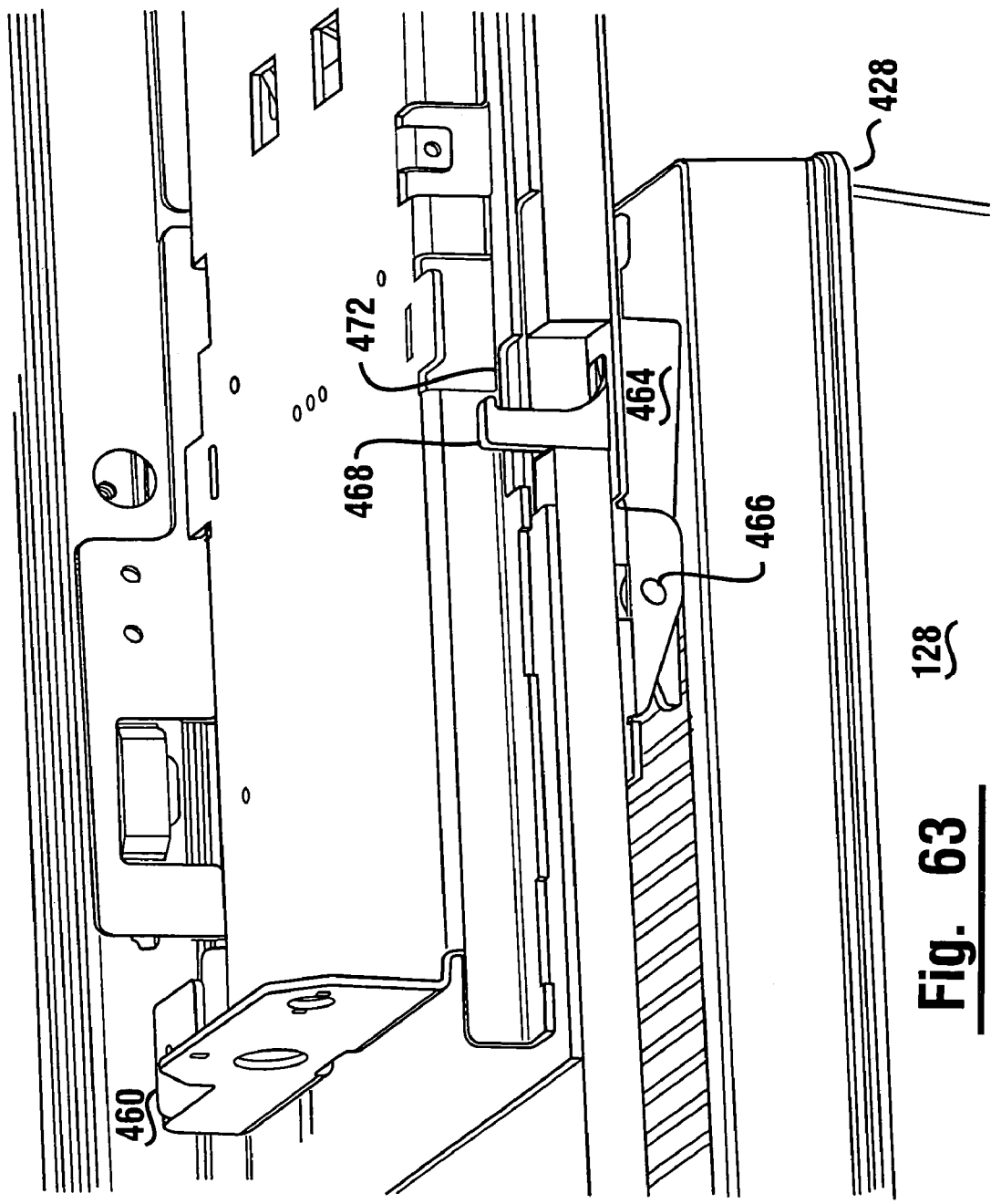
FIG. 63 is an isometric side view showing an exemplary mounting for the deposit holding container and interlocking capabilities used in connection with some embodiments for preventing access to the deposit accepting mechanism when the deposit holding container is in operative position.
Figure 64:
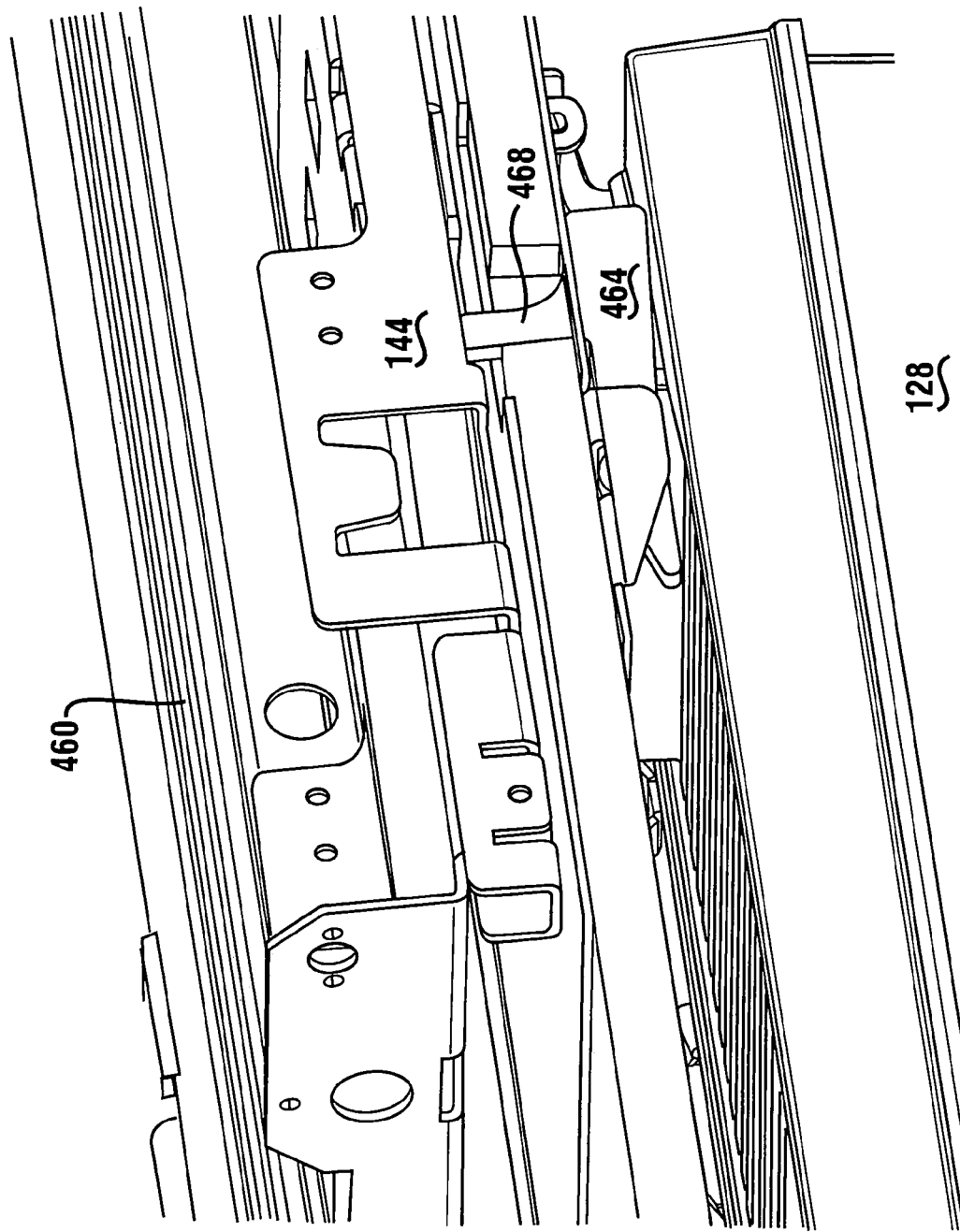
FIG. 64 is a further isometric view showing the exemplary interlock mechanism with the deposit holding container in an operative position.

Thereafter if the door is made ready to lock by moving the trigger member 482, the latching member 478 will move responsive to biasing force to the position shown in FIG. 62. This is generally accomplished by extending an arming pin or other projection through the opening 488 so as to engage the flat portion 490 of the trigger member. Once the latching member 478 has moved to this position, the next closing of the tambour door will cause the latch projection 494 to engage with the latching member 478 and be held in engagement therewith until the rotating member 476 is rotated counterclockwise using the key lock. This is used in conjunction with an exemplary form of the invention to provide the capability for inserting the deposit holding container into its operative position, and thereafter causing the tambour door of the deposit-holding container to automatically close and lock as it is removed.

Figure 66:
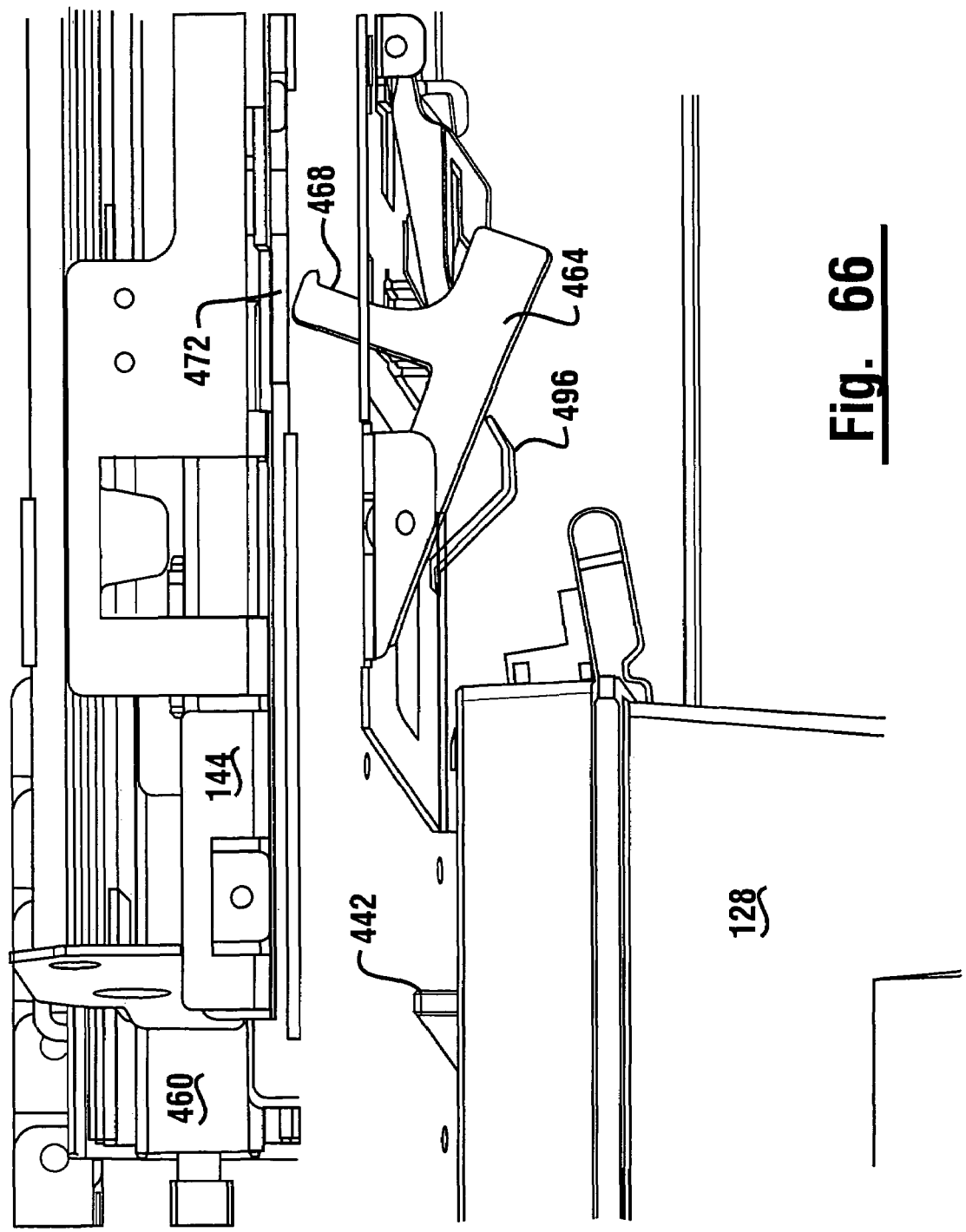
FIG. 66 is a right side view similar to FIG. 65 showing the deposit holding container being removed and the interlock enabling movement of the deposit accepting device.

As is represented in FIG. 66, a downward-extending engaging lever 496 is operative to engage the upward ledge 422 of the tambour door as the container is moved toward the operative position in the ATM. When the deposit-holding container is moved into position and the lock is in an unlocked position, the tambour door is moved to open by the sliding action necessary to install it in position. In the exemplary embodiment the deposit holding container may be installed with the tambour door open or closed, and if the door is closed it will be opened by installation. Further, the engaging lever is operative in the exemplary embodiment to nest in a recess 498 which is formed in the end portion 438 of the tambour door (see FIG. 69). This enables the engaging lever to engage the tambour door in the recess 498 such that when the deposit holding container is removed from the machine, the tambour door is moved to a closed position. Thereafter additional force applied to the container causes the engaging lever 496 to move out of the recess and allows the deposit-holding container to be removed from the machine.

Further in an exemplary embodiment a pin is mounted in a suitable position relative to the deposit-holding container within the housing of the ATM such that when the deposit-holding container has been fully inserted into the operative position, the pin extends through the opening 488 and moves the trigger member 482. Thus although the lock mechanism 474 is initially in the open position shown in FIG. 67, when the container is inserted into the machine, the tripping of the trigger member causes the lock to move to the position shown in FIG. 62 once the tambour door has been opened. Thereafter when the deposit-holding container is removed the lock projection 480 engages the latch projection 494, holding the tambour door in a closed position so as to secure the deposits therein until the container is unlocked by a person having an appropriate key. This facilitates the management of deposited items and minimizes the risk of loss. Further, in the exemplary embodiment-because the components associated with the container are structured in the manner shown, efforts to obtain unauthorized access to deposits within the container will cause readily observable evidence of the fact that unauthorized access has been obtained. Of course, it should be understood that these approaches are exemplary and in other embodiments other approaches may be used.

Figure 59:
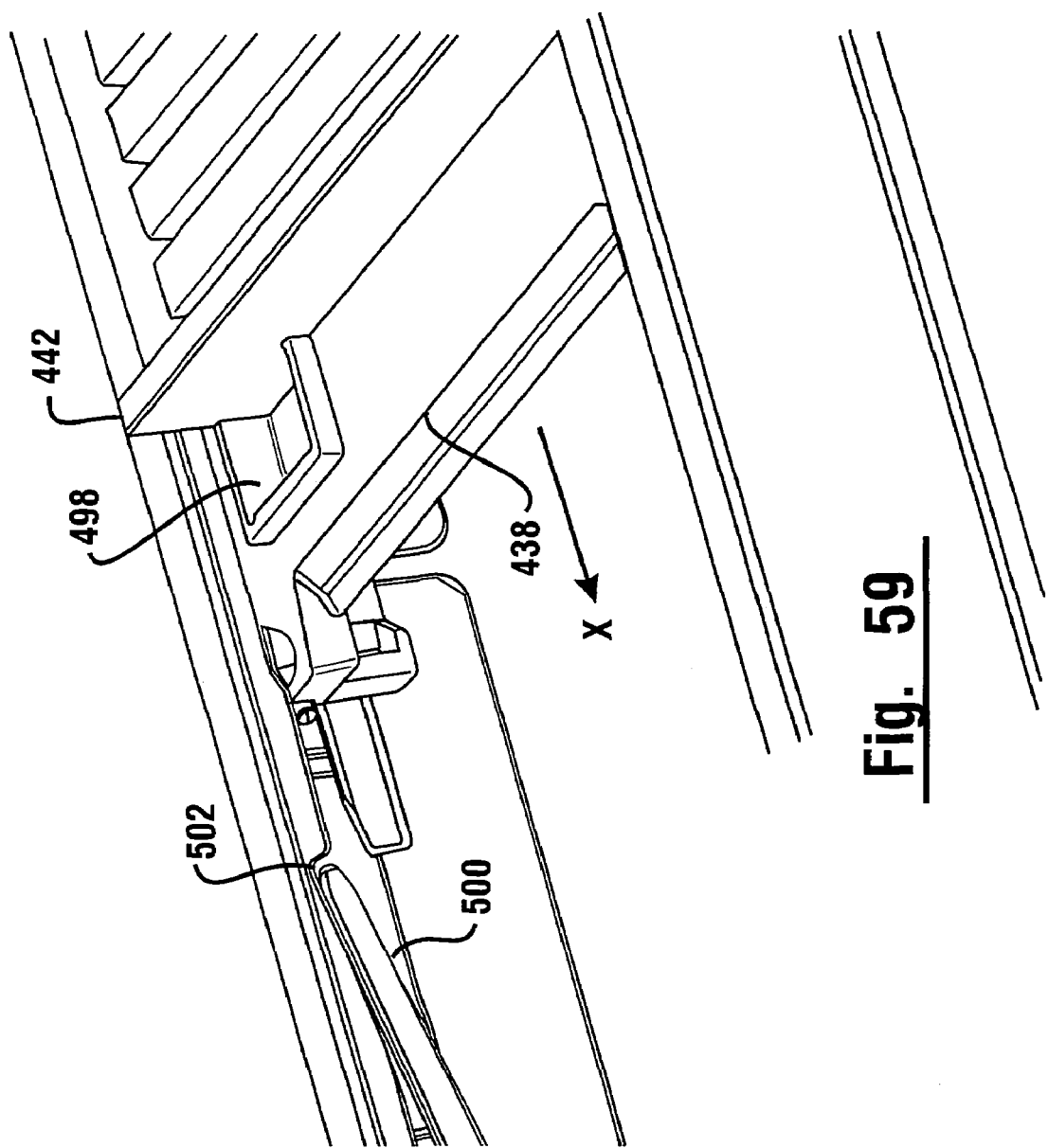
FIG. 59 is an enlarged isometric view of a top portion of the container and the associated movable door mechanism.
Figure 61:
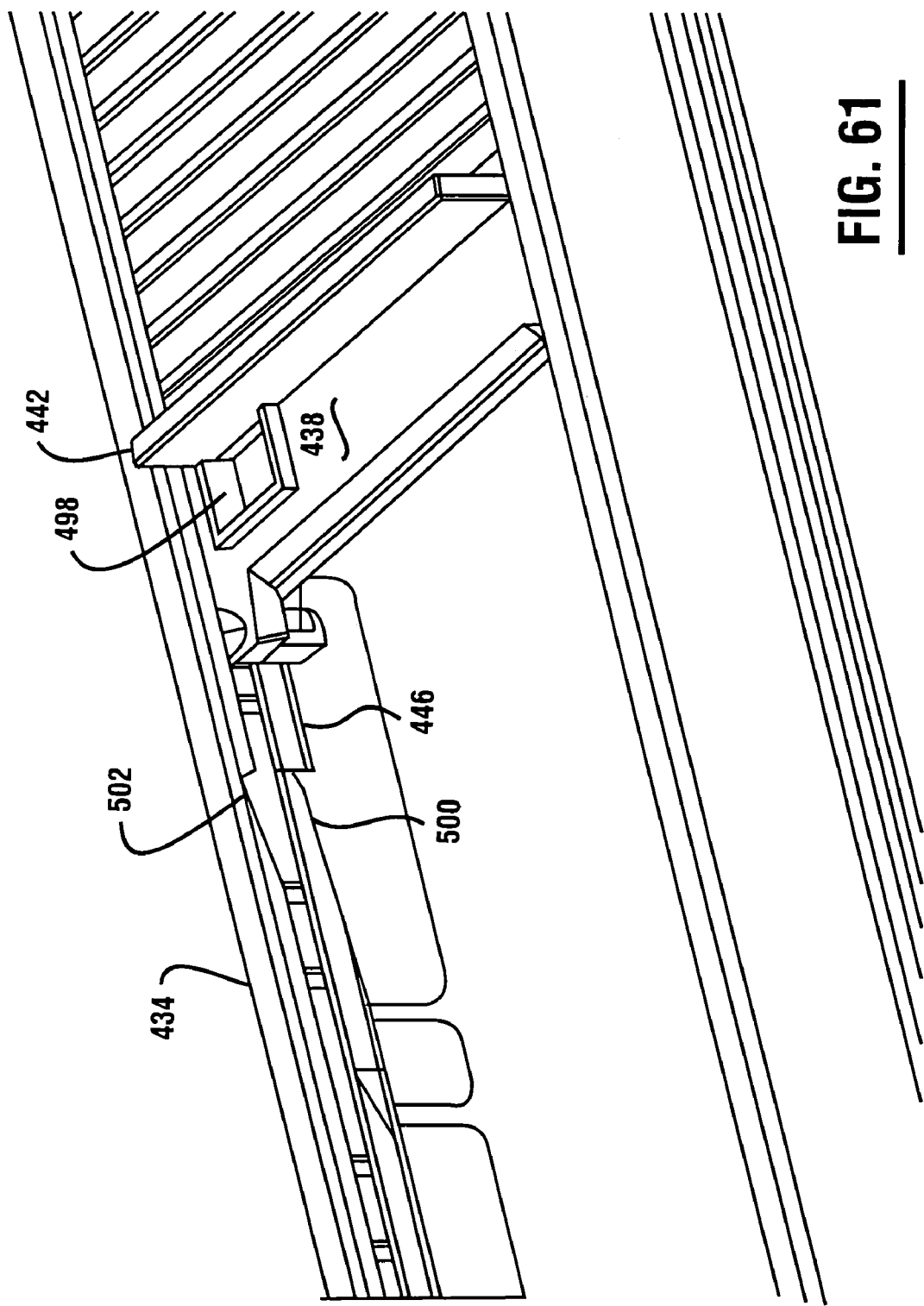
FIG. 61 is an isometric view of the deposit holding container and movable door mechanism of an exemplary embodiment including features for facilitating changing the movable door.

A further useful aspect of the exemplary embodiment of the deposit-holding container is that although the structures are tamper-indicating, it is nonetheless possible to achieve replacement by authorized persons of the tambour doors in situations where the doors have become worn or otherwise are in need of replacement. As shown in FIGS. 59 and 61, the exemplary form of the track 446 in the housing 434 includes on a lower side thereof a frangible portion which is referred to herein as section 500. Further, the cover 448 includes a recessed area 502 in the lip overlying the track 450 which corresponds to the frangible section 500. Of course, it should be appreciated although these features are shown on only one side of the container, exemplary embodiments include such features in the tracks located on each side.

As shown in FIG. 59, the frangible section 500 may be broken at one side once the door has been opened, and the now movable portion displaced upwardly at the one side into the recessed area 502. This produces an inward facing opening in the track. Thereafter by moving the tambour door in the direction of arrow X and downward into the interior of the container, the tambour door may be separated from the tracks by moving the protections out of the tracks. When separated from the tracks the tambour door may be removed from the container through the opening and a new tambour door installed with the projections 444 extending in the tracks. Thereafter the frangible section may be returned to its original orientation bounding the track and the new tambour door will operate in the manner previously described. Further replacements of the doors are possible by again moving the previously broken section 500 into the recess. Thus in this exemplary embodiment, the tambour doors which may become broken, worn or damaged may be replaced by authorized persons without having to disassemble and reassemble the tops of the cassettes. This facilitates making exemplary embodiments in a manner which provides for the generally permanent attachment of the various pieces and promotes the properties previously discussed of providing an indication when tampering with the deposit-holding container is attempted. Further in alternative embodiments the frangible section may comprise a section bounding the track which is movable but does not require any initial breakage of a surface bounding the track. For purposes of this disclosure a frangible section will be considered a section that is deformable so as to separate from an adjacent surface to enable the tambour door to be separated from a track, regardless of whether breakage of a member is required. Of course, it should be understood that these features are exemplary and in other embodiments other approaches may be used.

Figure 69:
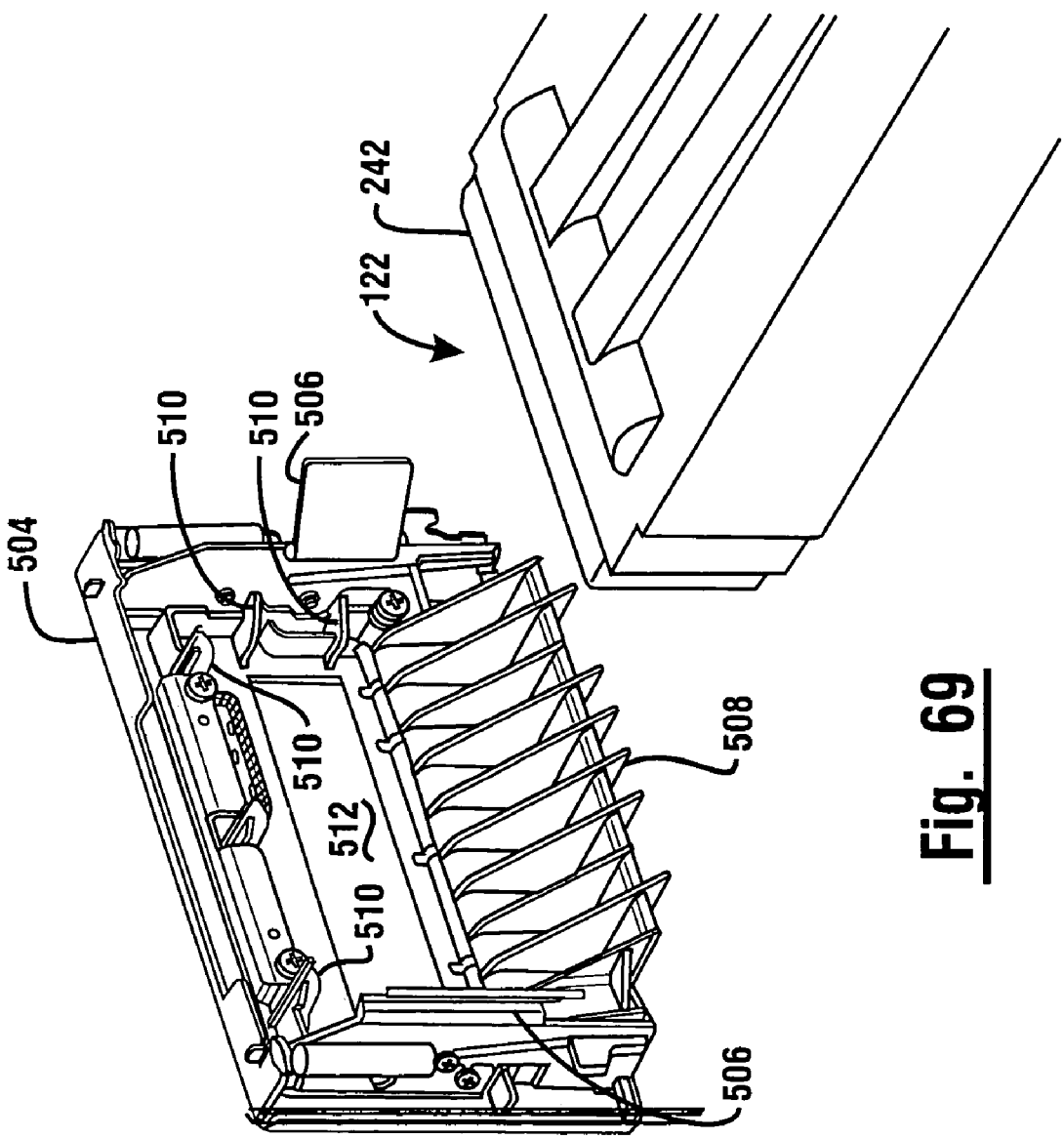
FIG. 69 is an isometric exploded view showing engagement of the exemplary outer end of the deposit accepting mechanism with a floating fascia portion movably mounted relative to the fascia of an automated banking machine.
Figure 70:
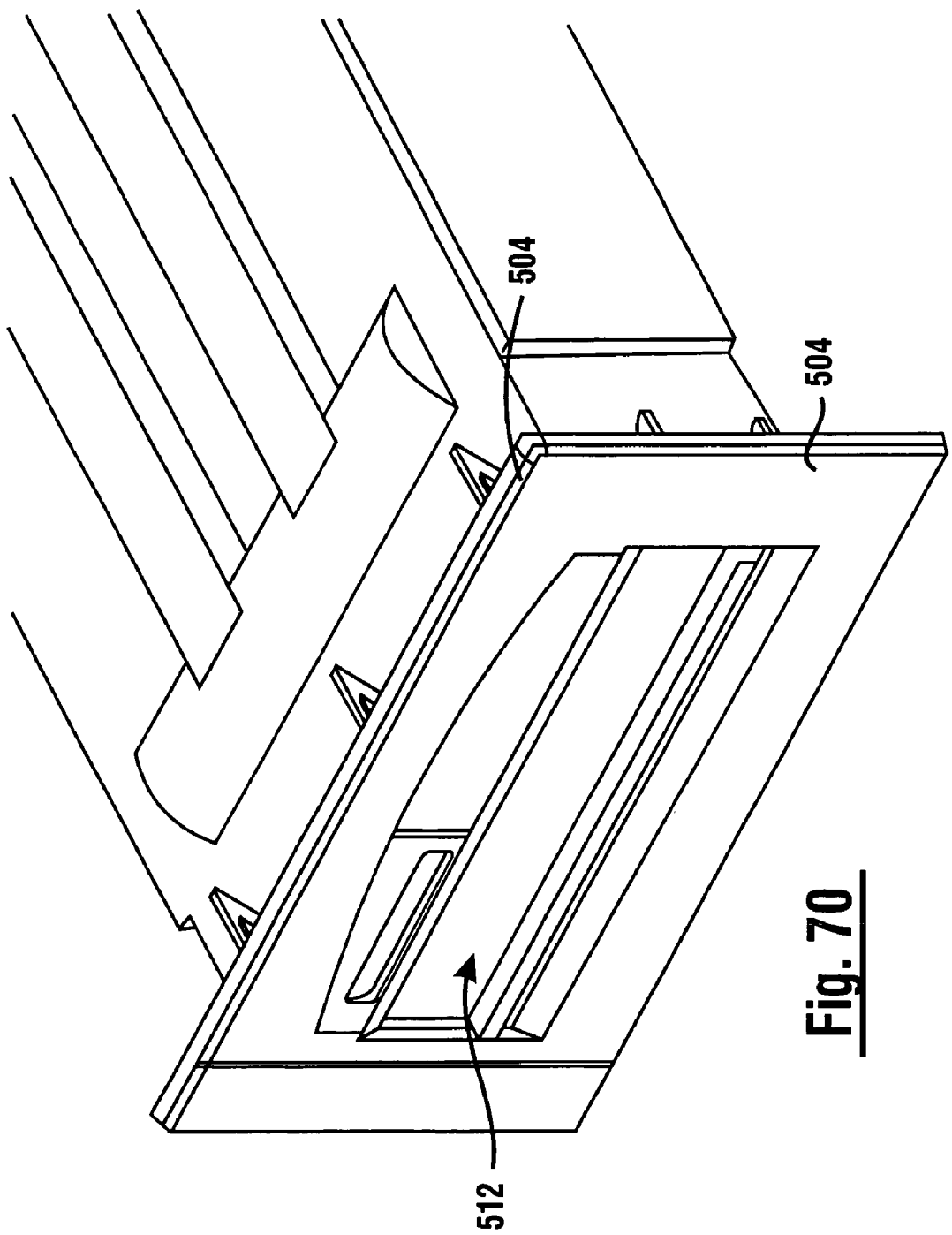
FIG. 70 is an isometric front view showing the bezel at the outer end of the deposit accepting mechanism engaged with a movable fascia portion of an automated banking machine.

As previously discussed, in exemplary embodiments the base 144 which supports the deposit-accepting mechanism components located outside the chest may be movably mounted in supporting connection with the housing slides 460. This enables extending the depository mechanism outside of the housing for service and then enables return of the mechanism back into the operative position. In such embodiments the bezel 242 at the outer end 122 of the transport must be made to align with a corresponding opening in a fascia of the machine. This may present issues related to achieving alignment of the bezel with such fascia openings. To minimize the need for precise fascia alignment in some exemplary embodiments, provision is made to provide fascia sections which are in supporting connection with the housing yet movable relative to other portions of the fascia. This is represented in FIGS. 69 and 70 in connection with an exemplary fascia plate 504. Fascia plate 504 is in operative connection with the external fascia of the banking machine. However, it is mounted in a manner such that it is enabled to move somewhat in two (2) dimensions relative thereto. This engagement is achieved in an exemplary embodiment through a sandwich-type structure but in other embodiments other approaches may be used.

As shown in FIG. 69 the rear of fascia plate 504 includes a pair of lateral guides 506 and a vertical guide 508. Further in the exemplary embodiment fascia plate 504 includes projections 510 which form a pocket into which the bezel 242 may nest in aligned relation.

As a result when the deposit-accepting mechanism is moved from a servicing position in which it is extended outside the machine on guides 460, to an operative position, the bezel 462 engages guides 506, 508 and 510 to cause the fascia plate 504 to move relative to the fascia to an appropriate position such that opening 512 in the fascia plate corresponds to the location of the bezel and the deposit accepting opening in the bezel. As can be appreciated, this exemplary approach eliminates the need to maintain a precise aligned arrangement between the devices and the fascia as the moveable fascia plate can compensate for modest misalignment. Of course, it should be appreciated that these features may be applied to other devices as well which are required to mate with the fascia of the machine. Of course, it will be appreciated that these structures shown in connection with the deposit-accepting mechanism are exemplary and in other embodiments other approaches may be used.

Figure 68:
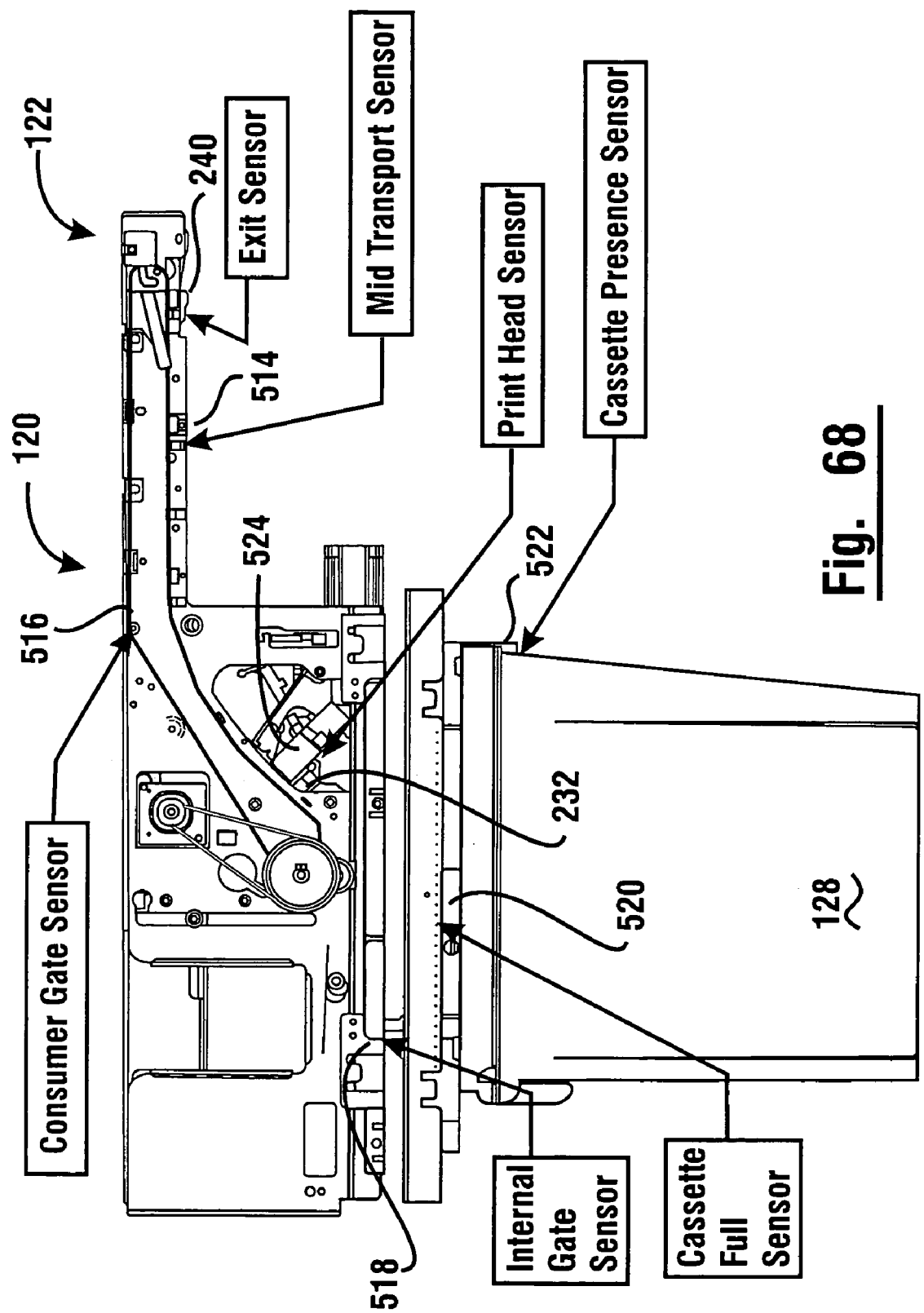
FIG. 68 is a right side schematic view indicating exemplary sensors for providing enhanced security against tampering and unauthorized access to the deposit accepting mechanism.

Exemplary embodiments enable the controller and other circuitry that may be operative in the banking machine to sense conditions that may be indicative of conditions and problems with the deposit mechanism or other banking machine components. This is accomplished in an exemplary embodiment by a series of sensors which are schematically indicated in connection with FIG. 68. These sensors include in the exemplary embodiment exit sensor 248 which is operative to sense envelopes or other objects adjacent to the outer end 122 of the transport. In addition, the exemplary form of the invention includes a mid-transport sensor 514 similar to sensor 248 which is operative to sense envelopes and other objects in the transport section and may be utilized in conjunction with sensing fingers that extend in slots 312 in section 290 previously discussed. Sensor 232 previously discussed and which may also be similar to sensor 248 senses envelopes or other objects on the platen adjacent to the gap 188. A gate position sensor 516 is operative to sense the position of the gate through the positioning of actuator member 360. An internal gate sensor 518 is provided so as to sense the position of the baffle 196 relative to the base 144. In the exemplary embodiment at least two (2) sensors are utilized for this purpose so as to facilitate sensing of the baffle in its different positions. A container full sensor 520 is provided in the area through which envelopes pass to enter the container in order to determine if the container is full. Further, a container presence sensor 522 is provided for purposes of determining if the cassette is installed in proper position within the machine. Finally, a printhead sensor 524 is provided for sensing the operative position as well as other properties of the printhead. Of course, these sensors in their relative positions within the mechanism are exemplary. Additional or other types of sensors may also be used. Further, sensors of various types may be employed in connection with embodiments to achieve these functions. For example, while contact sensors have been described in connection with the exit sensor 248, sensor 232 and the mid-transport sensor 514, other types of sensors such as photo sensors, radiation sensors, induction sensors, sonic sensors, capacitance sensors, voltage sensors, current sensors or other types of sensors may be alternatively or additionally used.

In operation of the exemplary embodiment the sensors are generally monitored for changes in condition and are operative to send signals which notify the controller or other circuitry of any change in condition. When this occurs in circumstances where the controller has not commanded the mechanism to be performing a function which would cause this event, an asynchronous event is noted by the controlling software. The nature of this event is noted and the controller may take action in accordance with its programming to carry out an appropriate function. For example, if an item is sensed in the transport by the mid-transport sensor, in circumstances where the controller has not operated to cause an item to be within the transport, the controller may be programmed to indicate an alarm condition. The controller may operate to notify an appropriate servicer or other authorities of a possible tampering activity with regard to the machine.

In a similar manner when the machine is operating to dispense envelopes or receive envelopes therein, the controller operates in accordance with its programming to sense if the sensors detect appropriate activities in the proper sequence and at the appropriate times. These events are compared through operation of the controller to stored data in a data store which correspond to event sequences which are expected to occur in the course of such operations. If during these operations an abnormal event or an abnormal sequence of events occurs, the computer will operate in accordance with its programming to try to correct the abnormal event and/or to record and give notice of tampering events. For example, if a user is requesting a deposit transaction and if as soon as the deposit gate moves to an open position, the presence of an item is sensed at the exit sensor within the transport before an envelope has been sensed at the mid-transport sensor 514, it is likely that someone is attempting to insert a burglar tool into the transport. In such circumstances the controller may operate to cause the machine to move the baffle 196 to the appropriately closed position preventing access to the deposit-holding container. Likewise, the controller may operate in accordance with its programming to send a notice to appropriate personnel to advise of the suspected tampering event. In addition or in the alternative, the controller may operate to cause associated cameras or other warning devices to operate so as to give notice of the event and to capture information such as images showing the identity of the person who was involved in operating the machine when such an event occurred. Of course, these approaches are exemplary and in other embodiments other approaches may be used.

While the exemplary embodiments has been described with respect to deposited items which are envelopes, the principles of the invention are not limited to such items. The principles of the present invention may be employed with regard to tickets, checks, money orders, notes and other types of items which may be deposited in or dispensed from automated banking machines. In addition, the principles described may be applied in situations where operators of such systems need to accept monetary deposits or other items. Numerous alternative approaches within the spirit of the principles described will be apparent to those skilled in the art from the foregoing disclosure.

Thus the apparatus and methods described achieve at least some of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be deemed limited to the particular means shown in the foregoing description herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus including:
   an automated banking machine including a housing,
   at least one input device in supporting connection with the housing adapted to receive inputs associated with each user of the machine,
   a cash dispenser,
   a transport adapted to transport deposit items between a deposit opening on the housing and a deposit storage area in the housing,
   a printhead operative to print indicia on deposit items that are moved through the transport,
     wherein the printhead includes ink nozzles,
   a wiper movably mounted in supporting connection with the housing and adapted to engage the printhead,
     wherein the wiper comprises a resilient squeegee portion,
       wherein the squeegee portion is adapted to move over the nozzles,
   a drive in operative connection with a wiper,
   at least one controller in the housing,
     wherein the at least one controller is in operative connection with the at least one input device, cash dispenser, transport, printhead, and drive, and wherein the at least one controller is operative to cause the wiper to engage the printhead,
   a vessel in supporting connection with the housing,
     wherein the vessel includes a vessel opening in opposed relation of the nozzles,
       wherein the vessel opening is adapted to accept from the nozzles, ink not applied to deposit items,
     wherein the vessel includes an internal cavity and at least one weir extending in the internal cavity,
       wherein the at least one weir enables ink to collect in the cavity without flowing out of the vessel through the vessel opening.

2. The apparatus according to claim 1 wherein the vessel includes a movable access member movable relative to the vessel, wherein the movable access member enables accessing the cavity within the vessel.

3. The apparatus according to claim 2 wherein the vessel is movably mounted in supporting connection with the housing.

4. The apparatus according to claim 3 wherein the vessel is movably mounted in supporting connection with the housing through a pivot.

5. The apparatus according to claim 4 wherein the nozzles are generally upward directed, and wherein the vessel extends generally above the printhead, and wherein the vessel is biased to rotatably move about the pivot and to urge the vessel opening to be positioned adjacent the nozzles.

6. The apparatus according to claim 5 wherein the vessel includes a first contoured exterior surface such that deposit items moving from the deposit opening toward the deposit storage area engage the first contoured exterior surface and are urged towards the nozzles.

7. The apparatus according to claim 3 wherein deposit items moving from the deposit opening toward the deposit storage area engage and move the vessel relative to the housing.

8. The apparatus according to claim 6 and further comprising an empty envelope dispenser within the housing, wherein empty envelopes move in the transport from the envelope dispenser towards the deposit opening.

9. The apparatus according to claim 8 wherein the vessel includes a second contour exterior surface, wherein the second contoured exterior surface is operative to direct envelopes moving in the transport toward the deposit opening, to move between the nozzles and the vessel opening.

10. The apparatus according to claim 3 wherein the vessel is releasibly mounted in supporting connection with the housing.

* * * * *